United States Patent [19]
Engberg et al.

[11] Patent Number: 5,283,638
[45] Date of Patent: Feb. 1, 1994

[54] MULTIMEDIA COMPUTING AND TELECOMMUNICATIONS WORKSTATION

[75] Inventors: Daniel K. Engberg, Cedar Park; Albert F. Nurick; Brittain D. Fraley, both of Austin, all of Tex.

[73] Assignee: Compuadd Corporation, Austin, Tex.

[21] Appl. No.: 691,391

[22] Filed: Apr. 25, 1991

[51] Int. Cl.$^5$ .................. H04N 7/14; H04M 11/00
[52] U.S. Cl. .................................. 348/14; 379/90; 379/13; 379/96; 379/100; 364/188
[58] Field of Search ............... 379/90, 93, 56, 55, 379/63, 110, 92, 96, 97, 98, 100; 358/93, 194.1, 903, 85; 381/119, 1, 14; 312/208; 364/188

[56] References Cited

U.S. PATENT DOCUMENTS

| | | |
|---|---|---|
| 4,686,698 | 8/1987 | Tompkins et al. . |
| 4,698,770 | 10/1987 | Rattan et al. ............... 358/903 |
| 4,710,917 | 12/1987 | Tompkins et al. . |
| 4,716,585 | 12/1987 | Tompkins et al. . |
| 4,748,618 | 5/1988 | Brown et al. . |
| 4,787,085 | 11/1988 | Suto et al. . |
| 4,792,974 | 12/1988 | Chace ............................ 381/1 |
| 4,864,562 | 9/1989 | Murakami et al. . |
| 4,907,079 | 3/1990 | Turner et al. ................. 379/92 |
| 4,907,267 | 3/1990 | Gutzmer . |
| 4,962,521 | 10/1990 | Komatsu et al. . |
| 5,033,804 | 7/1991 | Faris ............................ 312/208 |
| 5,086,385 | 2/1992 | Launey et al. .............. 379/102 |

FOREIGN PATENT DOCUMENTS

| | | | |
|---|---|---|---|
| 0137181 | 7/1985 | Japan ........................ 358/903 |
| WO9005350 | 5/1990 | PCT Int'l Appl. ......... 358/903 |

OTHER PUBLICATIONS

"Electronic Volume LSI for 7-Band Graphic Equalizer", TC9187AN, TC9187AF, Audio Digital Inc.
"DVI—A Digital Multimedia Technology", G. David Ripley, *Communications of ACM*, vol. 32, #7, Aug. 1989, pp. 811-822.
"Multimedia: The Next Frontier for Business?", Robin Raskin, *PC Magazine* Aug. 1990, pp. 151-192.
"Commodore Sets Course for Multimedia", Bob Ryan, BYTE May 1990, pp. 122-125.
"The Integrated Automated Educated House", V. Elaine Gilmore, *Popular Science* Jun. 1990, pp. 104-107.
"The Pioneering Amiga", Sheldon Leemon, *Computer Shopper* Jun. 1990.
"Enhanced Asynchronous Communications Element WD16C550", *Western Digital.*
"YM3812 FM Operator Type-L II (OPL II)", Nippon Gakki Co., Ltd. Jun. 1987.
"YM3014 Serial Input Floating D/A Converter (DAC-SS)", Nippon Gakki Co., Ltd. Jun. 1987.
"MC145146-1", Motorola.
"TC9188N/F", Toshiba.
"Single-Chip PC AT-to-SCSI I/O Processor", Adaptec 1990.
Rockwell RC9624AT *Data/Fax Modem Design.*
"LC$^2$MOS Complete, 8-Bit Analog I/O System", *Analog-to-Digital Converters* 3-233.

*Primary Examiner*—Jin F. Ng
*Assistant Examiner*—Jason Chan
*Attorney, Agent, or Firm*—Baker & Botts

[57] ABSTRACT

A personal computer workstation (10) for processing and communicating data which comprises, in combination, a personal computer chassis (20). Chassis (20) includes host computer (24) with memory (42) and a plurality of ports for communicating data signals. Telecommunications circuitry (12) within chassis (20) processes telecommunications data and communicates telecommunications data to host computer (24) and ports. Audio multimedia circuitry (18) within chassis (20) processes audio multimedia data and communicates audio multimedia data to host computer (24) and ports. An interface bus (300) within chassis (20) and associated with telecommunications circuitry (12) and audio multimedia circuitry (18) integrates telecommunications data and audio multimedia data to produce multimedia telecommunications data for processing and storage within host computer (24) and communication of the integrated multimedia telecommunications data external to chassis (20).

1 Claim, 41 Drawing Sheets

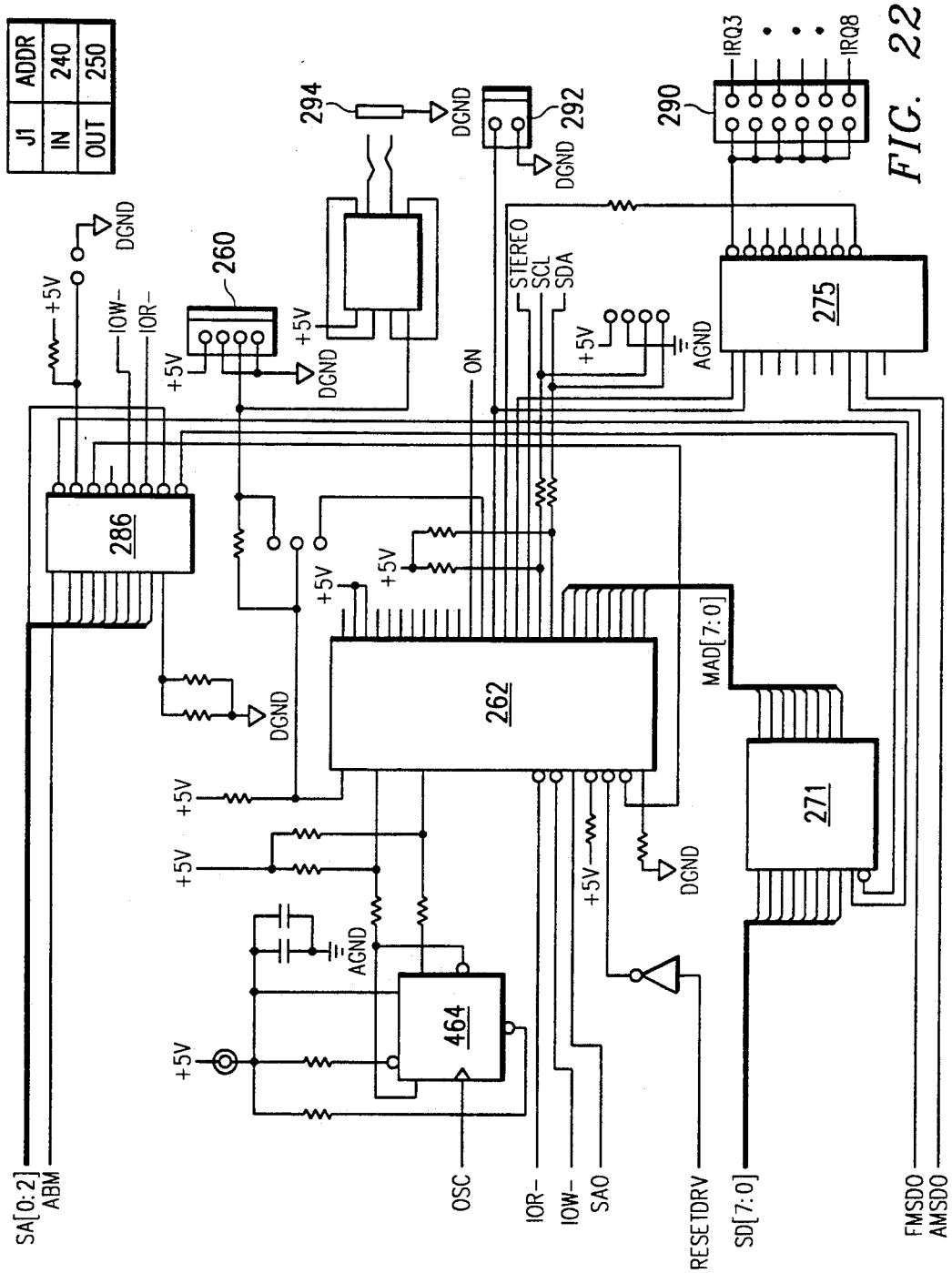

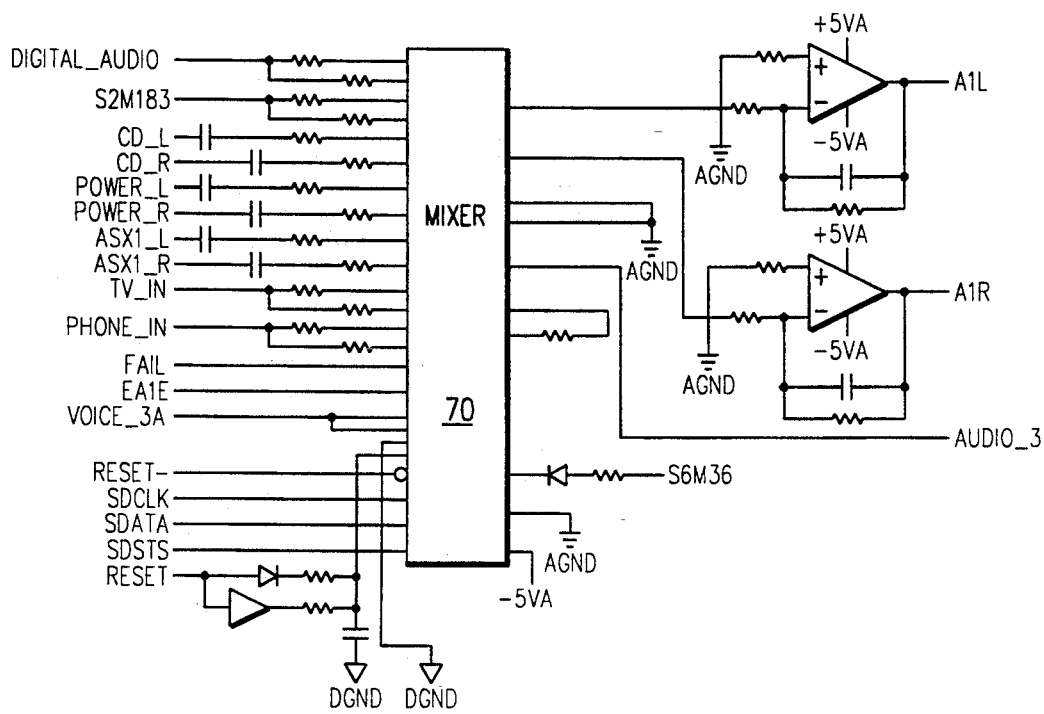
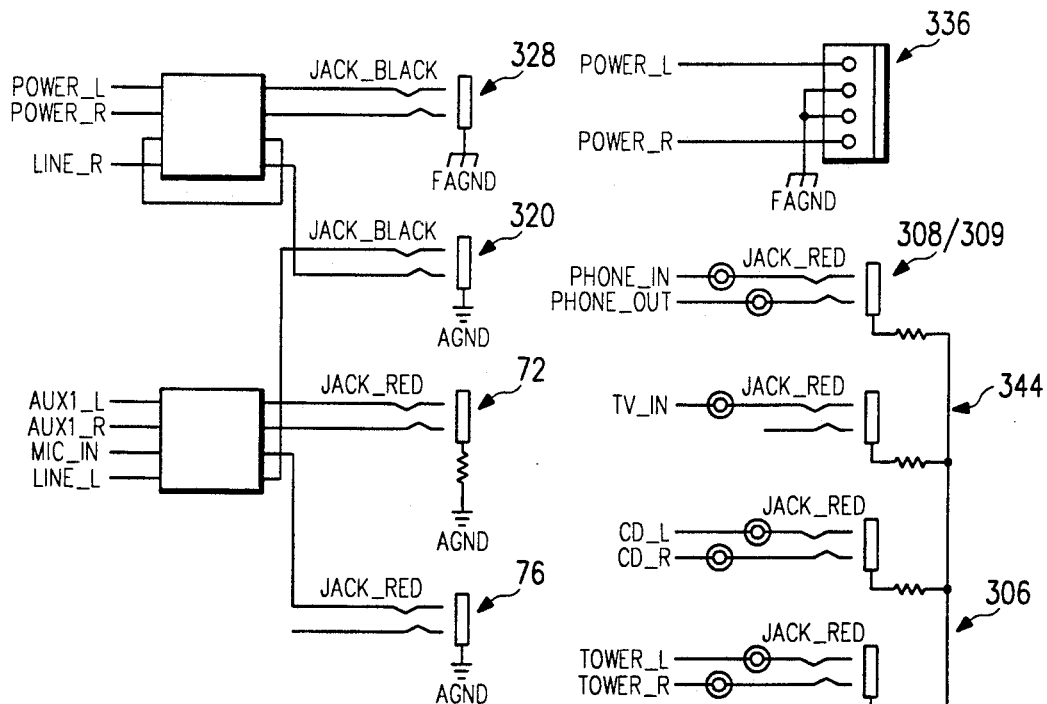
FIG. 39

MULTIMEDIA COMPUTING AND TELECOMMUNICATIONS WORKSTATION

TECHNICAL FIELD OF THE INVENTION

The present invention pertains in general to computer workstations and, more particularly, to a multimedia computing and telecommunications workstation for providing a broad array of telecommunications, multimedia, and integrated multimedia telecommunications capabilities.

BACKGROUND OF THE INVENTION

In recent times, numerous electronic technologies including audio signal processing, video signal processing and data processing have become more available to individual users. With more advanced electronic technologies available to users, new and different needs for entertainment and business applications have arisen.

Two areas in which needs for improved entertainment and business applications exist are in generating multimedia presentations and telecommunications. Multimedia refers to the integration of text, audio, graphics, still image and moving pictures into a single, computer-controlled multimedia product. It includes the combination of computers, video disk or compact disk players, video monitors, optical scanners, audio cards, music synthesizers, etc., all linked together by powerful software. Telecommunications, on the other hand, includes applications for communicating by electronic transmission signals from devices such as telephones, radio, and television. A number of factors, however, have precluded the ability of system designers to develop systems which can fully utilize and integrate multimedia and telecommunications applications in a single workstation. These factors include public acceptance, excessive costs, system complexity, and incompatibilities among the various electronic technologies.

One video workstation described in U.S. Pat. No. 4,864,562 to Murakami et al. (hereinafter "Murakami") shows the use of a control system that collects multiple asynchronous video, audio, graphic and data signals and retransmits the signals. While the data transmission system of Murakami discloses a system for transmitting various types of audio and video data, it fails to integrate telecommunications and multimedia abilities in a single workstation easily accessible to a user.

In U.S. Pat. No. 4,787,058 to Suto et al. (hereinafter "Suto") there is shown a terminal design for telecommunications that provides a digital signal transmitting system that couples a personal computer with a television and video signal receiving system, a CD-ROM, a stereo/audio receiver and a facsimile device. All of these devices with which the Suto device couples are external to the workstation itself. The system comprises a digital signal reproducer, a digital signal multiplexer connected to the digital signal reproducer, means for modulating the output of the digital signal multiplexer, a plurality of tuners and a means for transmitting the demodulated multiplex digital signal through an optical fiber cable to a corresponding receiver terminal. The system of Suto does not provide the user with a multimedia telecommunications system in a single station. Instead, Suto requires the user to interconnect multiple monitors and external devices to perform only some of the needed entertainment and business functions. Moreover, the Suto system does not provide the user a platform for generating multimedia presentations. Additionally, Suto does not provide a platform for integrating telecommunications applications with multimedia presentation applications.

Thus, there is a need for a system that can provide to the user easy access to electronic technologies for audio signal processing, video signal processing, and data processing uses.

There is a need for a system that can provide to the user in a single station the ability to apply audio signal processing, video signal processing, and data processing to applications for preparing multimedia presentations.

There is a need for a system that provides the user with easy access to audio signal processing, video signal processing, and data processing for telecommunications applications.

Moreover, there is a need for a single system that can provide to the user the ability to integrate electronic technologies for involving both multimedia and telecommunications applications. Additionally, there is a need for a system that can inexpensively provide a user friendly workstation at which to prepare multimedia presentations and perform telecommunications functions, as well as to integrate telecommunications functions with multimedia applications or presentations.

There is yet the need for an inexpensive system that coordinates and combines previously incompatible technologies to perform audio signal processing, video signal processing, and data processing for a multimedia and telecommunications application as well as integrating these applications.

SUMMARY OF THE INVENTION

The present invention accordingly provides a personal computer workstation that substantially eliminates and reduces disadvantages and limitations associated with prior workstations and devices for performing telecommunications and multimedia functions, as well as permitting integrated multimedia telecommunications functions heretofore not possible for personal computer users.

According to one aspect of the invention, there is provided a multimedia computing and telecommunications workstation for processing and integrating multimedia and telecommunications information. The workstation comprises a personal computer that includes a personal computer central processing unit and memory within a personal computer chassis and a monitor. The invention includes telecommunications circuitry that is associated with the personal computer and within the chassis for processing telecommunications data and communicating the telecommunications data to the central processing unit. The telecommunications circuitry comprises a telephone circuit for communicating over a telephone line a plurality of telephone input signals. The telephone circuitry comprises a data/fax/voice modem circuit for communicating over the telephone line data, fax, and voice telephone signals. Telecommunications circuitry also includes a radio frequency tuner for receiving a plurality of radio frequency signals. The radio frequency tuner is in communication with the telephone circuit to transmit received signals over the telephone line.

The telecommunications circuit further includes a television circuit for receiving a plurality of television signals and transmitting the television signals to the telephone circuit for transmission over the telephone line. The television circuit is also associated with the radio frequency circuit through the interfacing circuitry for integrating the radio frequency and television signals.

The workstation of the present invention also includes audio multimedia circuitry that is associated with the personal computer and within the chassis for processing audio multimedia data and communicating the audio multimedia data to the central processing unit. The audio multimedia circuit comprises an analog mixing circuit for mixing a plurality of analog audio signals, and an analog-to-digital/digital-to-analog converter in association with the analog mixing circuit for generating a plurality of analog output signals and directing the analog output signals to the analog mixing circuit. The analog-to-digital/digital-to-analog converter communicates with the analog mixing circuit for receiving a plurality of analog audio signals to generate a plurality of digital output signals.

The workstation includes interfacing circuits associated among the personal computer, the telecommunications circuitry, and the audio multimedia circuitry within the chassis for integrating the telecommunications data and the audio multimedia data to produce audio multimedia telecommunications data for processing and storage within the personal computer and communicating the audio multimedia telecommunications data external to the chassis. The interfacing circuitry comprises software and necessary circuitry for generating a graphical user interface at the monitor that permits control of the telecommunications circuitry and the audio multimedia circuitry.

A technical advantage of the present invention is that it provides a system with which a user can easily access electronic technologies for audio signal processing, video signal processing, and data processing uses.

Another technical advantage of the present invention is that it provides a single station from which a user may apply audio signal processing, video signal processing, and data processing capabilities to applications for preparing multimedia presentations.

Yet another technical advantage of the present invention is that it provides a user with easy access to audio signal processing, video signal processing, and data processing for telecommunications applications.

Moreover, the present invention provides a single system that can integrate electronic technologies for involving both multimedia and telecommunications applications. Additionally, there is a need for a system that can inexpensively provide a user-friendly workstation at which to prepare multimedia presentations and perform telecommunications functions, as well as to integrate telecommunications functions with multimedia applications or presentations.

Yet another technical advantage of the present invention is that it inexpensively coordinates and combines previously incompatible technologies to perform audio signal processing, video signal processing, and data processing for a multimedia and telecommunications application as well as integrating these applications.

BRIEF DESCRIPTION OF THE DRAWINGS

For a more complete understanding of the present invention and for further advantages thereof, reference is now made to the following brief description, taken in conjunction with the accompanying figures, in which:

FIGS. 22 through 25 are detailed schematic diagrams of the AM/FM tuner circuit and infrared remote control circuits of the preferred embodiment;

FIGS. 26 through 40 provide the detailed schematic diagrams for the audio multimedia circuit of a preferred embodiment of the present invention;

DETAILED DESCRIPTION OF THE INVENTION

The preferred embodiment of the present invention is best understood by referring to the FIGUREs, like numerals being used for like and corresponding parts of the various drawings.

Figure 1:
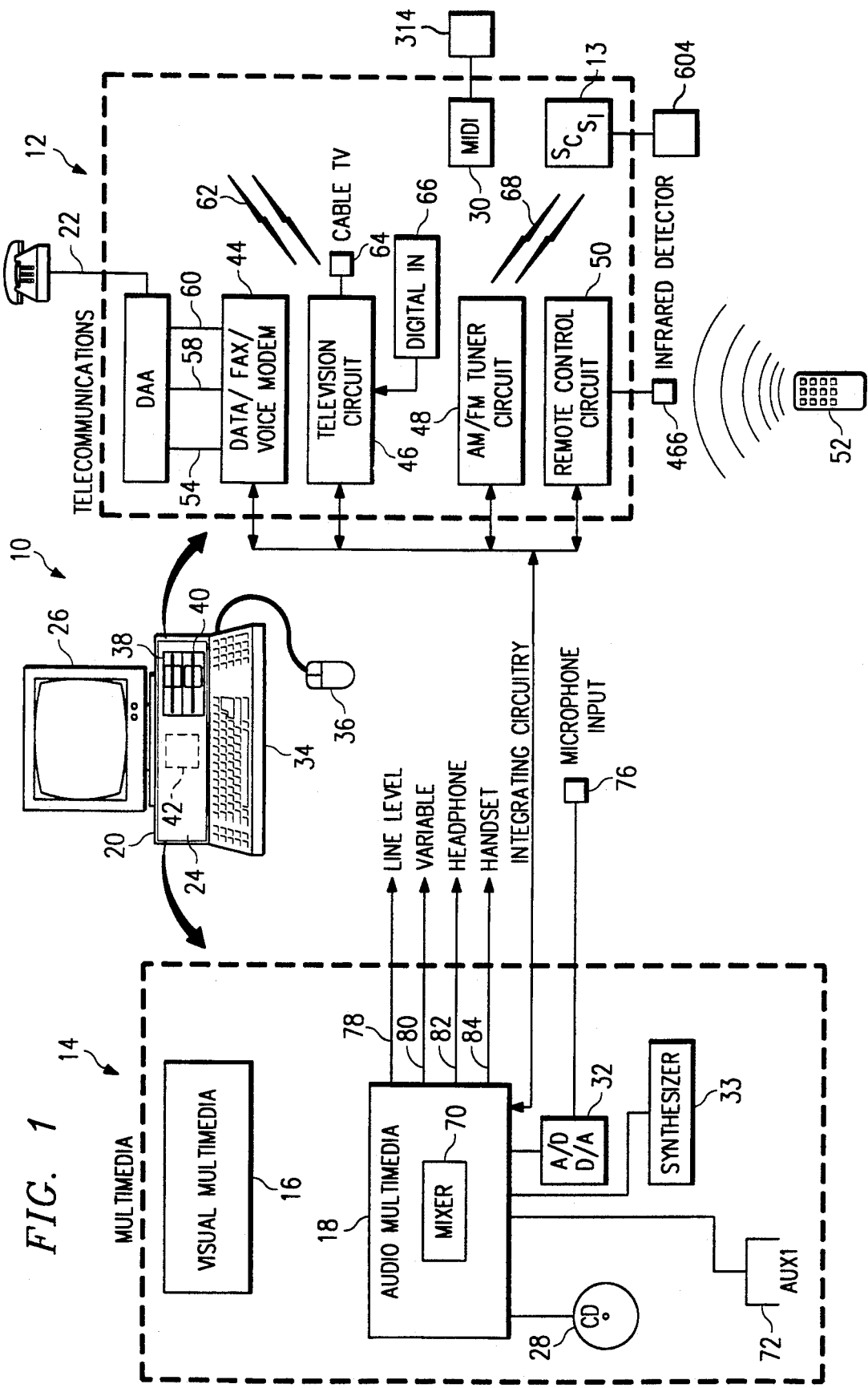
FIG. 1 illustrates a diagrammatic view of the multimedia computing and telecommunications workstation of the present invention.

FIG. 1 illustrates a diagrammatic view of the multimedia telecommunications workstation 10 of the present invention. The multimedia telecommunications workstation 10 combines telecommunications circuitry 12 and multimedia circuitry 14 in a single chassis 20. The workstation 10 makes possible operations integrating telecommunications circuitry 12 and multimedia circuitry 14 for a variety of business and entertainment purposes.

The workstation 10 of the present invention represents a significant improvement in electronic flexibility. It provides synergistic operation of a personal computer with a telecommunications network. The telecommunications circuitry 12 not only encompasses voice and fax telecommunications, but also encompasses the telecommunication of data signals. This permits the user to log telephone calls as they are being made and have the telephone calls linked into personal information manager software that may manage the user's business contacts. Moreover, the present invention can record actual conversations that the user makes over telephone line 22 as well as the time of call and other relevant data associated with the call. As a further example, conventional telephone systems have limited capacity for automatic dialing and storing of telephone numbers. By associating telecommunication circuitry 12 with host computer 24, the present invention significantly increases data storage capability to provide an on-line research capability to access the user's entire client base, for example, in real-time as a conversation takes place.

Another example of the synergism that the present invention affords is seen in the combination of the multimedia circuitry 14 with host computer 24 and telecommunications circuitry 12 for significant improvements in data communication to the user. For example, suppose that the user accesses a database stored in memory 42 on the life of the music composer, Beethoven. For this purpose, host computer 24 may contain one or more data files that include facts of Beethoven's life, video imagery describing Beethoven and his culture and surroundings, a catalogue of the different pieces he wrote, and digitally recorded files of his music. By using multimedia circuit 14, the present invention permits display of textual files and video imagery to monitor 26 or to a printer connection and audio files to audio multimedia circuit 18 for the circuit to play high resolution music from the composer. As a result, workstation 10 provides a significantly improved platform for delivering multimedia information to the user.

Yet another example of using workstation 10 of the present invention is the ability to receive video imagery from television circuit 46 and store the video image as a data file within memory 42 of host computer 24. Once stored as a data file, the video imagery may be communicated via telecommunications circuitry 12 or stored on a memory device through an external port from workstation 10.

One more example of using workstation 10 of the present invention is the ability to combine windowed video to monitor screen 26 so that the user may have a portion of the screen of monitor 26 occupied by a small windowed video image from television circuit 46 while at the same time performing word processing or receiving textual data at monitor screen 26. For applications such as monitoring financial news via a financial news network, while at the same time working with or receiving other financial data, the present invention can provide significantly improved data and information delivery to the user.

Referring more particularly to FIG. 1, telecommunications circuitry 12 of the present invention provides the user with the ability to send and receive computer data, facsimile transmissions and voice and audio sound over one or more conventional telephone lines 22. The user also has the ability to receive and record radio frequency and television signals using workstation 10. The radio and television signals may be recorded within workstation 10 and electronically connected to telephone line 22 for transmission as audio sound or digital data.

Multimedia circuitry 14 includes visual multimedia circuitry 16 and audio multimedia circuitry 18. Visual multimedia circuitry 16 includes a host computer 24 and monitor 26 for use with multimedia computer software algorithms to create a variety of visual images and video displays. Audio multimedia circuitry 18 includes compact disk read-only memory device (CD-ROM) 28, MIDI interface 30 (which actually provides a telecommunications port for multimedia digital sound inputs), analog-to-digital/digital-to-analog converter 32 for manipulating digital and analog signals, and sound synthesizer 33 for generating numerous synthesized sounds.

Host computer 24, in the preferred embodiment, is an IBM PC-AT compatible system with a 10 MHz 80286 or similarly equipped microprocessor. Host computer 24 may include a math coprocessor, and supports 1 to 16 MB of expandable random access memory. Input devices to workstation 10 may include keyboard 34, which in the preferred embodiment has 101 keys, and two button mouse 36.

Workstation chassis 20 is approximately 17"×17"×3.5" to combine a slim, low-profile look with a minimum footprint. As well as accommodating CD-ROM 28, chassis 20 may include 5.25", ½ height, 1.2 MB floppy drive 38, 3.5", ½ height, 1.44 MB floppy drive 40, and 3.5" 40 MB hard drive 42.

Telecommunications circuitry 12 within workstation 10 includes data/fax/voice modem circuit 44, television circuit 46, AM/FM tuner circuit 48, and remote control circuit 50. Host computer 24 provides digital control to all components within telecommunications circuitry 12. The user may control operation of host computer 24 for telecommunication purposes using keyboard 34 or mouse 36. Additionally, the user may communicate with host computer 24 using remote controller 52 through remote control circuit 50.

Data/fax/voice modem circuit 44 communicates via telephone line 22 to send and receive digital data signals 54, fax and voice signals 58 and audio signals 60. Television circuit 46 may receive video signals from broadcast television 62, cable television 64, or analog data input 66 from a video cassette recorder or video laser disk player. AM/FM tuner circuit 48 provides audio signals 68 to audio multimedia circuitry 18. Audio multimedia circuitry 18 may direct the signals 68 to various circuitry within workstation 10. For example, signals may be directed after digitization by A/D Converter 32 to host computer 24 for storage in memory or to data/fax/voice modem circuit 44 for sending on telephone line 22.

Figure 49:
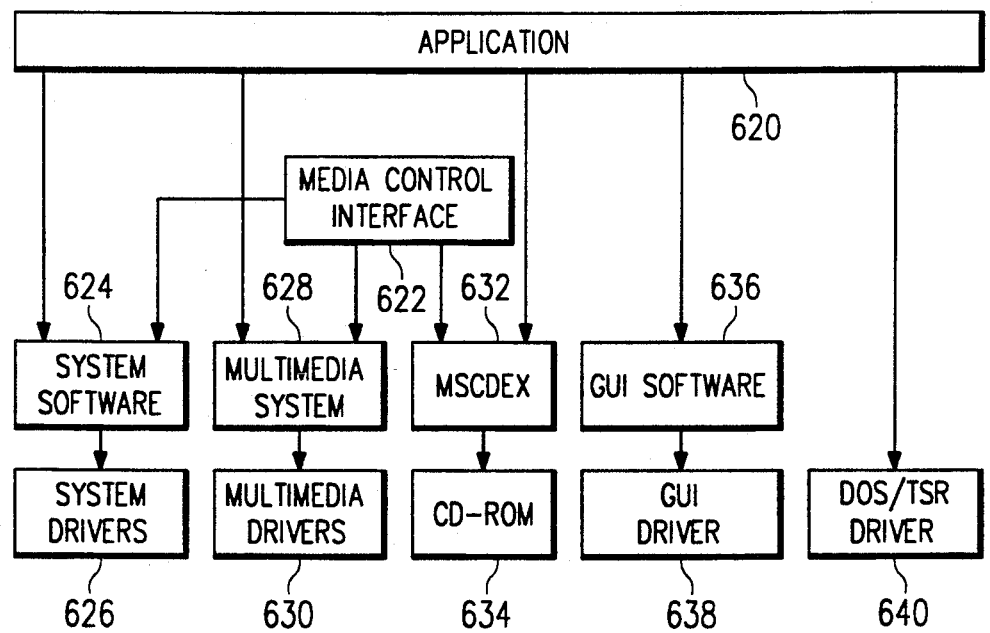
FIG. 49 provides a hierarchical chart of the application programs, libraries, and device drivers usable in the preferred embodiment of the present invention.

Host computer 24, operating in conjunction with installed multimedia software algorithms and television circuit 46, provides digital multimedia output to monitor 26. Monitor 26 generates a video graphics array (VGA) display that may encompass a wide assortment of video multimedia signals. FIG. 49 and associated text describes the various application programs and device drivers that are used in conjunction with the output from audio multimedia circuitry 18 of the present invention.

Host computer 24 also controls the audio signals of workstation 10 via audio multimedia circuitry 18. These signals include digital audio signals from CD-ROM 28, A/D-D/A converter 32, and sound synthesizer 33. To properly mix these signals, audio multimedia circuitry 18 comprises 7:1 mixer 70. 7:1 mixer 70 may also receive input from television circuit 46 and AM/FM tuner circuit 48. An auxiliary input, aux 1 72 may receive analog signals from external inputs, including audio cassette or additional VCR or television inputs. Audio multimedia circuitry 18 may also receive analog microphone signals from microphone input 76. Sound signals from audio multimedia circuitry 18 may be directed to selectable outputs such as line level audio 78, variable audio 80, headphone audio 82, or handset audio 84.

Figure 2:
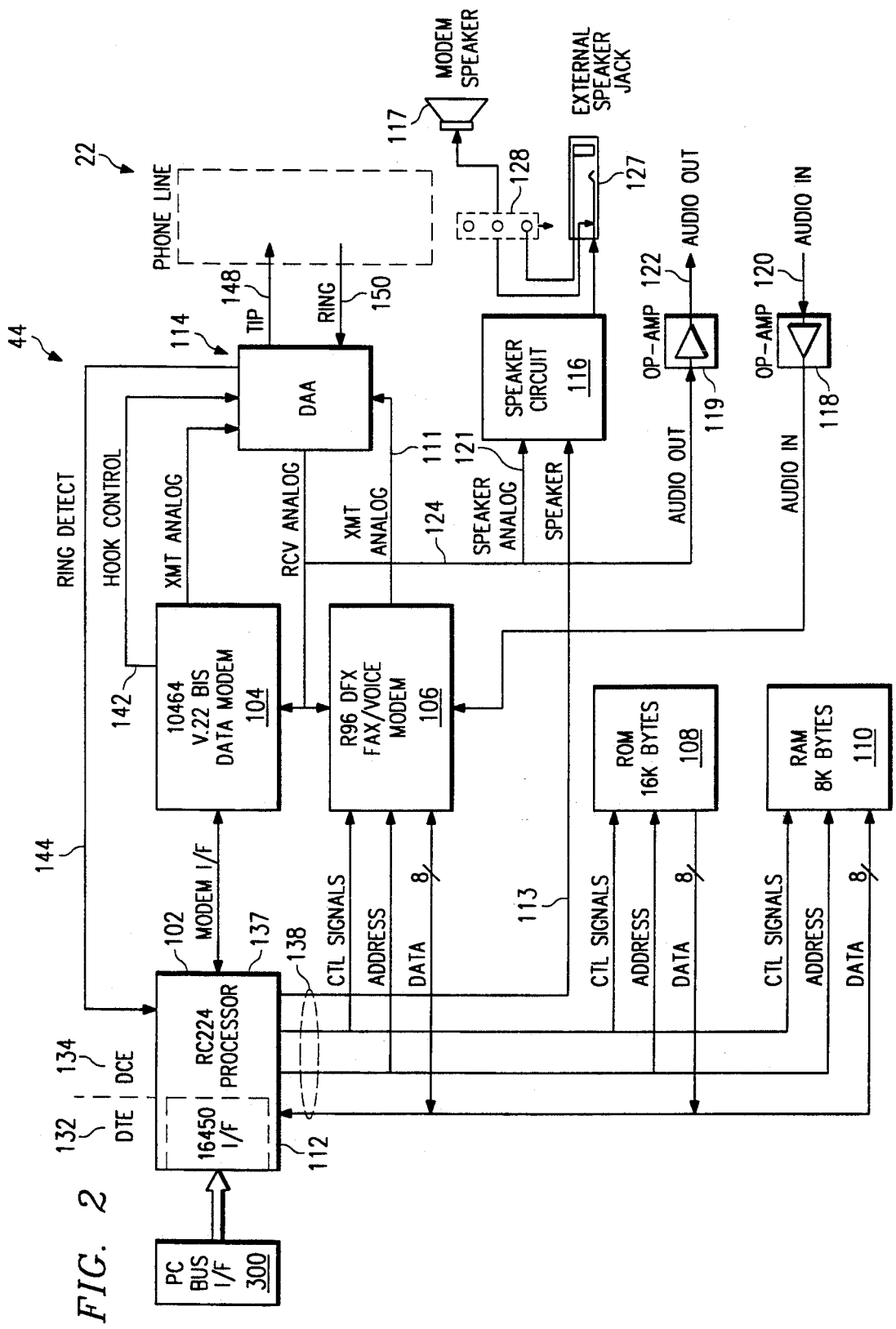
FIG. 2 shows a block diagram of data/fax/voice modem circuit of a preferred embodiment of the present invention.

FIG. 2 shows a block diagram of data/fax/voice modem circuit 44. Host computer bus interface 300 provides data and control signals to digital signal processor, RC224AT 102. Also in communication with RC224AT 102 for data, address, and control signal transmission are V.22 bis data modem 104, fax/voice modem 106, read-only memory device ROM 108, and random access memory device RAM 110. V.22 bis data modem 104 provides hook control and analog signals to DAA 114. The data modem 104 transmits an analog signal to the DAA circuitry 114. The data modem 104 receive analog signal originates from the DAA 114. DAA 114 outputs ring detect data via line 144 to RC224AT 102 and outputs analog received signals via analog signal line 124.

Fax/voice modem 106 transmits analog signals to DAA 114, receives audio signals from op amp 118 at audio input connection 120 for voice, and receives analog signals from DAA 114 for FAX modem. DAA 114 sends analog output signals to op amp 119 and the amplified signals go to external audio output connection 122. Additionally, speaker analog signal line 121 from DAA 114 connects to speaker circuit 116. Speaker circuit 116 may also receive speaker control signals from RC224AT 102. Output from speaker circuit 116 flows to an on board speaker 117 or optionally to chassis speaker 90 via connector 128, or to external speaker connection 127. DAA 114 connects to the tip line 148 and ring line 150 of telephone line 22.

Host computer bus interface 300 provides a communications path between data/fax/voice modem circuit 44 and host computer 24. Consequently, IBM PC-AT compatible Industry Standard Architecture (ISA) interface specifications define the technical requirements for host computer bus interface 300. The data/fax/voice modem circuit 44 is configured to appear to the host computer 24 as a communications circuit. Data/fax/voice modem circuit 44 may connect to one of the COM1, COM2, COM3 or COM4 ports of host computer 24 as provided in the ISA specification. Because the preferred embodiment uses COM1 and COM2 interfaces for other purposes with host computer 24 motherboard, either COM3 or COM4 are preferably used to connect data/fax/voice modem circuit 44.

Digital signal processor RC244AT 102 comprises a DTE (data terminal equipment) side 132 and a DCE (data communications equipment) side 134. DTE side 132 integrates a 16450 compatible interface. The DCE side 134 is connected to the IA10464 chip 104. The IA10464 chip 104 converts digital signals to analog signals and vice versa. The RC224AT processor includes an expansion bus 138 that permits connecting, for example, fax/voice modem 106, ROM device 108 and RAM device 110.

In the preferred embodiment, components of the data/fax/voice modem circuit 44 satisfy various important industry standards. For example, V.22 bis data modem 104 satisfies CCITT requirements, and is compatible with V.22 A/B, Bell 212A, Bell 103 and supports the Hayes "AT" 2400B command set. Fax/voice modem 106 facsimile portion satisfies the CCITT V.29, V.27 ter, T.30, V.21, T.4 and Group 3 requirements for facsimile transmit/receive with class I software support. The voice portion of fax/voice modem 106 has the ability to perform voice mode transmit/receive with DTMF generation/reception and is connected with an 8 kilobyte RAM for data buffering.

The V.22 bis data modem 104 includes necessary circuitry for associating IA10464 chip 104 with DAA (Data Access Arrangement) interface 114. Other pertinent details respecting V.22 bis data modem 104 are provided below in connection with the description of its schematic diagram. V.22 bis data modem 104 operates in a full duplex mode for the transmission of data.

Fax/voice modem 106, in the preferred embodiment, is an R96DFX, manufactured by Rockwell International for both facsimile and voice modem capabilities. The R96DFX chip supports a CCITT standard T.30 or T.4 type interface, and contains firmware to produce discrete packets of digital information. Fax/voice modem 106 transmits this digital information to DAA 114 in a half duplex operation mode.

Receive data on line 124 from DAA 114 is connected to the V.22 bis data modem 104 and fax/voice modem 106. Only one modem receives at a time. When V.22 bis data modem 104 is selected to receive, for example, fax/voice modem 106 sits idle, and vice versa. Switching between V.22 bis data modem 104 and fax/voice modem 106 may be performed by the operator through host computer 24 control to data/fax/voice modem circuit 44 Transmit analog signals come from each modem depending on the modem that the operator enables.

Fax/voice modem 106 produces digitized data from the voice signals it receives, and produces audio signals from digital data files. This permits a user to play back a recording for transmission across telephone line 22. ROM 108 in data/fax/voice modem circuit 44 stores necessary data to perform these functions. A portion of ROM 108 is also allocated to support necessary memory functions for the fax/voice modem 106 interface with the remainder of data/fax/voice modem circuit 44.

The voice data is sampled at a sample frequency of 9600 samples per second. Because of the amount of data that sampling at 9600 samples per second generates, data compression is necessary. A compression algorithm, ADPCM (i.e., Adaptive Differential Pulse Code Modulation), is used to compress and decompress data for these purposes. Using ADPCM algorithm reduces the amount of data that needs to be stored or played back. The ADPCM algorithm can be used to decompress previously compressed data for playing a message or to compress data to record a message. Thus firmware contained in ROM 108 may act with the host software to move a block of compressed data from memory to generate an outgoing message and then record an incoming message. This permits workstation 10 to act as a telephone answering machine.

Because the ADPCM algorithm compresses a large amount of data, however, it is necessary to temporarily store the uncompressed data. RAM 110 holds the uncompressed blocks of data in temporary storage for this purpose. The data/fax/voice modem circuit 44 circuitry uses part of the nonvolatile memory to store user configurations and phone numbers.

DAA 114 complies with 15 C.F.R. 68, which specifies the electrical circuitry requirements for interfacing telephone lines. DAA 114 permits the data/fax/voice modem circuit 44 connections to telephone line 22 to satisfy these telephone requirements. In the preferred embodiment, DAA 114 is wet transformer-based, requiring a small DC current to activate the transformer. The DC current is generally taken from telephone line 22. The DAA 114 transformer is a 600 $\Omega$-to-600 $\Omega$, 1-to-1 current transformer. DAA 114 includes a voltage suppressor circuit, hook control line 142, and ring detect line 144.

Hook control line 142 and ring detect line 144 are basic to the DAA 114 interface Hook control line 142 generates an on/off hook signal to report the status of the connection with telephone line 22.

The data/fax/voice modem circuit 44 also contains audio input connection 120 and audio output connection 122. These communicate analog signals between other portions of the telecommunications circuitry 12 and the audio multimedia circuitry 18 and the data/fax/voice modem circuit 44. This permits the user to direct a message that is recorded or being recorded from data/fax/modem circuit 44 to audio multimedia circuitry 18 for playing on the workstation 10 chassis speaker 90.

As an additional example, the microphone input 76 of audio multimedia circuitry 18 may be switched into the telecommunications circuitry 12 through audio input connection 120. This provides an auxiliary input, such as a microphone signal, to go to fax/voice modem 106 and out to telephone line 22. This permits the data/fax/voice modem circuit 44 to join with the audio multimedia circuitry 18 to provide the user with a high-quality speaker telephone having many functional capabilities heretofore not available.

Tip line 148 and ring line 150 provide a telephone line 22 interface for DAA 114. In these two lines, current flows in a closed-loop for telephone line 22 communications. Receive data line 124 takes the same signal that may go to the audio output connection 122 and directs it to the speaker circuit 116. Speaker circuit 116 is controlled by Hayes A/T command set to permit the user to turn the speaker on and select three different volume levels: low, medium and high. The preferred embodiment also permits the user to plug in an external speaker to the speaker line at external speaker connection 127.

Figure 3:
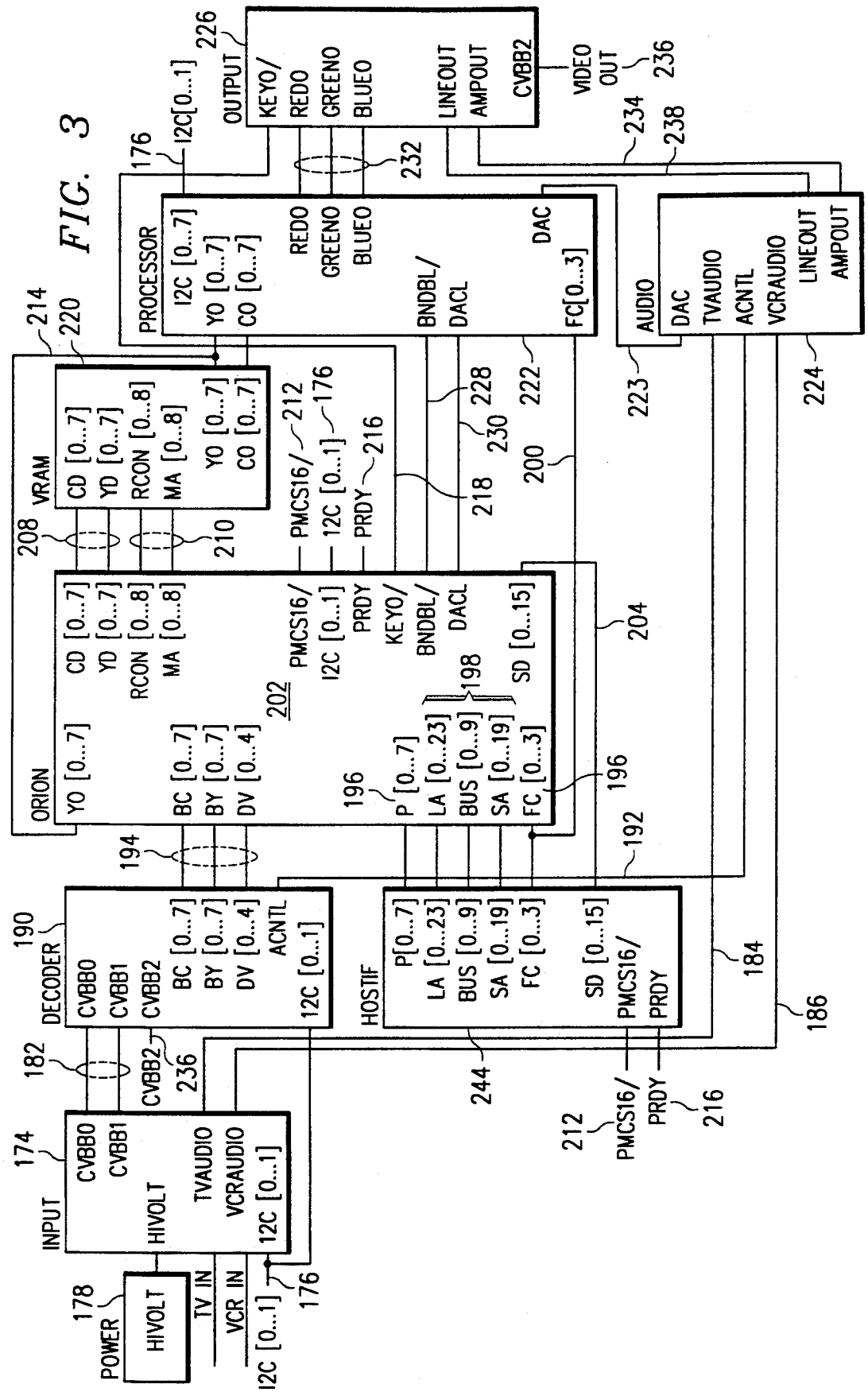
FIG. 3 provides a block diagram of television circuit of a preferred embodiment of the present invention.

FIG. 3 provides a block diagram of television circuit 46 of a preferred embodiment of the present invention. Input circuit 174 includes a cable-ready TV tuner circuit and an input from an external video source. Input circuit 174 is powered by an independent high voltage circuit 178. Input circuit 174 is connected to decoder 190 and Orion 202 via I²C ® bus 176. The I²C ® bus 174 provides for programmed control of the major components of television circuit 46. In particular, in the input circuit it provides for channel selection of the tuner circuit. I²C ® bus is a patented bus structure owned by Phillips Corporation.

Coming from input circuit 174 are CVBB0 and CVBB1 signals 182, TV audio signal 184 and VCR audio signal 186. The signals on lines 182 for CVBB0 and CVBB1 go to decoder 190. Output from decoder 190, includes analog control signal, ANCTL 192, and decoded video signals 194. In addition to signals 194 of BC, BY and DV from decoder 190, P and FC signals 196, I²C ® bus 176, and bus, SA, and LA signals 198 go to Orion 202. FC line 200 also connects to processor 222. Also, SD line 204 connects to Orion 202.

Orion 202 provides output signals RCON and MA 210 to VRAM 220 and CD and CY signals 208 to VRAM 220. PMCS16/signal 212 feeds from Orion 202 into host interface 244. Also, PRDY signals 216 from Orion 202 goes to host interface 244. Finally, BNDBL and DACL signals from Orion 202 feed to processor 222. Video processor 222 outputs include I₂C ®, signals to Orion 202 and REDO, GREENO and BLUEO signals 232 to output 226 and DAC signals 223 to audio circuit 224. Output circuit 226 receives REDO, GREENO and BLUEO signals 232, KEYO signals 218, LINEOUT signals 238, and AMPOUT signals 234 and transmits video signals 236 to VGA monitor 26. Audio output circuit 224 receives digital analog control signals 223, TVAUDIO signal 184, analog control signal ACNTL 192 and VCRAUDIO signal 186 to generate LINEOUT signal 238 and AMPOUT signal 234, as previously stated.

Television circuit 46 is an IBM PC-AT compatible single slot add-in circuit that is placed on an add-in card that integrates full motion video and audio with personal computer 24. Computer 24 is required to have a VGA or SVGA graphics card and analog black and white or color monitor. A user provides a video source like an antenna or VCR to the card which transforms the incoming video signals onto monitor 26 display, mixing the new video with the traditional PC display.

Attributes of the input image such as channel, image size, cropping, color, contrast, volume are varied via the computer through the user interface programs. TV circuit 46, in addition to providing live video, is a high-resolution true-color still image display and capture card. Vivid still images may be displayed on the video monitor 26, mixed with video signals from host computer 24, and saved to a disk for less cost than with known circuitry. This feature makes applications such as teleconferencing over a local area network possible. Television circuit 46 provides a user accessibility to live video and high quality still images through an easy to use computer interface.

Hardware of television circuit 46 is configured to run under DOS, or a graphical user interface software package, such as Windows 3.0 or Multimedia Windows. Possible uses for television circuit 46 include, video tape training, interactive software with video laser disk connection, sales kiosk, full speed teleconferencing using dedicated cabling, and reduced frame rate video phone conferencing over a local area network. Additionally, uses such as security monitoring, in-office reception of presentations and classes and television news, financial network monitoring, and entertainment are also possible using television circuit 46 in the preferred embodiment of the present invention.

The motion video signal may be of two formats: baseband NTSC and RF modulated NTSC. In other words, the user may plug in a VCR, camcorder, laser video disk player, antenna, cable TV or any signal compatible with these. There is also an audio input which would come from a VCR type device. Host computer 24 video from a VGA circuit may also be input to television circuit 46, as well as internal digital color information from a host computer 24 graphic card. The mixed video is output to an analog monitor, such as VGA monitor 26. In the preferred invention, audio is fed through audio multimedia circuit 18 and output to chassis speakers. Television circuit 46 may also be used independently with an onboard amplifier that outputs to a speaker. Digital still image data may be loaded into television circuit 46 from host computer 24. This data may be a picture from a multimedia application and may come from an electronic mail or local area network.

Also, in association with television circuit 46 of the present invention may be circuitry for full speed teleconferencing of telephone signals and video images using a dedicated cable network. A video telephone circuit may also be supported using the combination of television circuit 46 and data/fax/voice modem circuit 44 over a local area network.

Figure 4:
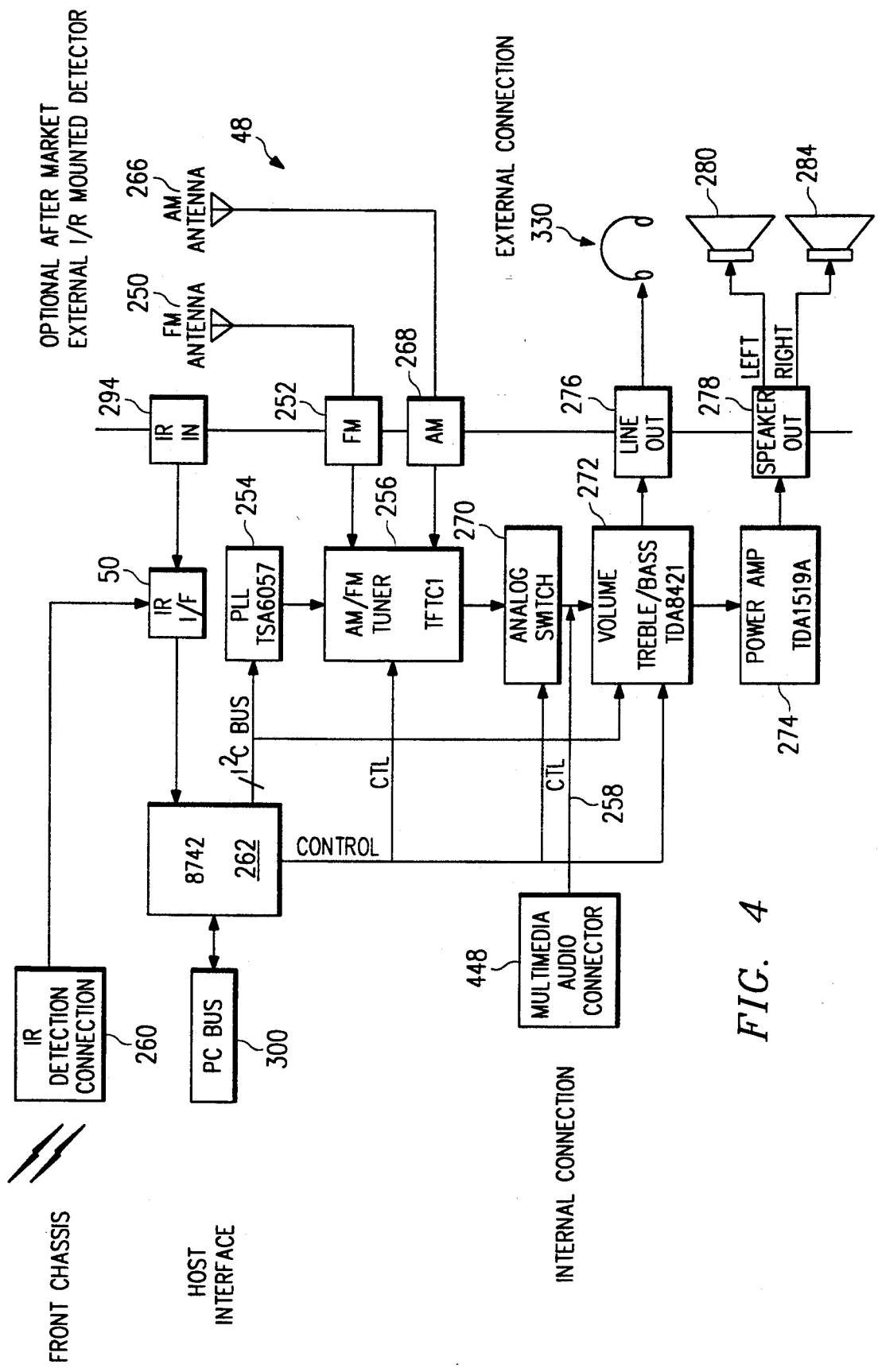
FIG. 4 illustrates a block diagram of the circuit that combines the AM/FM tuner circuit and infrared remote control circuit portions of the telecommunications circuitry of the present invention.

FIG. 4 illustrates a block diagram of the circuit that combines the AM/FM tuner circuit 48 and infrared remote control circuit 50 portions of the telecommunications circuitry of the present invention.

For receipt of AM/FM radio transmissions, FM antennae 250 and AM antennae 266 mount to chassis 20 and connect to antennae connections 252 and 268, respectively. Antennae connections 252 and 268 provide radio frequency signals to AM/FM tuner 256. PLL frequency synthesizer 254 receives frequency input commands from 8742 programmable 8-bit processor 262 and controls the tuning of AM/FM tuner 256.

AM/FM tuner 256 sends audio data to audio bus connection 258 via analog switch 270. Analog switch also receives control signals from 8742 processor 262 and provides line level audio to multimedia audio connector and volume circuit 272. Volume circuit 272 also receives I26 bus signals and control signals from 8742 processor 262. Outputs from volume circuit 272 go to power amp 274. Power amp 274 drives speaker out connection 278. Line out connection 276 goes to head phones 330. Speaker out 278 signals go to speakers 280 and 284. Also communicating with 8742 processor 262 is remote control circuit 50. The 8742 processor 262 interfaces host computer 24 at host bus 300 for control and data transmission.

AM/FM tuner circuit 48 includes AM/FM tuner 256 capable of both preset and manual tuning. Seek and scan functions may be programmed into AM/FM tuner 256 for AM and FM channel selection. AM/FM tuner 256 provides a readable lock signal once a frequency is detected and reports this information to 8742 programmable 8-bit processor 262.

The AM/FM tuner 256 consists of the AM and FM sections that are controlled by external tuning voltages. Selection of AM or FM activates an appropriate tuning voltage, FMVCC or AMVCC, and the off switch disables both Vcc supplies. In the preferred embodiment, AM/FM tuner 256 is a TFTCI tuner module manufactured by ALPs. AM/FM tuner PLL frequency synthesizer 254 generates a tuning voltage for a given station (AM or FM) based on the phase difference between the PLL reference frequency and AM/FM tuner 256 frequency. This tuning voltage difference controls the AM/FM tuner 256 frequency. When the PLL frequency synthesizer 254 and AM/FM tuner 256 are in phase, the tuning voltage remains at a fixed level and the tuner is "locked." When the PLL synthesizer 254 and local oscillator in tuner 256 are not in phase, tuning voltage is adjusted to change the AM/FM tuner 256 frequency and bring the AM/FM tuner 256 back into a "locked" condition. Based on control signals from 8742 programmable 8-bit processor 262, host computer 24 loads PLL frequency synthesizer 254 with the frequency to which it must lock.

Remote control circuit 50 for workstation 10 utilizes infrared signal transmission to permit device and channel selection. Device selection may include, for example, television circuit 46, AM/FM tuner circuit 48, CD-ROM 28 from audio multimedia circuitry or data/fax/voice modem circuit 44 and telephone line 22. Remote control circuit 50 may also control the MIDI 30 of telecommunications circuitry 12 and permit the user to program answering machine functions through data/fax/voice modem circuit 44. Additionally, remote volume control of various sound sources from workstation 10 is possible using the remote control device. Channel selection may also occur within a particular device selection, such as channels for television, radio channels, or compact disk channels.

During operation, the 8742 programmable 8-bit processor 262 controls host interface 300 for remote control functions as well as for AM/FM frequency tuning functions explained above. The 8742 programmable 8-bit processor 262 constantly samples the infrared detector for unique coded values that control operation of the interface. The 8742 maintains a 64-byte FIFO for multiple keystrokes and interrupts the host computer 24 for servicing.

Figure 5:
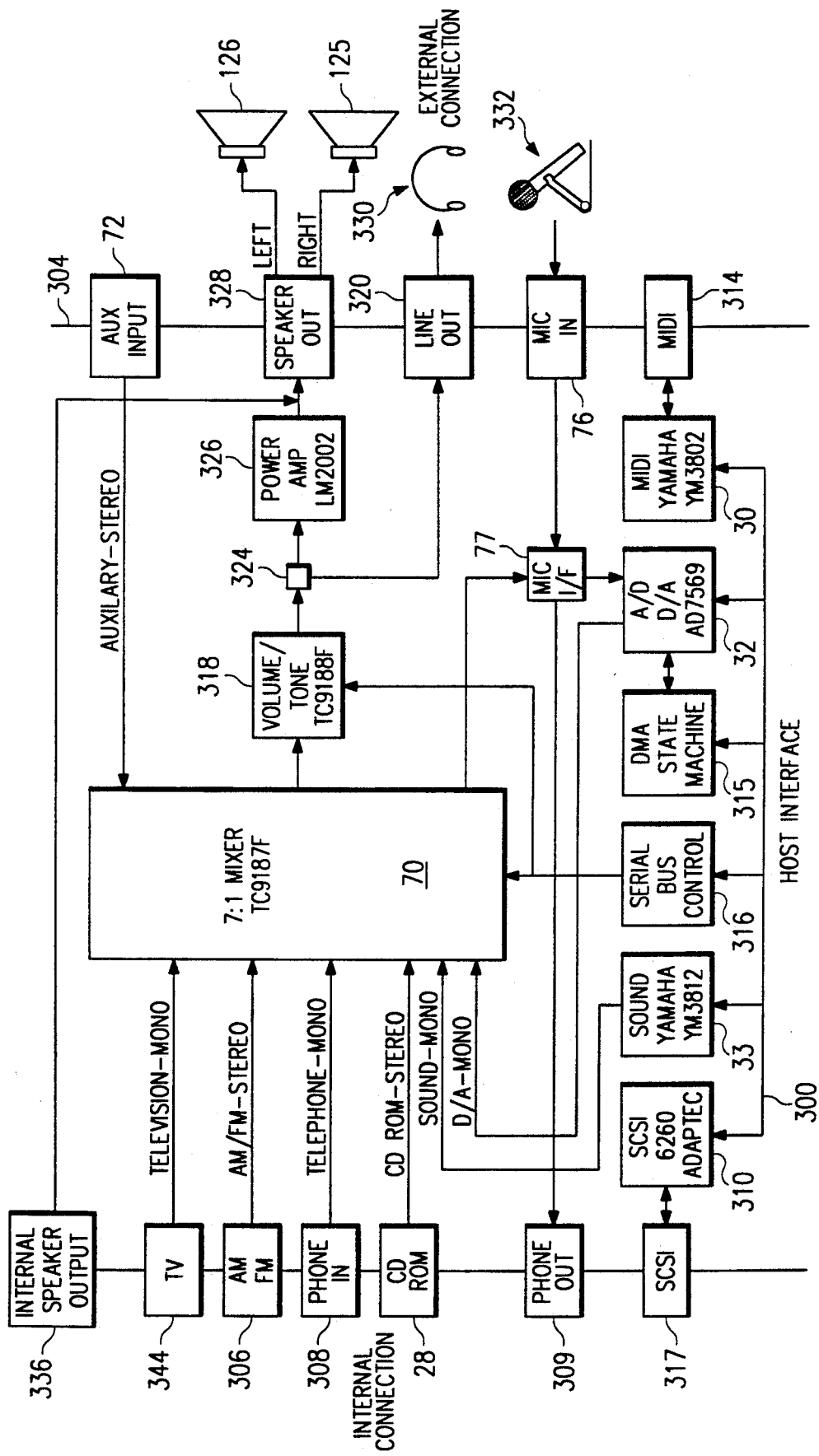
FIG. 5 illustrates a block diagram of an audio multimedia circuitry that performs the multimedia functions for the preferred embodiment of the present invention.

FIG. 5 illustrates a block diagram of an audio multimedia circuitry that performs the multimedia functions for the preferred embodiment of the present invention. Multimedia facilities available to the user include an audio CD player, an audio control center, a digital audio recorder, a music synthesizer, and on-board analog audio mixing capabilities. The audio multimedia portion of the multimedia communications workstation comprises a CD-ROM and the audio multimedia board.

Referring to FIG. 5, the block diagram illustrates the connection of host computer 24 interface 300 between internal connections 302 and external connections 304. Internal connections include a connection 344 from the audio portion of television circuit 46, connection 306 from AM/FM tuner circuit 48 and telephone connections 308 and 309 from Data/Fax/Modem 44. These connect directly to 7:1 mixer 70. SCSI interface 310 communicates through SCSI internal connection 317. MIDI interface connector 314 provides an external communication path via external connections 304 to Musical Instrument Digital Interface (MIDI) 30.

Along with inputs from AM/FM tuner circuit 48 and Data/Fax/Modem 44, 7:1 mixer 70 receives inputs from sound synthesizer 33, A/D-D/A converter 32, CD-ROM 28, aux input 72, TV Tuner 46 and serial bus controller 316. Output from 7:1 mixer 70 goes to volume/tone control circuit 318, which also receives direct input from serial bus controller 316. Volume/tone controller 318 inputs to line out connection 320 for headset connection 330 via switch 324. Alternatively, from switch 324 volume/tone control output goes to power amplifier 326. Speaker output 328 receives output and transmits speaker signals to external speakers 125 and 126 or internal chassis speaker 90 via connector 336.

A/D-D/A converter 32 receives input through microphone input 76 and via microphone interface 77 from microphone 332, or mixer 70, as well as input from host computer interface 300.

Sound synthesizer 33 for audio multimedia circuitry 18 provides realistic sound from workstation 10. The preferred embodiment of the audio multimedia circuitry 18 uses as sound synthesizer 33 a Yamaha YM3812 device that may operate in three voicing modes. The first mode comprises a nine sound simultaneous voicing mode; the second mode utilizes six melodies and five rhythm sound voicing modes. The five rhythm sound voicing modes include a bass drum, a snare drum, a tom-tom, a top symbol and a high-hat symbol. The third voicing mode utilizes a composite sine wave speech synthesis mode. Sound synthesizer 33 also comprises a built-in low frequency oscillator for vibrato and AM effects. Sound synthesizer 33 utilizes software that is compatible with AdLib ® and Sound Blaster ® hardware.

The 8-bit D/A-A/D converter 32 performs linear PCM sampling. Sample rates from 1 kHz to 48 kHz are available for DMA or programmed I/O data transfer. An interrupt is provided for buffer management. DMA state machine 315 runs the data handling for A/D-D/A converter 32. It provides synchronized data transfer capabilities without processor intervention. Analog input to A/D-D/A converter 32 is connected from microphone input 76 or mixer 70. Microphone input 76 mounts on the rear panel of the chassis to allow audible interaction between the user and audio multimedia circuitry 18. Microphone input 76 may also interface one input of audio switch 334 through voltage controlled amplifier 336.

The SCSI interface 310 provides DMA transfer of 8-bits and PIO transfer of 16-bits with interrupts to control the CD-ROM 28. Data transfer rates with the SCSI interface 310 are up to 4 MBs per second. SCSI interface 310 includes a 128-byte FIFO and a SCSI bus with an 8-byte FIFO. In the preferred embodiment of the present invention, the SCSI interface utilizes a controller manufactured by Adaptec, known as the Adaptec AIC-6260 SCSI controller. This is a second generation SCSI controller with automatic selection and reselection of SCSI sequences which are performed by hardware to reduce the host processor intervention during SCSI device activity. The SCSI controller for CD-ROM use, etc. includes a connector for an external SCSI device and a header for a CD-ROM. The SCSI interface of the preferred embodiment may support up to seven SCSI devices, including asynchronous and synchronous SCSI devices. The Adaptec AIC 6260 SCSI controller utilizes software available from Adaptec for DOS, OS/2 and UNIX environments and software drivers.

The CD-ROM 28 at internal connection bus 302 and mounted on chassis 20, is capable of sustaining full-bandwidth data transfer from the CD-ROM to main memory of the host processor. The CD-ROM drive of the multimedia processing circuitry of the present invention includes a controller circuit and cabling. The CD-ROM drive includes a 64K buffer, with a 1 second seek time, capable of sustained 150 KB/second data transfer rate and is made reliable to a level of 10,000 hours mean time between failures.

Musical Instrument Digital Interface (MIDI) 30 may associate with various musical instruments capable of generating electronic signals. The MIDI interface comprises three connectors: a MIDI-in, a MIDI-out, and a MIDI-through connector. The device contains integral FIFO, 128-byte receive and 16-byte transmit capability, and includes timer/counters for MIDI interface operations. Software to support the MIDI 30 is available through many sources including Voyetra Technologies of Pelham, N.Y.

The MIDI in/out/through port connection 314 of audio multimedia circuitry 18 allows connection to external MIDI devices and offers a simple interconnection with other workstations for a variety of purposes, including synchronization or telecommunication.

The multimedia functions of the present invention use the Multimedia Windows ® operator interface program to provide support for digital audio and synthesized music, and other multimedia functions. The Multimedia Windows software has support for 256 color, high resolution images on a standard VGA display.

Audio multimedia circuitry 18 also permits stereo auxiliary input for user convenience through aux 1 72. This permits the user to integrate other audio sources as an element of a multimedia presentation. Such sources may include another CD player, a cassette player, a VCR or video disk.

Analog mixing control for audio multimedia circuitry 18 is provided by 7:1 mixer 70. The 7:1 mixer 70 supports up to 7 analog input signals and allows selection for a combination of inputs. The inputs may include stereo input from CD-ROM 28, monaural input from an A/D-D/A converter 32, monaural input from a sound synthesizer 33, stereo input from AM/FM tuner circuit 48, monaural audio input from television circuit 46, stereo input from aux 1 72 connection, and monaural input from telephone line 22 via data/fax/voice modem circuit 44. Serial bus controller 316 controls the 7:1 mixer 70 in connecting the various inputs it receives.

Master volume/tone control 318 has selectable controls operable through software, i.e. adjustable volume, bass and treble levels and line/headphone fader control. Switch 324 includes buffered amplifiers for buffering the line output. Audio power amplifier 326 provides up to 2 watts/channel.

Figure 6:
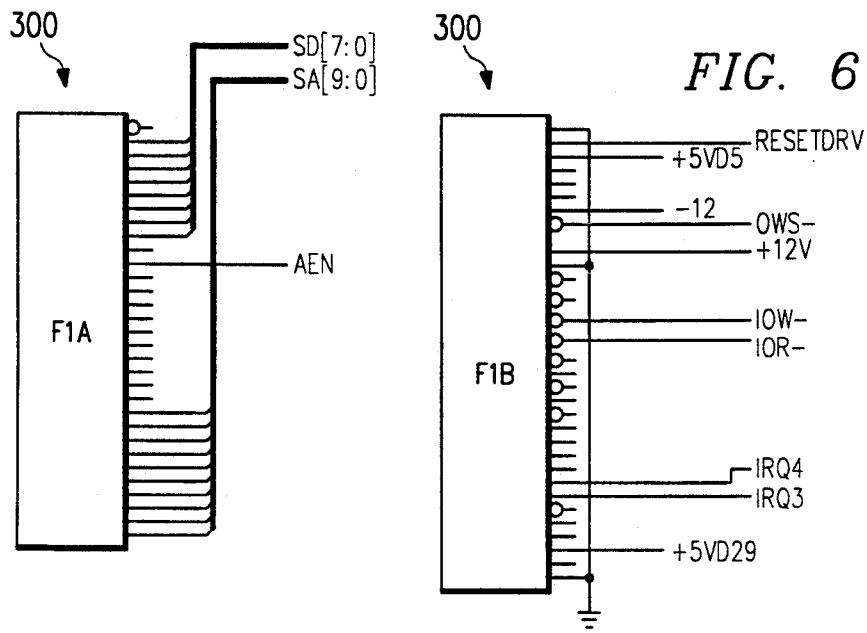
FIGS. 6 through 12 illustrate detailed schematic diagrams the data/fax/voice modem circuit that comprises part of the telecommunications circuitry of the present invention.

FIGS. 6 through 12 illustrate schematic diagrams of significant components of data/fax/voice modem circuit 44 that comprise part of the telecommunications circuitry 12 of the present invention. In particular, FIG. 6 shows the host computer bus interface 300 and provides the signal definitions necessary for the data/fax/voice modem circuit 44 to interface with the ISA-type host computer 24 bus. Data and control registers and bit assignments for the modem circuit 44 are compatible with the industry standard 16450 UART.

Figure 7:
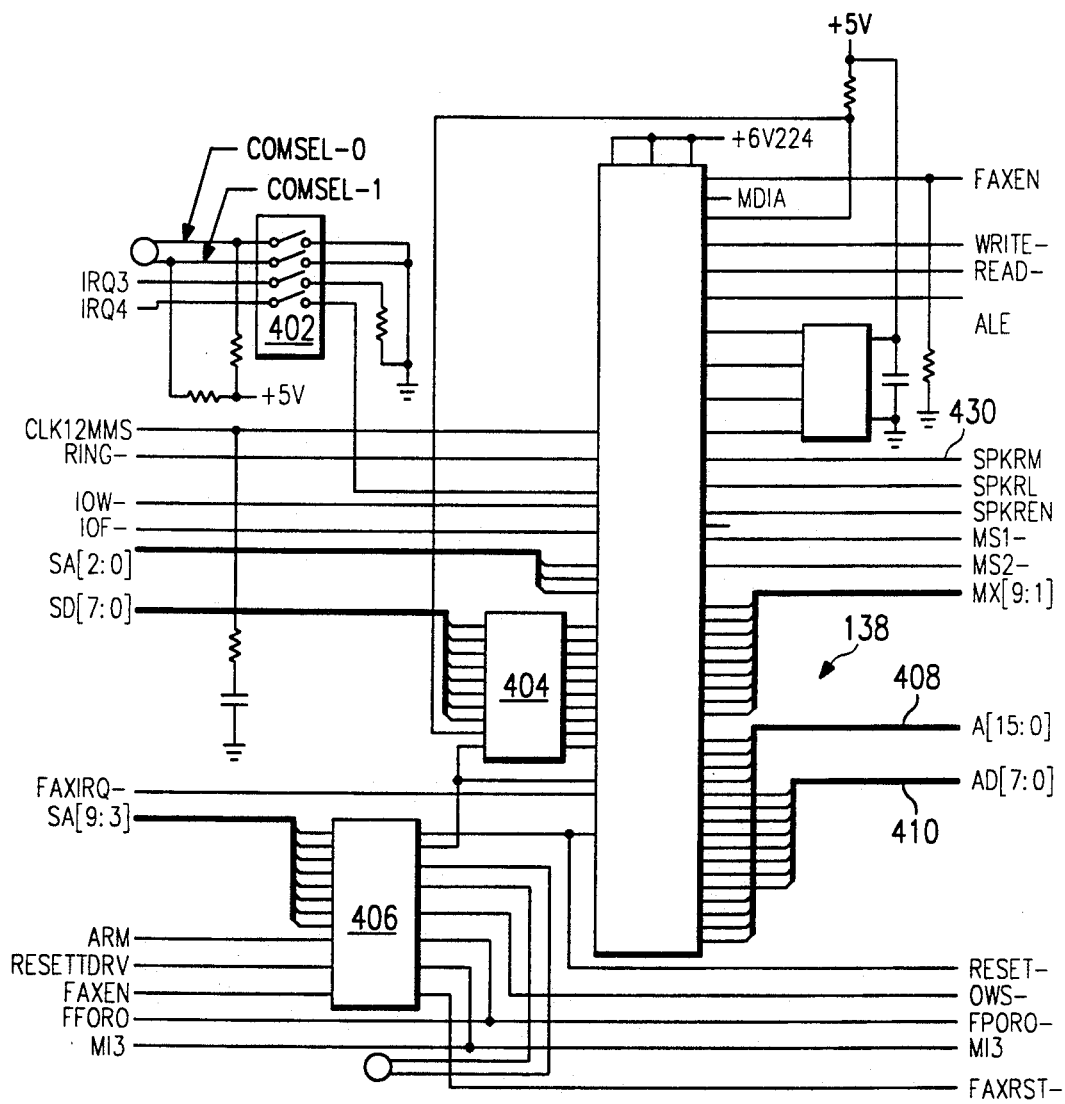

FIG. 7 illustrates how address selection and interrupt selection is made by a dip switch 402. Table 1 shows how to select the communication ports COM1, COM2, COM3 and COM4 to interface data/fax/voice modem circuit 44.

Data buffer 404 buffers the data lines from the host computer 24 bus, and decode circuit 406 decodes the address information.

The RC224AT/2 102 is the primary bus interface for data/fax/voice modem circuit 44. RC224AT/2 102 connects to the ISA-type host computer 24 bus interface 300. From the RC224AT/2 processor lines MI 9 through 1 communicate control signals. Address lines include A [15:0] and data lines include lines AD [7:0]. Speaker control signals come from lines 430 to the speaker external connection 127. For example, the speaker interface portion of RC224AT/2 102 includes a number of internal registers for determining whether or not to turn speaker on or off when the data/fax/voice modem circuit 44 is energized.

If the user desires to have the recording portion of data/fax/voice modem circuit 44 active or not active, the user can store this configuration. There are several different types of commands which can be set to preload configurations when workstation 10 is initially turned on. The configuration is determined by the user.

The expansion bus 138 address bus and expansion bus data bus lead from RC224AT/2 102. The expansion data bus is multiplexed with the address lines to save pins. A cycle takes place for reading the address and data bits from expansion bus 138. On the first part of the cycle, address bits are latched to extract address information. On the second part of the cycle, data bits are sampled for data.

Figure 8:
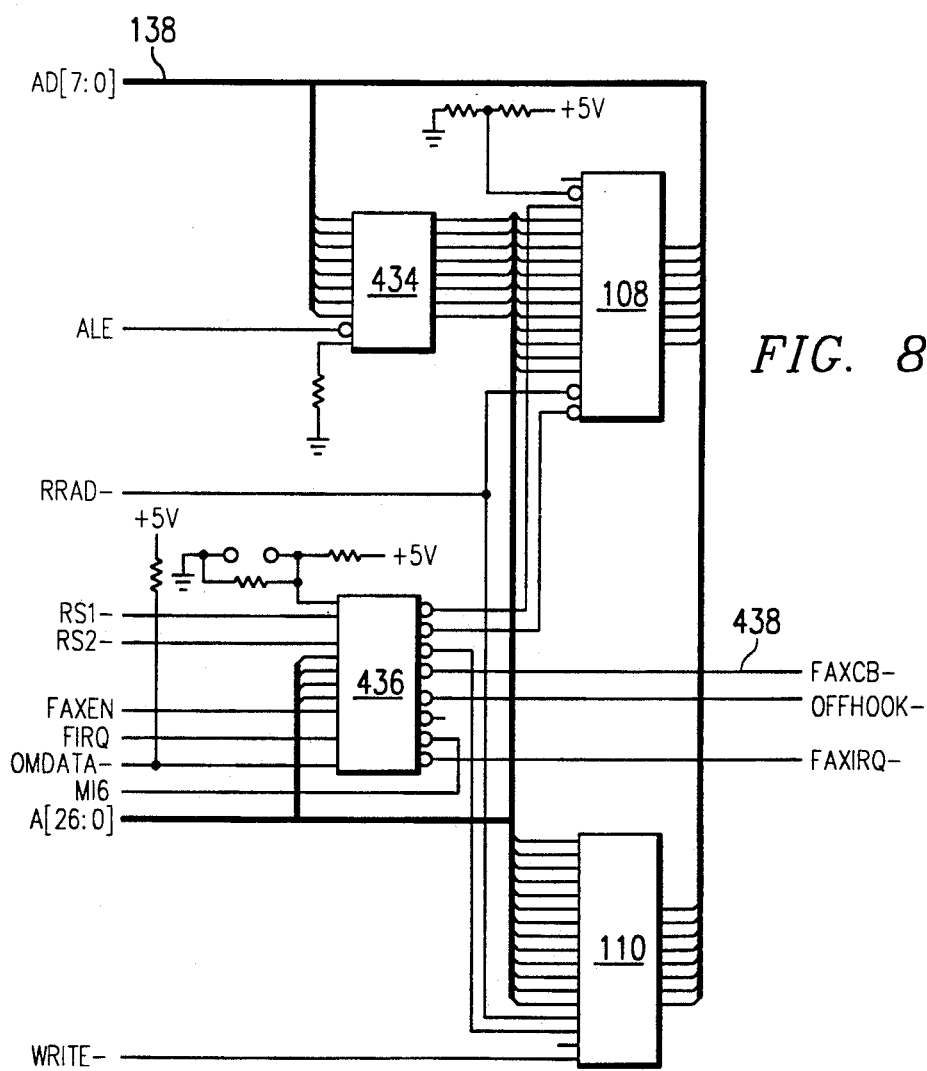

Expansion bus interface 138 for communicating address and data bits from RC224AT/2 102 is shown in FIG. 8. Referring to the address lines A [15:0] 408 and data lines AD [7:0] 410, expansion bus interface 138 includes a 74LS373 434 which latches the address at the first part of the cycle. After this occurs, the data lines AD [7:0] are now free to transfer data.

The expansion bus interface PAL 436 decodes the address ranges for ROM 108 accesses, RAM 110 accesses, or fax/voice modem 106 accesses.

Figure 9:
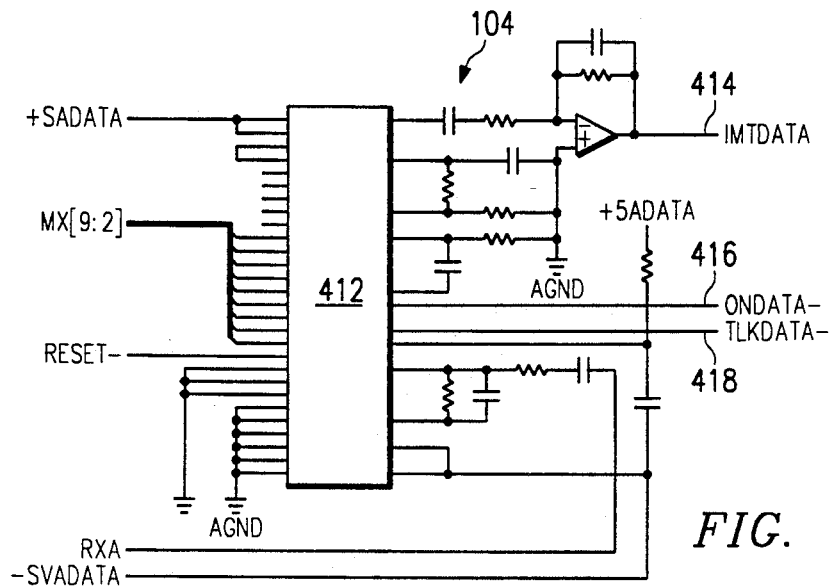

FIG. 9 illustrates data modem 104 which comprises IA10464 chip 412 for integrated analog functions to support the MI [9:1] lines coming from the RC224AT. The IA10464 chip 412 has D/A converters and A/D converters to generate DTMF tones for the data modem in a modulation sequence to support CCITT V.22 BIS standards. The necessary hardware and code for these functions are embedded in IA10464 chip 412.

The IA10464 chip 412 includes transmit data line, XMTDATA 414, off-hook control line, OHDATA 416 and talk data control line TLKDATA 418. The OHDATA 416 indicates whether or not telephone line 22 is connected to the modems. The TLKDATA 418 indicates whether an external telephone is switched in or out. Normally, most users will use only one telephone line 22. The IA10464 chip 418 permits the user to connect telephone line 22 so that when data modem 104 and fax/voice modem 106 are not in use, the telephone signal passes through the circuit. This permits the telephone line 22 to operate as a normal telephone line. On the other hand, when using the modem capabilities of data/fax/voice modem circuit 44, either data modem 104 or fax/voice modem 106 takes over to switch out the phone. Therefore, if data modem 104 or fax/voice modem 106 operations take place in workstation 10, the telephone line 22 cannot be used for telephone conversations.

Figure 10:
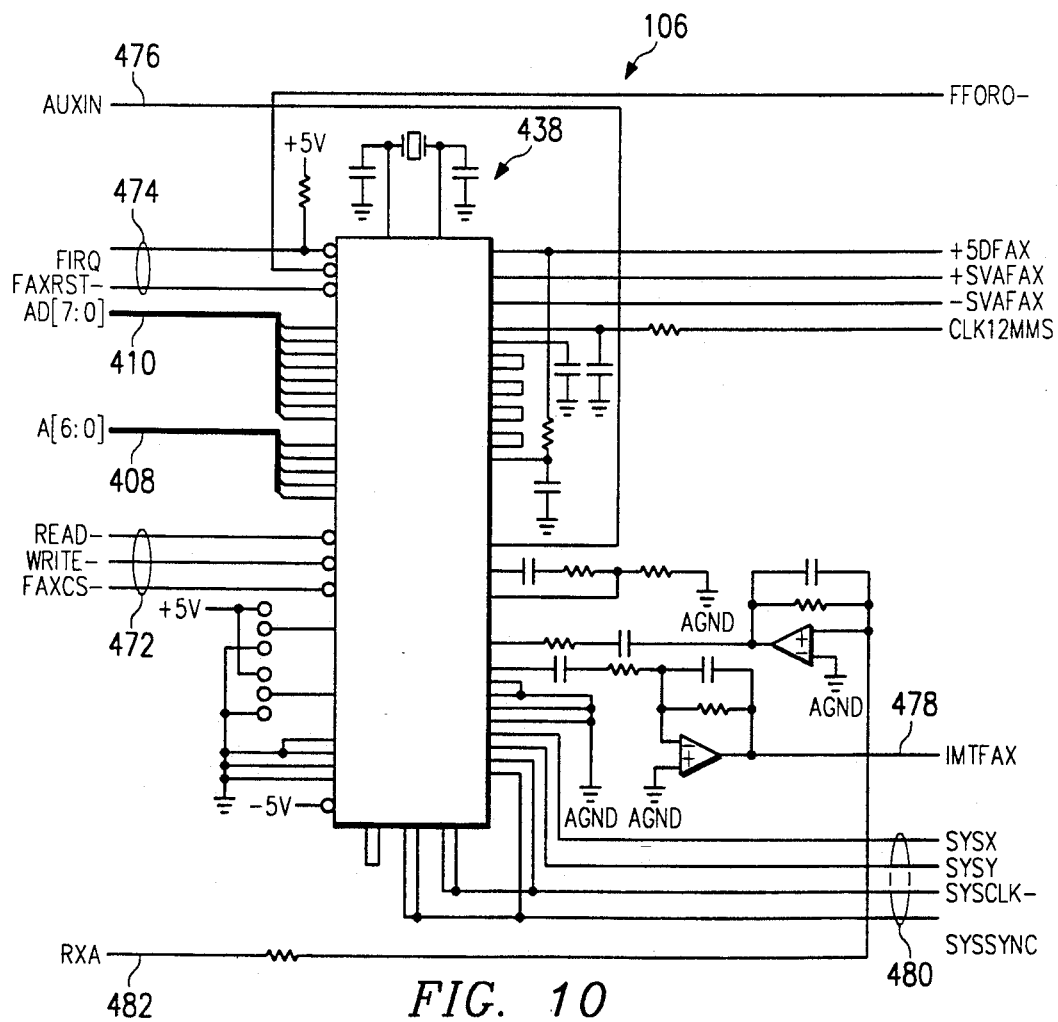

FIG. 10 shows a schematic diagram for fax/voice modem 106 which comprises R96DFX chip 438. It includes a data line interface 410 for data bits AD [7:0], address line 408 for address bits A [4:0], and read and write and chip select lines 472. Other control lines associated with the R96DFX fax/voice modem 106 include interrupts and reset lines 474. The R96DFX chip 438 has on board analog-to-digital and digital-to-analog converters for use with the fax and voice portions of the circuit. Outputs from R96DFX 438 include fax/voice transmission line, XMTFAX 478, and EYEX, EYEY, EYECLK, and EYESYNC lines 480. Fax/voice receive line 482 and AUXIN line 476 provide input paths to R96DFX chip 438. R96DFX 438 provides the capability of transmitting data out as well as receiving data on telephone line 22. R96DFX fax/voice modem is manufactured by Rockwell International of Newport Beach, Calif. and adheres to CCITT V.29 specifications.

Figure 11:
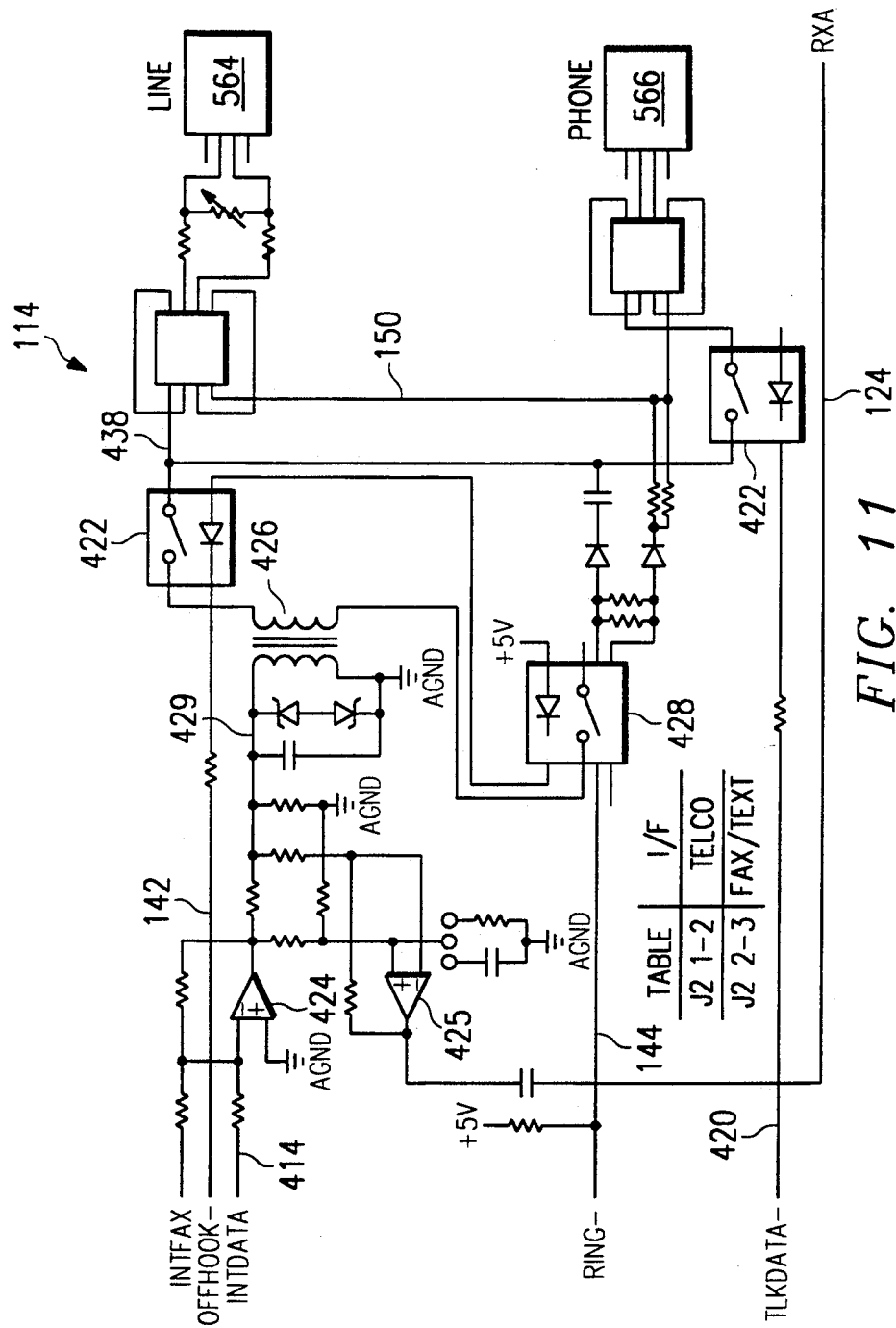

FIG. 11 is a schematic view of the DAA 114. DAA 114 includes hook control line 142 and ring detect line 144. Hook control line 142 activates two relays to switch the phone lines tip and ring into the circuit. Ring detector 428 sits across tip and ring lines 148 and 150 to monitor an incoming ring. The performance level that data/fax/voice modem circuit 44 must satisfy with respect to the tip and ring lines 148 and 150 is specified in 15 CFR Part 68. DAA 114 causes data/fax/voice modem circuit 44 to satisfy these requirements.

The TLKDATA signal 420 comes from the IA10464 and the talk data relay 422 activates the phone relay to allow use of standard telephone for conversations. The transmit data line 414 for the fax/voice modem 106 and V.22 bis data modem 104 goes through a summing op amp 424 to a single point and then goes directly into transformer 426. Transformer 426 is part of DAA 114 and takes a DC signal from telephone line 22. Receiver 425 samples the phone data line 429 and subtracts the transmit signals to derive receive data. The received data, RXA 124 is sent out to fax/voice modem and data modem. At the same time, RXA 124 is sent to the speaker circuits 446.

Figure 12:
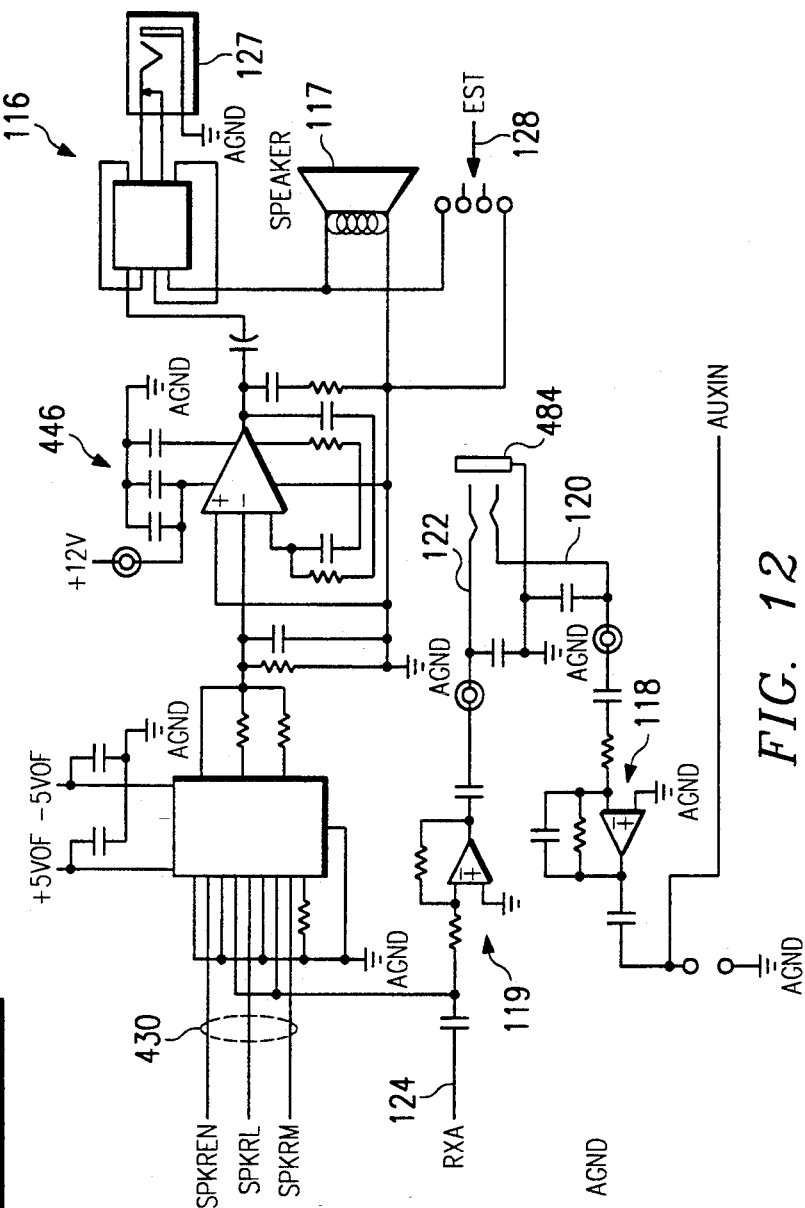

FIG. 12 is a diagram of the speaker circuit 116 and shows the flow of receive signals labeled RXA from line 124. Using an MC14053 analog switch 440, the data/fax/voice modem circuit 44 selects the right level at which to activate output circuit 446 for sending output signals to the onboard speaker 117. Truth table 442 of FIG. 12 illustrates how to enable the speaker and the levels that appear upon its enabling. Also external connection 127 permits the connection of an external speaker. The external speaker that may be at connection 127 may be controlled just as internal speaker 117.

Optional Jumper 128 permits connection to internal chassis speaker 90.

Receive signal RXA on line 124 gets buffered to a line out signal level to audio multimedia circuitry 18 at 119.

Buffered RXA receive signals go through jack interface circuit 484. On one side of jack interface is an audio output connection 122, and on the other side is an audio input connection 120. Buffering received signal 120 by op amp 118 allows the receipt of audio signals from audio multimedia circuitry 18 into data/fax/voice modem circuit 44 for ultimate output on telephone line 22.

Power requirements for the data/fax/voice modem circuit 44 include +5 volts at 500 milliamps, +12 volts at 20 milliamps, and −12 volts at 80 milliamps.

FIGS. 13 through 21 detail the schematic diagrams of the major components of the television circuit.

Figure 13:
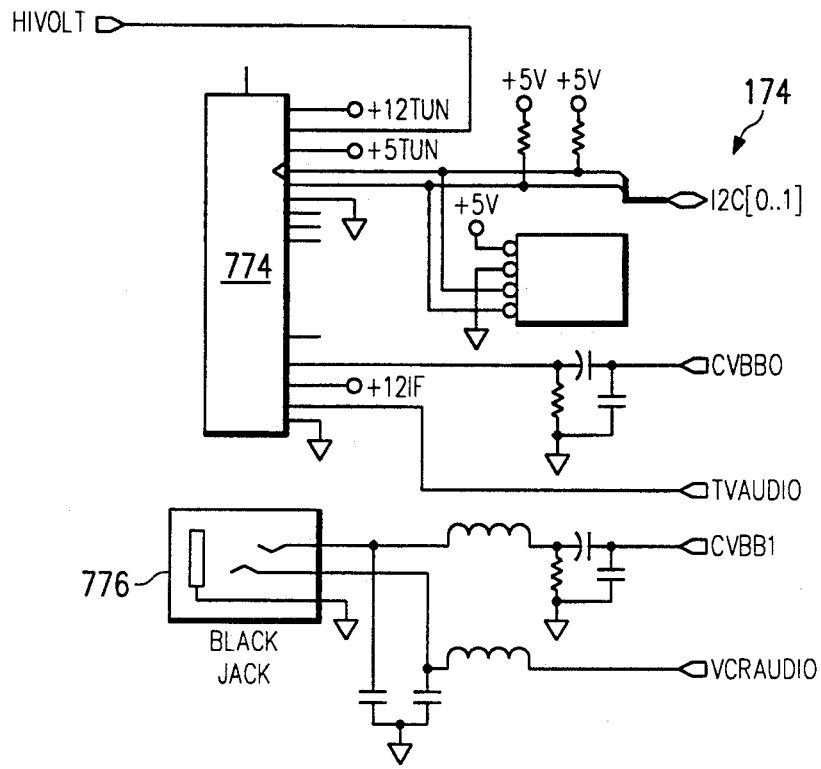
FIGS. 13 through 21 provide detailed schematic diagrams of television circuit of the preferred embodiment of the present invention.

FIG. 13 provides a detailed schematic diagram of television circuit 46 input circuitry 174. Input circuit 174 detailed schematic shows how line level video and audio enter a television circuit 46. Tuner module 774 is a cable tuner module which converts cable or broadcast television to baseband NTSC video. Connector J3 776 allows direct NTSC input from the VCR. Input circuit 174 conditions and filters video signals.

Figure 14:
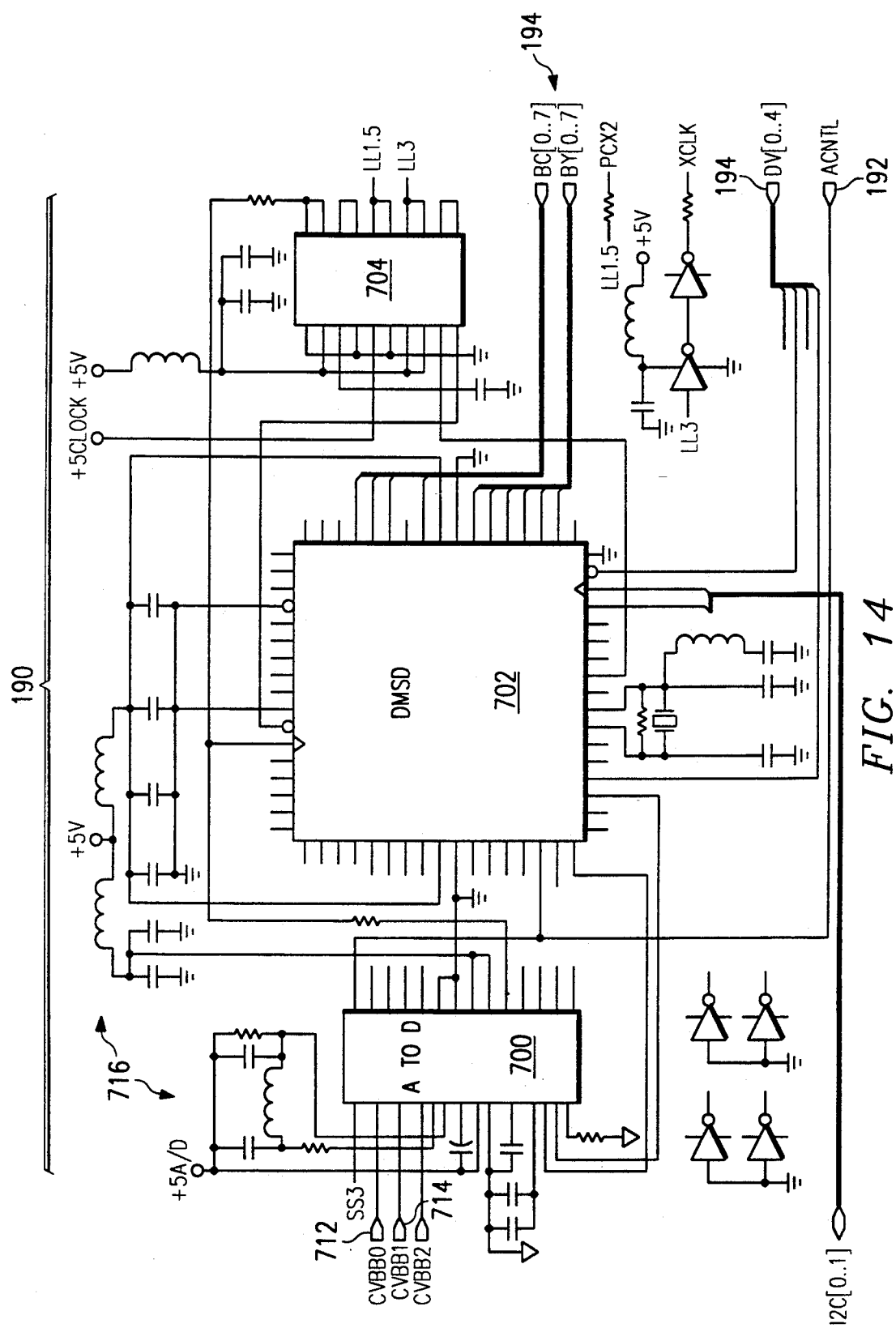

FIG. 14 is a schematic diagram of the TV card decoder section of the television circuitry 46 of a preferred embodiment of the present invention. Beginning at analog-to-digital converter 700, which is a TDA 8708, this device creates digital signals from analog inputs CVBB0 712 and CVBB1 714. Filter circuit 716 provides an antialias filter to filter unwanted noise out of the analog path and decouples components to keep their signal levels correct. In the analog-to-digital conversion, it is important to keep digital signals away from the analog signals. The digital signals are typically of much greater intensity and may corrupt the analog signals. Therefore, it is necessary to separate the grounds and power of the digital noise from the analog input signals. To achieve this, the combination of filter circuit 716 together with ferrite beads, capacitors, and inductors in the power supply nets of digital multistandard decoder (DMSD) 702 and 8-bit A/D converter 700 provide isolation of the devices. The -8-bit A/D converter 700 examines certain portions of the analog wave form to perform automatic gain control and blanking. The signals that DMSD 702 communicates to 8-bit A/D converter 700 are digital reference signals that help the converter keep synchronous with DMSD 702.

Data bits D0–D7 of 8-bit A/D converter 700 provide gain controlled or level adjusted representations in the digital domain of the analog signals coming in the analog side. There is a simple one-to-one correspondence between the analog and digital domains. Other connections from A/D converter 700 include various control signals, including ACNTL for input source selection and connections to DMSD 702 signals HSY and HC for synchronization control.

The signal between 8-bit A-D converter 700 and DMSD 702, selects the video and audio inputs from one source or another. MCLKA/MCLK signals provide a common clock signal between DMSD 702 and 8-bit A-D converter 700 as generated by SSA9057 704. PAL/NTSC decoder 190, which includes DMSD 702 and SSA9057 704, provides digital television capability that can be seen through VGA monitor 26.

DMSD 702 includes a variety of inputs and outputs. These inputs and outputs include VDD for power in the digital component and VSS for the digital ground. LL3 provides a clock input and RESET input permits the digital components to reset upon being powered up. The clock generator SAA9057 704 provides a reset signal and feeds that signal to DMSD 702. UV0–UV3 generate time multiplexed color difference signals comprising 4 bits of UV intensity data. Data bits D1–D7 provide intensity information.

Along the bottom of the schematic for DMSD 702 appears HSY connection for the horizontal synchronization control signal that tells 8-bit A/D converter 700 when blanking or other events are occurring inside the horizontal line so the analog-to-digital converter knows where it is in the digital transmission cycle. The VS and BLN bits provide vertical synchronizing and horizontal synchronizing signals as decoded by DMSD 702. XTLI and XTAL make an oscillator circuit with crystal X1. Line LFC0 provides analog output from the DMSD 702 comprising a signal that keeps the SAA 9057 704 in synchronous operation with the input video data. Signal bits SDA and SCL provide serial data and clock respectively from I²C ® bus 176 for program input to DMSD 702. BLN provides blanking signals to line 194. Line IICSA controls internal address selection for the serial bus.

Figure 15:
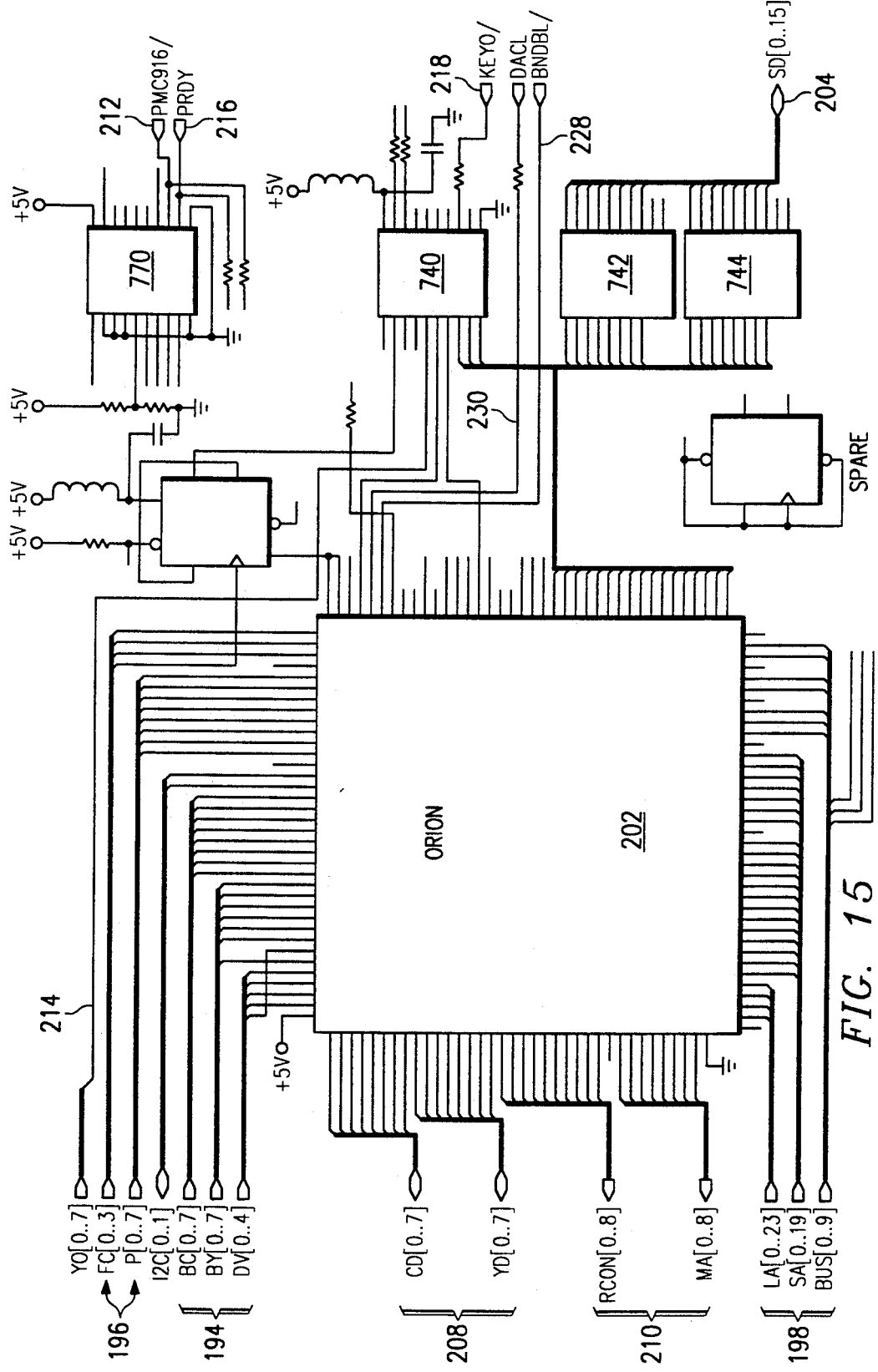

FIG. 15 provides a schematic diagram of the Orion chip used in conjunction with the television circuit 46. Orion chip 202 is connected according to its application notes and provides scaling, windowing and other features of the television circuitry of the present invention. It serves as a memory manager, a bus interface and operates as a pixel processor to implement windowing and scaling.

Although much of a Orion 202 connectivity is mandated by its functionality, the present invention further includes PAL 16R4 740 which permits the use of a "Super VGA" circuit. PAL 16R4 740 takes one feedback signal and allows pixel-by-pixel control of the output video in any mode. "Super VGA" mode allows a video resolution of 800 pixels horizontal by 600 pixels vertical, whereas standard VGA resolution is 640 pixels by 480 pixels. 74ALS245 chips 742 and 744 further support this "Super VGA" mode.

The Orion chip can be programmed by several algorithms to direct output block 226 (FIG. 18) to switch video sources. This switching occurs in real time and results in "picture-in-a-picture" or overlayed video output. Functional connections numbered 716 through 734 as illustrated on FIG. 15 are described in the application notes for the Orion part.

Orion 202 from the Chips and Technologies Corporation provides an AT bus interface, handles the digital Y:U:V video stream from DMSD 702 and manages video memory and output switching. Picture size reduction and cropping are achieved through memory management. PAL 16L8 710 and 16R4 740 are added with Orion chip 202. The PAL 16L8 fixes known bugs in the Orion 202 circuit. PAL 16R4 740 implements higher-than-standard resolution modes for television circuit 46.

Figure 16:
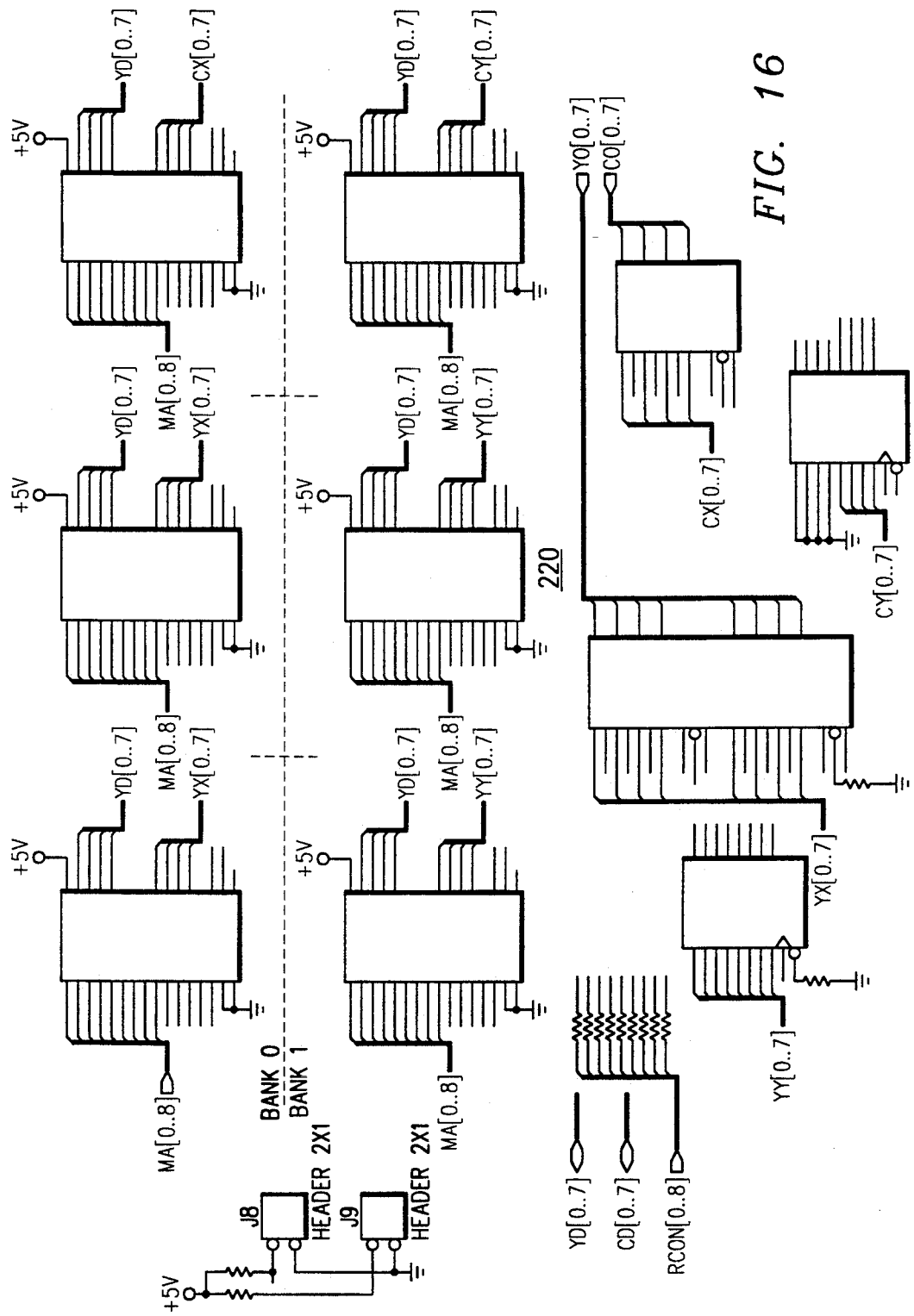

FIG. 16 shows the schematic diagram for VRAM circuit 220. VRAM circuit 220 temporarily stores digitized video information. As a result, VRAM circuit 220 permits frame grabbing by temporarily storing a whole frame of video information. VRAM circuit 220 operates with Orion circuit 202 and permits operations such as pixel selection and window reduction via bit manipulation.

Figure 17:
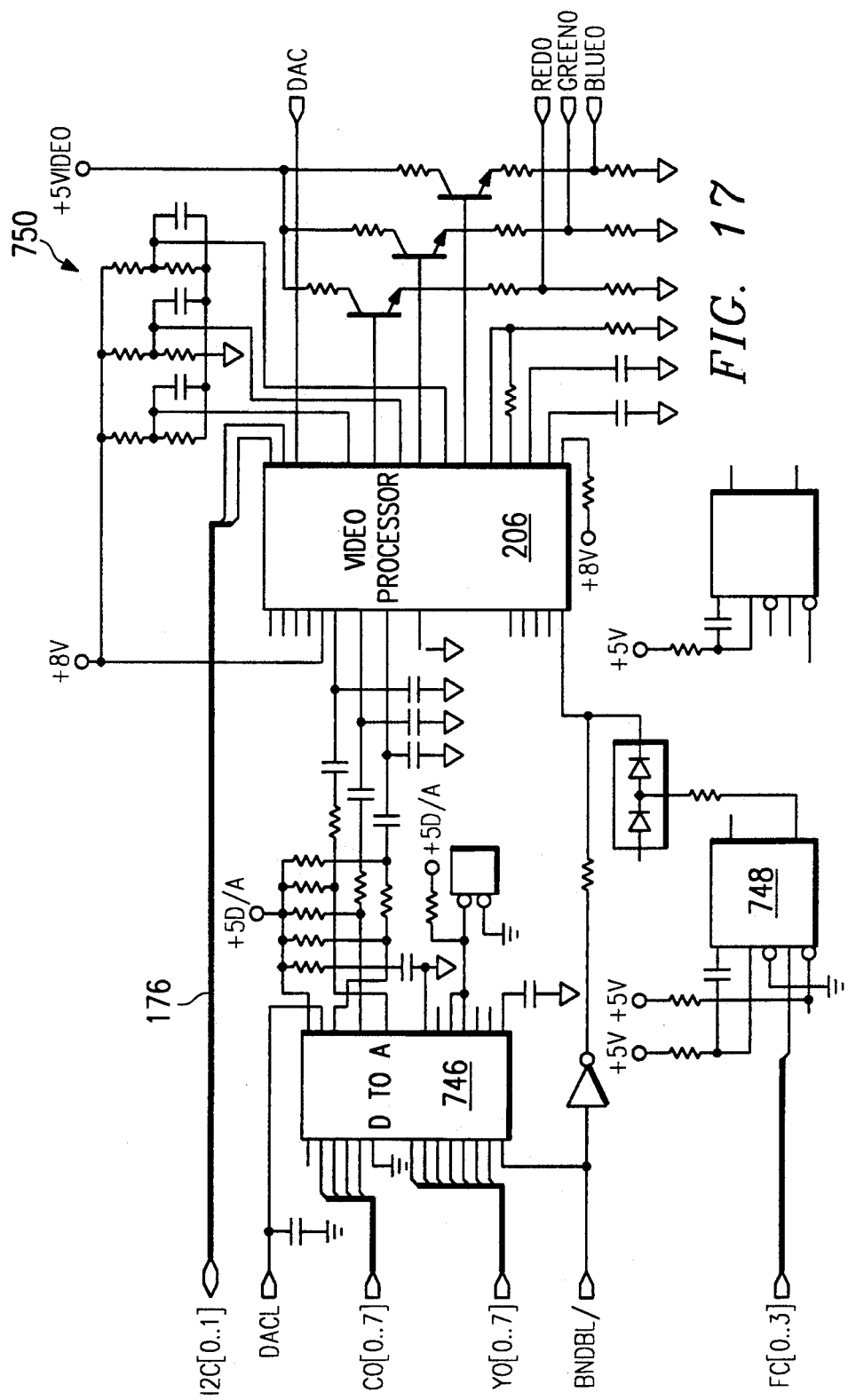

FIG. 17 provides a detailed schematic diagram of a digital-to-analog converter 746 and video processor 206 of a preferred embodiment of the present invention. Digital-to-analog converter 746 and video processor 206, manufactured by Phillips, convert the digital video from VRAM circuit 220 into Y:U:V analog data. In association with D/A converter 746 is "1-shot" chip 74LS123 748. The "1-shot" chip 748 is a recommended part to be used with Orion 202 and provides a pulse in response to a received signal from the Orion. Output from "1-shot" 748 goes to video processor 206 as an analog step voltage signal. This provides a sandcastle signal for use in recreating an analog signal from the digitized input. Video processor 206 is the Phillips part TDA4680 along with pull down resistor and capacitor circuitry 750. Pull down resistor and capacitor circuitry 750 is added to increase the brightness from video processor 206.

Figure 18:
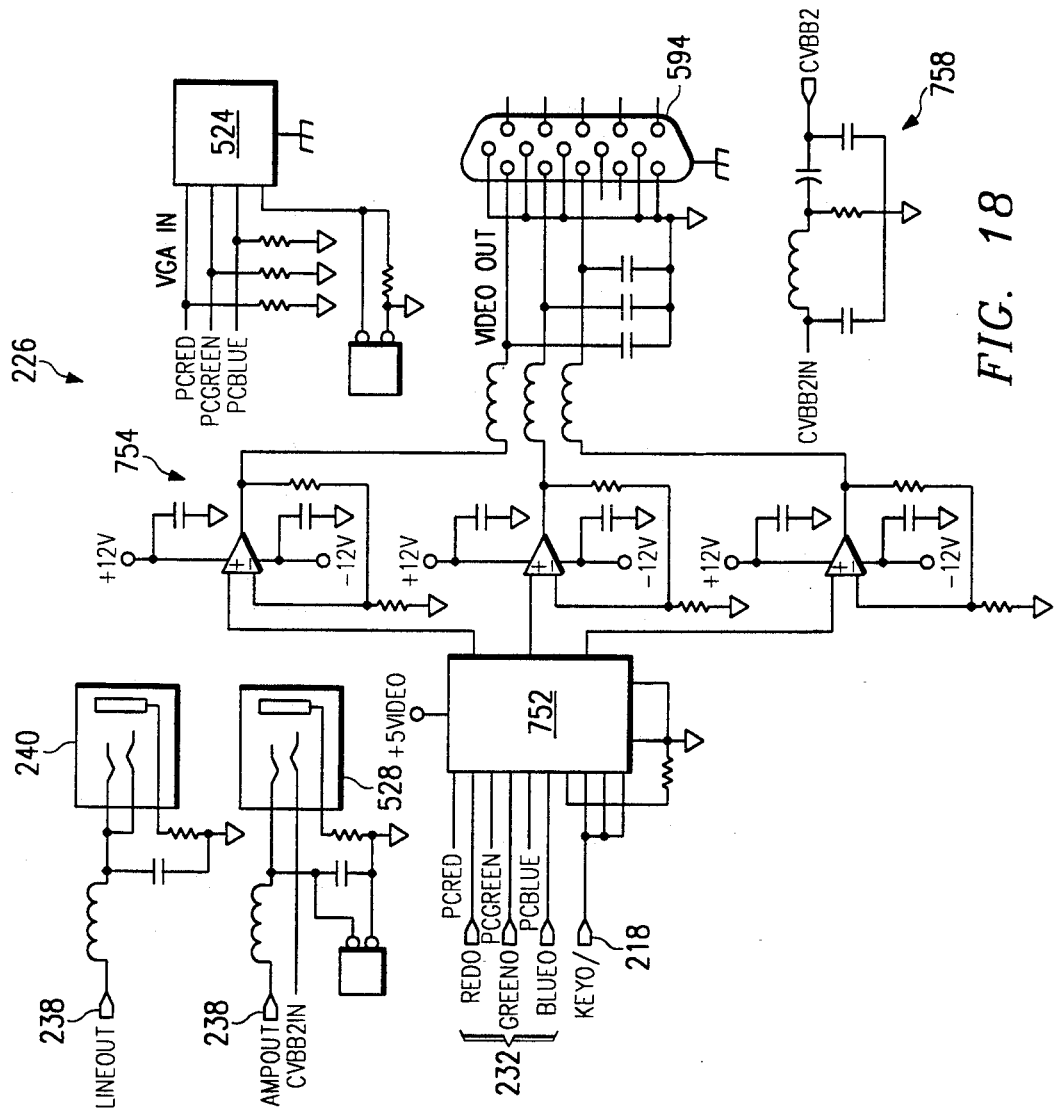

FIG. 18 provides a schematic diagram of output circuit 226. Output circuit 226 receives red, green and blue 232 and key signals 218 from video processor 206 at multiplexer 752, which in the preferred embodiment is chip 74HCT4053. Multiplexer 752 receives video input 232 from video processor 206 and PC video input from an external VGA circuit via connector 524. Key signal 218 controls whether multiplexer 252 will direct television or computer output to output connector 592. Op amp circuit 754 operates as a current mode amplifier that serves as a video buffer to condition the signal and give it more drive. The video out goes to monitor 26. Filter circuit 758 connects to an unused video input associated with video processor 206. Circuit 758 permits a third video input instead of only television input and VCR input.

Line out signal 238 is provided for output to audio multimedia circuitry 18 via connector 240, and amp out 238 provides an external speaker connection via connector 528.

Figure 19:
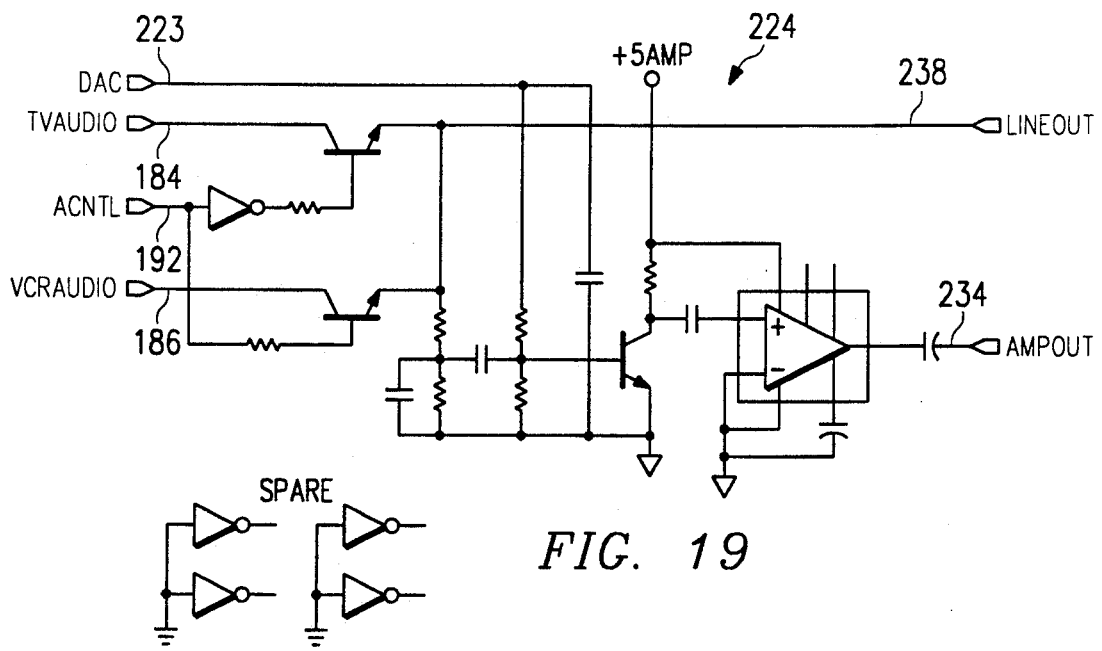

FIG. 19 shows the audio output circuit 224 of the television circuit 46 of the present invention. Audio circuit 224 provides for variable amplified control and amplified output within television circuit 46. Audio output circuit 224 is unique in design in that while more expensive parts may be available, audio output circuit 224 provides a simple and space economical solution for television audio output.

Figure 20:
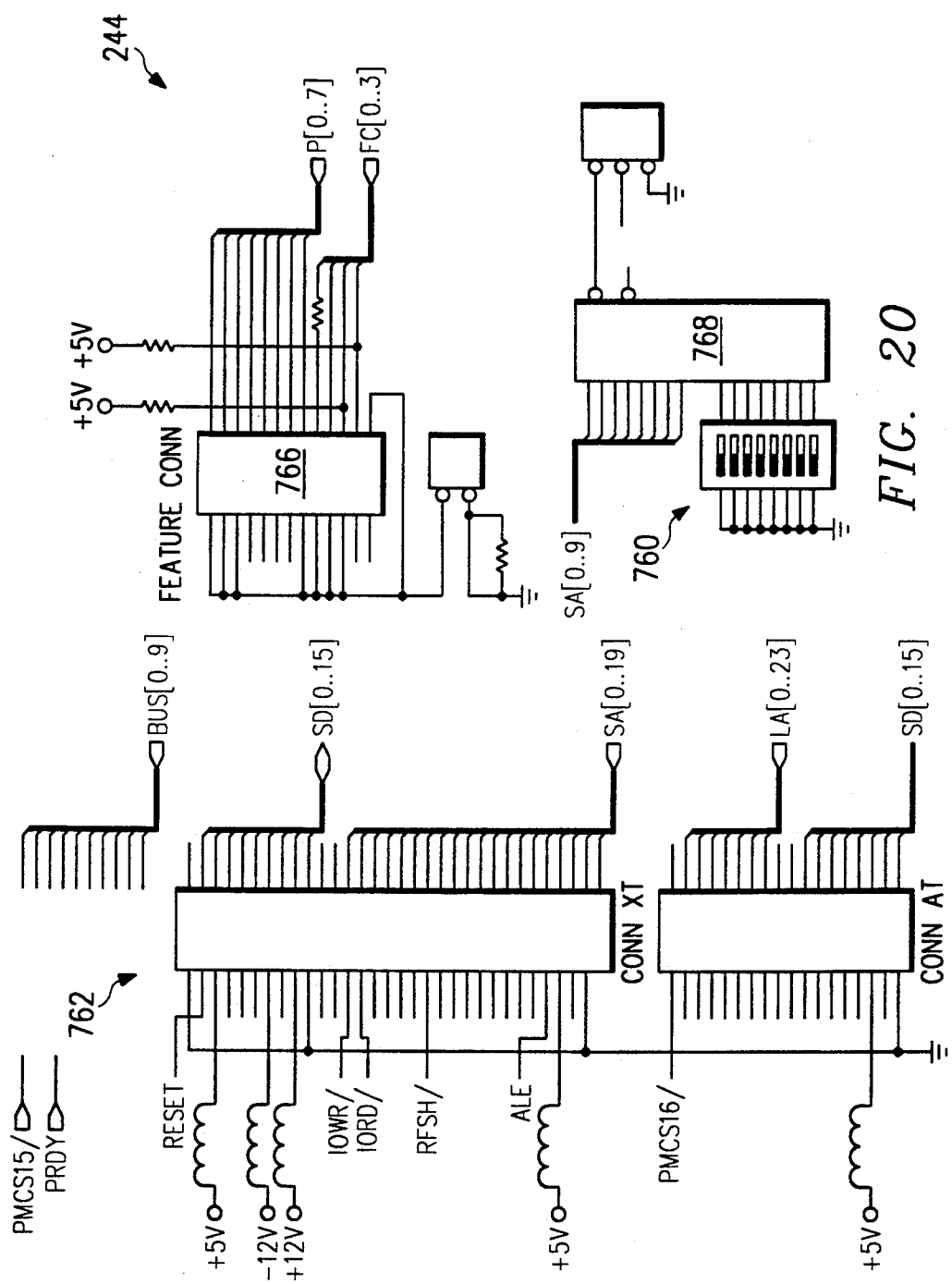

The personal computer host interface circuit 300 detailed schematic is provided at FIG. 20. The combination of switch 760 and chip 74LS682 768 allows selection of an address range for television circuit 46 and permits full operation of the Orion chip 202 according to its application notes. The 74LS682 permits allocating different portions of memory so that contention with other cards in host computer 24 does not exist.

Feature connector 766 provides access to timing signals that go to monitor 26, including digital information about colors. Feature connector 766 permits connecting Orion chip 202 with the VGA controller in host computer 24. It permits Orion 202 to know which colors are on the VGA screen. This permits video switching on a color-keyed basis. For example, any time the color red is output by the VGA controller, this can be detected by Orion 202 and the video output can be switched from the controller output to the television output. If the red area constituted a circle, then a circular window of television picture would appear on the screen in place of the red.

Figure 21:
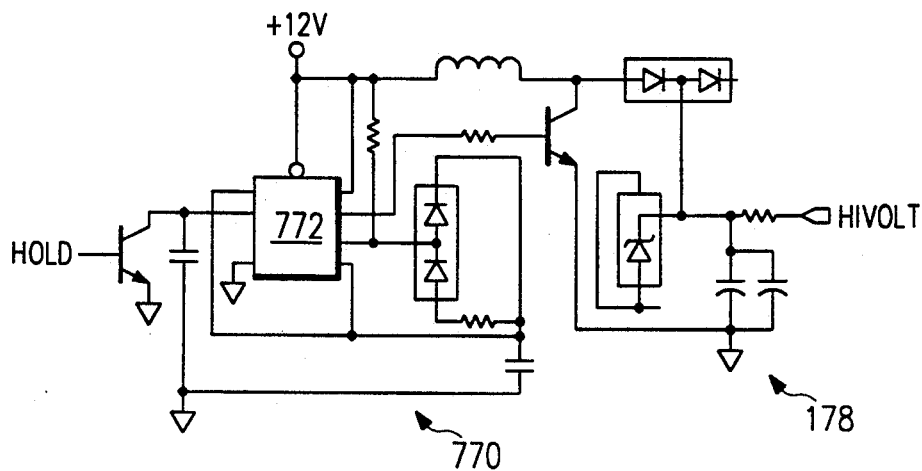

FIG. 21 provides a detailed schematic of power circuit 178 associated with television circuit 46. Of particular importance in power circuit 178 is diode and oscillator network 770. This provides a boosted voltage for regulation through zener diode BZX84-C33. This gives a voltage level that is not standard for personal computers and that is needed for input circuit 74. By generating the necessary output of 30.5 volts at 0 to 3 milliamps on board, the power circuit permits use of television circuit 46 in a wide variety of personal computer systems.

LM555 is a simple oscillator that is unique in that it uses feedback from a regulator circuit to control the oscillator frequency. Adjusting the oscillator frequency controls the output voltage, keeping it within a desired range.

Power circuit 178 is designed to minimize EMI radiation and video noise that degrades picture quality. High voltage circuit 770 uses very few components and generates little noise at little cost.

FIGS. 22 through 25 illustrate the schematics for the AM/FM tuner circuit and infrared remote control circuit. FIG. 22 provides a detailed schematic diagram of the circuitry associated with the 8742 microcontroller 262 in the preferred embodiment of the AM/FM tuner circuit 48 of the present invention. At the upper left hand corner of FIG. 22 appears a 74F74 flip flop 464 which is designated U508 and which serves to divide oscillator clock input from AT bus 300 by two. This timing signal is fed into the 8742 microcontroller 262. The 8742 microcontroller operates as an interface between AT bus 300 and the tuner 48 and remote control 50 functions. 74LS245 271 is a buffer for the host bus interface 300 on data lines SD [7:0]. All commands go through buffer 27 and then to 8742 microcontroller 262. PAL 275 will enable and pass an interrupt. User selection of a system interrupt is provided by jumper 290. At terminal J3 292 the interrupt can also be passed over to audio multimedia circuitry 18. This circuit provides interrupt sharing with circuitry on the multimedia board as part of the present invention and would not use interrupt select 290.

Connector J9 294 provides for external connection of an aftermarket infrared detect circuit. The present invention, however, provides a connection for internal infrared detect circuit via jumper J8, 280.

PAL 286 serves to decode address information associated with AM/FM tuner circuit 48 and infrared remote control circuit 50.

The AM/FM tuner 48 and infrared remote control circuit 50 are controlled by 8742 programmable 8-bit processor 262. AT bus interface 264 uses a command and data register protocol to access the 8742 processor 262. The hex address map for the AM/FM and infrared control board is listed for reference in the following table. The primary address is listed first and the alternate is listed in parentheses. The board address is jumper selectable.

TABLE 1

| I/O Address | Cycle Type | Register Description |
|---|---|---|
| 0240 (0250) | Read/Write | AM/FM/IR data register |
| 0241 (0251) | Write only | AM/FM/IR command register |

An interrupt line, IRINT, is sent to the audio multimedia circuit at connector 292. A logic "1" in either of the two LSBs of an 8-bit interrupt status register indicates whether the infrared detector or AM/FM tuner need servicing.

The commands for the AM/FM tuner and infrared remote control devices are listed below for reference. The table contains 8-bit command values for the 8742 controller 262. The host interface 300 issues the code as an I/O write to the command register and then performs the action for completing the command code, i.e., read or write to the AM/FM/IR data register.

TABLE 2

| Code | Function | Host Action |
|---|---|---|
| FF | Reset & initialize all external hardware, i.e. AM/FM tuner & IR remote controller | N/A |
| FE | Reset & initialize AM/FM tuner only | N/A |
| FD | Reset IR remote controller | N/A |
| FC | Interrupt Status Register | Read Data |
| FB | thru F0 not assigned | — |
| EF | Off/On, AM/FM tuner | N/A |
| EE | Write AM or FM band select | Write Data |
| ED | Read AM or FM band select | Read Data |
| EC | Read station lock status | Read Data |
| EB | Write station multiplier | Write Data |
| EA | Read station multiplier | Read Data |
| E9 | Station scan up | Write Data |
| E8 | Station scan down | Write Data |
| E7 | AM/FM interrupt acknowledge | Write |
| E6 | thru E0 not assigned | — |
| DF | Valid IR code detected, i.e. status bit and bytes currently in FIFO | Read Data |
| DE | Read valid IR command code, read data out of FIFO | Read Data |
| DD | IR interrupt acknowledge | Write |
| DC | thru D0 not assigned | — |

Figure 23:
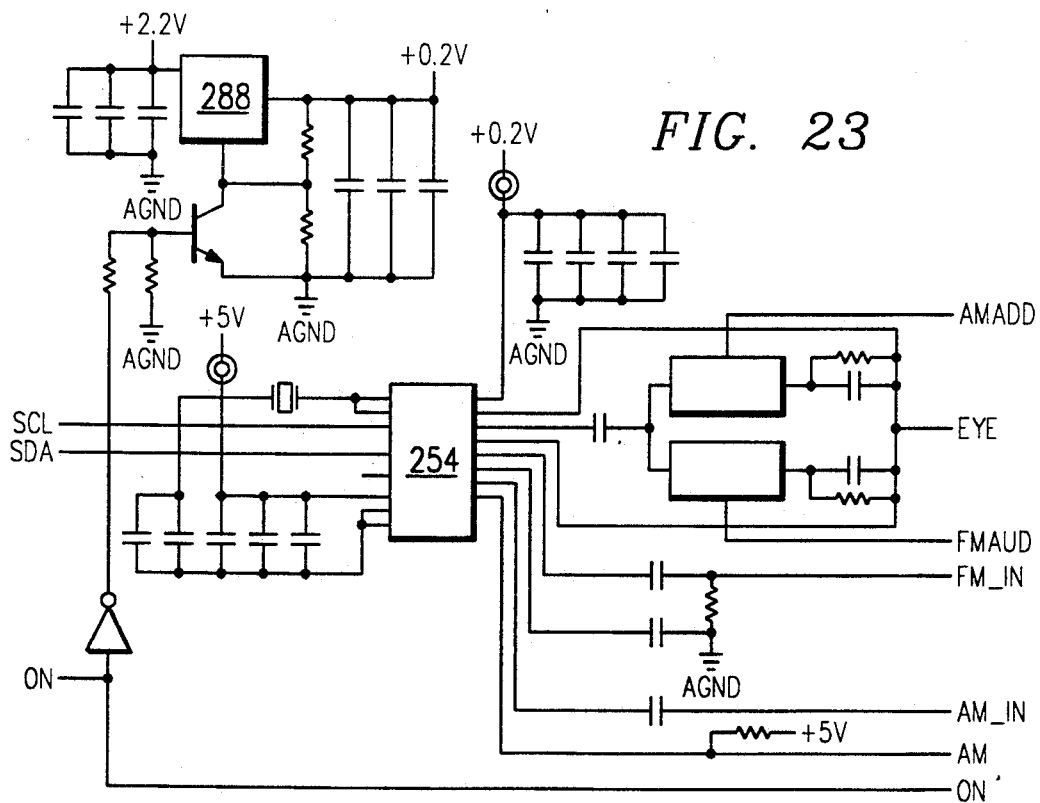

FIG. 23 provides a detailed schematic diagram of circuitry associated with phase-lock-loop 254. Chip LM317 288 is a voltage regulator which brings in 12 volts and generates 8.2 volts for the phase-lock-loop 254 circuitry in the AM/FM tuner 256. Phase-lock-loop 254 provides for control selection of AM and FM radio stations. Phase-lock-loop 254 responds to input radio frequencies and generates a plurality of outputs that directly connect to the AM/FM tuner. In the preferred embodiment, phase-lock-loop 254 is part number TSA6057T.

Phase-lock-loop frequency synthesizer 254 generates a tuning voltage for a given station (AM or FM) based on the phase difference between the phase-lock-loop reference frequency and the tuner module 256 local oscillator frequency. This tuning voltage controls the tuner module 256 local oscillator frequency. When the phase-lock-loop 254 and AM/FM tuner 256 are in phase, the tuning voltage remains at a fixed level and tuner 256 is "locked." When phase-lock-loop 254 and the AM/FM tuner 256 local oscillator are not in phase, the tuning voltage is adjusted to change the local oscillator frequency and bring tuner 256 back into a "locked" condition.

Figure 24:
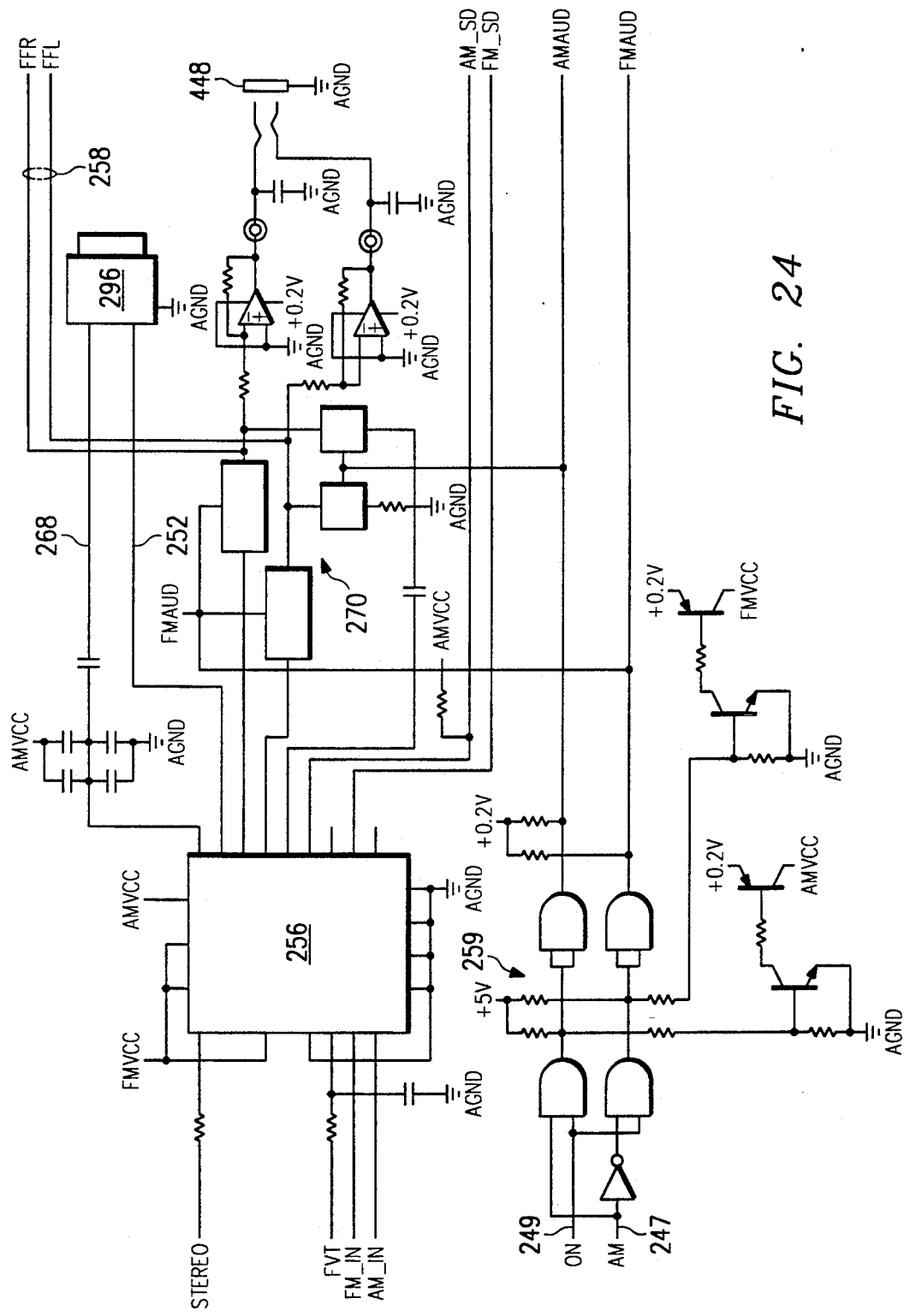

FIG. 24 provides a detailed schematic drawing of circuitry associated with AM/FM tuner 256. AM/FM tuner 256 receives AM antenna input via AM antenna 268 and FM antenna input via antenna 252. The AM antenna 266 and FM antenna 250 are connected to the tuner 256 via a twin coax connector 296. AM/FM tuner 256 generates two outputs comprising audio levels left and right. These outputs go through analog switch 270 which goes either to audio multimedia circuitry 18 via J1 448 or to volume control circuit 272. Circuitry 259 provides additional control for the selection of AM or FM receive and turns on the power to the AM or FM side of the tuner circuit 256.

AM/FM tuner module 256 contains two tuners whose local oscillators are controlled by an external tuning voltage generated by PLL 254. The ON signal 249 enables or disables the power supply to the selected tuner. AM signal 247 selects which tuning section, AM or FM, will be powered and enables/disables the appropriate audio outputs from the tuner 256 via analog switch 270. The selected audio output then goes to the multimedia circuitry 18 and the volume control 272.

When a station is tuned in and the PLL has "locked" onto the station's frequency an interrupt can be generated, either directly via jumper 290 or through the multimedia circuitry 18 via connector 292. This can be used to inform the host computer 24 that further action may be required, such as volume unmuting or station display update.

Figure 25:
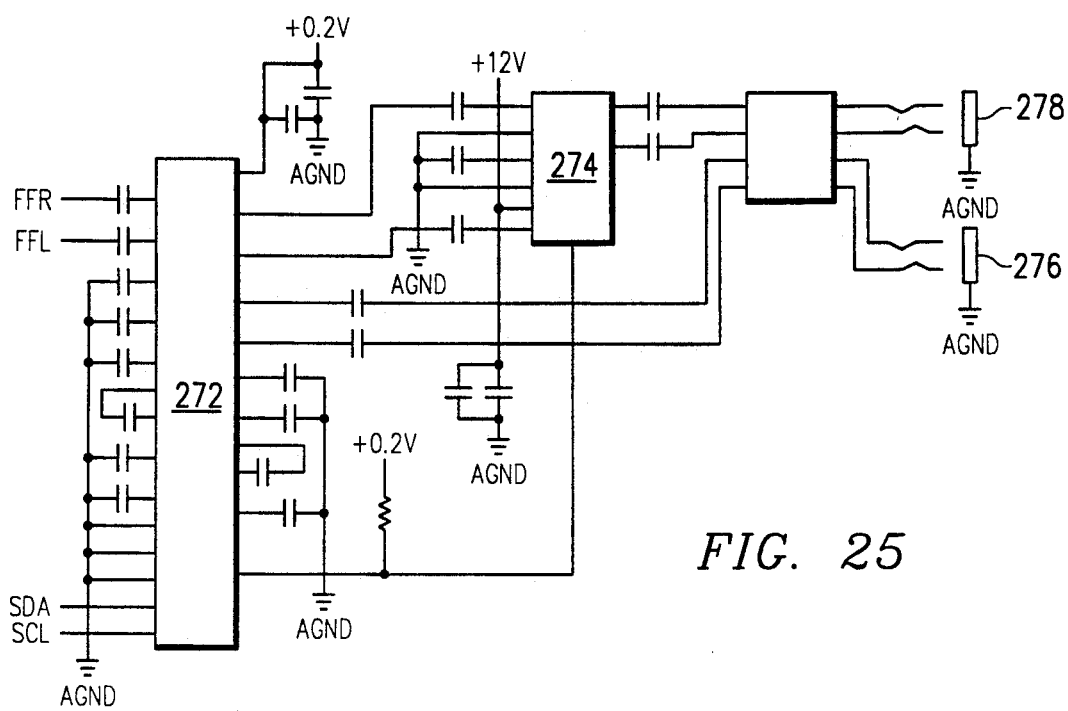

FIG. 25 illustrates the circuitry associated with controller TDA8421 272 which provides a speaker volume control, and treble and bass controls for the amplified speaker output 278. TDA8421 controller 272 is controlled by 8742 262 to select the volume level and the speaker output and line out signals from AM/FM tuner circuit 48. TDA8421 controller 272 controls the signal level at line out connection 276. This output can be connected to an external amplifier or recording device. Power amplifier, TDA1519AU 274 takes the output signal from TDA 8421 controller 272 and amplifies it to drive two speakers that connect at jack 278.

Figure 27:
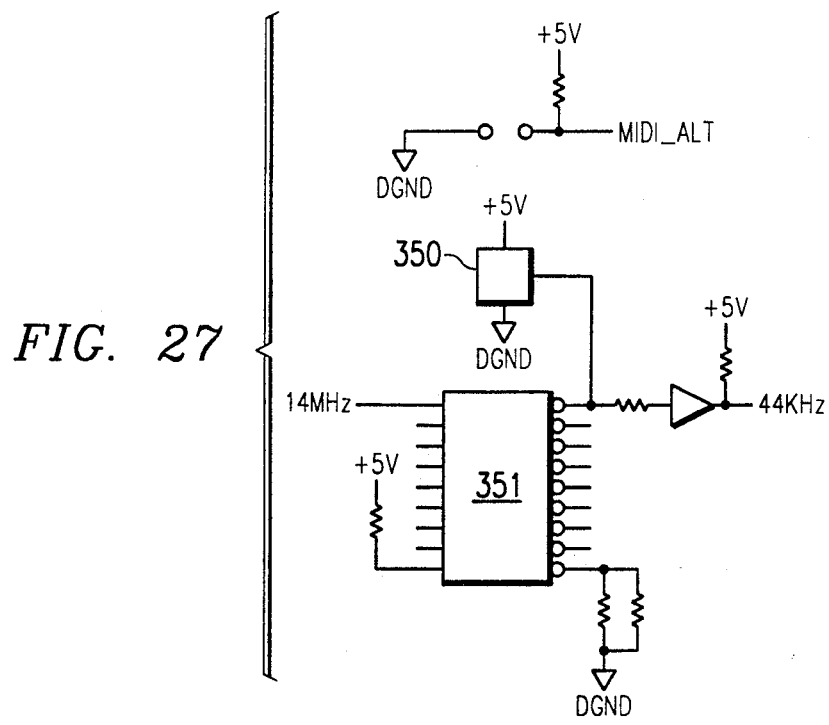
Figure 28:
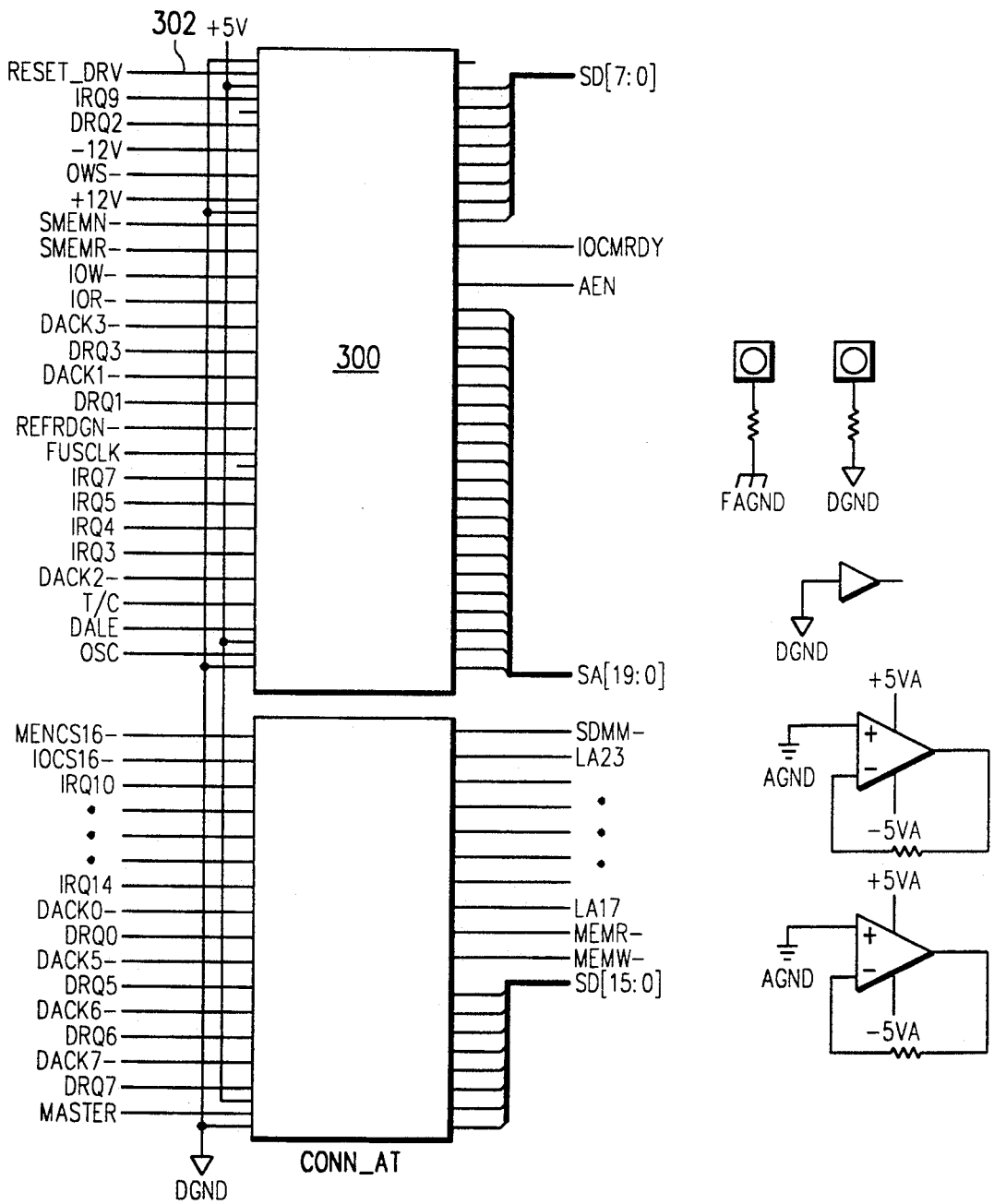

FIGS. 26 through 40 provide detailed schematic diagrams for the combination of audio multimedia 18 and certain related telecommunications circuitry 12 of a preferred embodiment of the present invention. Specifically, FIGS. 27 and 28 are related to the interface requirements, FIGS. 30 through 33 detail the telecommunications subsystems 12 and FIGS. 34 through 40 detail audio multimedia circuitry 18.

There are 2 telecommunications functions which are included as an integral part of the audio multimedia implementation because of their close inter-relationship. The first telecommunications interface is a Small Computer Systems Interface, SCSI 13. This is a general purpose digital interface widely endorsed in the computer industry and most commonly used to support mass storage device. In this particular application the mass storage device of choice is a Compact Disc player, CD 28. The SCSI interface 13 provides operational control of the CD player.

This Compact Disk device is specially adapted to handle both digital data media (disks) as well as digital audio media, thereby allowing it to function as a data retrieval device as well as an audio reproducing device. Because this device can handle digital data media, it is also referred to as a Compact Disk Read Only Memory device or CD-ROM. It is because of its audio reproduction capabilities that this device is an integral part of the audio multimedia implementation.

The second telecommunications function related to the audio multimedia implementation is a Musical Instrument Digital Interface, MIDI 30. MIDI is a well established industry standard digital interface for connecting musical instruments and controllers. The data communicated via MIDI controls the generation of sounds, i.e. selecting the sound's attributes such as timbre, pitch and envelope and then turning the sound(s) on/off/up/down. While this information itself is not audio it can be used to create audio in the multimedia circuitry with the aid of software to convert the MIDI information into the appropriate programming of the sound synthesizer 33 to create an electronic musical instrument.

FIG. 27 shows the clock generation for the A/D-D/A converter. The master sample rate clock of 44.1 KHz can be generated either by an oscillator 350 or via a PAL 351 which divides a 14.318 MHz clock which is available from host interface 300. PAL 351 divides the 14.318 MHz by 325 to yield 44.056 KHz.

Figure 26:
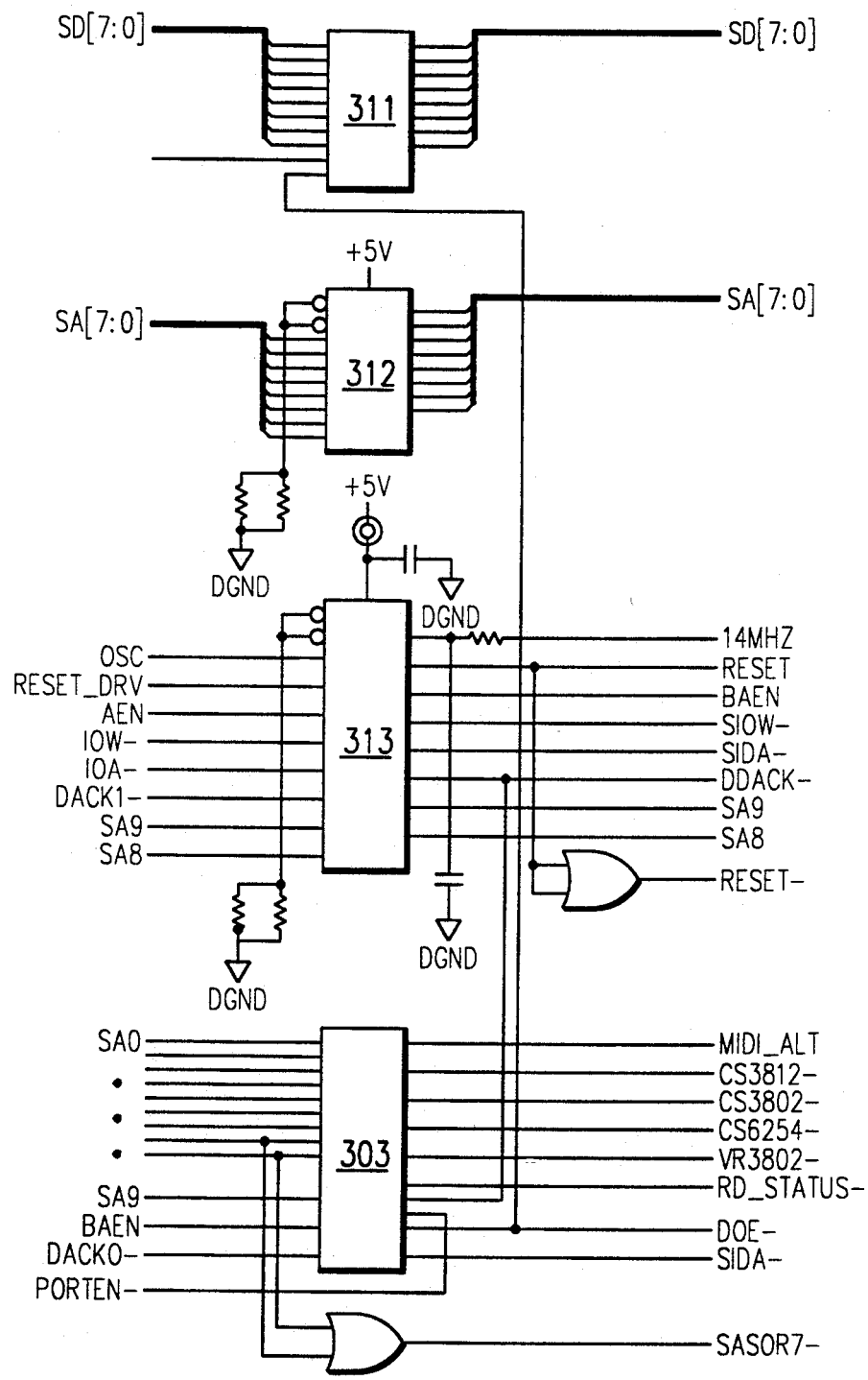

FIG. 26 also depicts a group of buffers for address 312, control 313 and data 311. These buffers provide electrical isolation between host interface 300 and the rest of the multimedia circuitry 18. PAL 303 provides some address decoding for functions of the multimedia circuitry as well as controls the enabling of the output of data buffer 311.

FIG. 28 shows the host computer interface 300. This interface is fully IBM PC-AT compatible.

Figure 29:
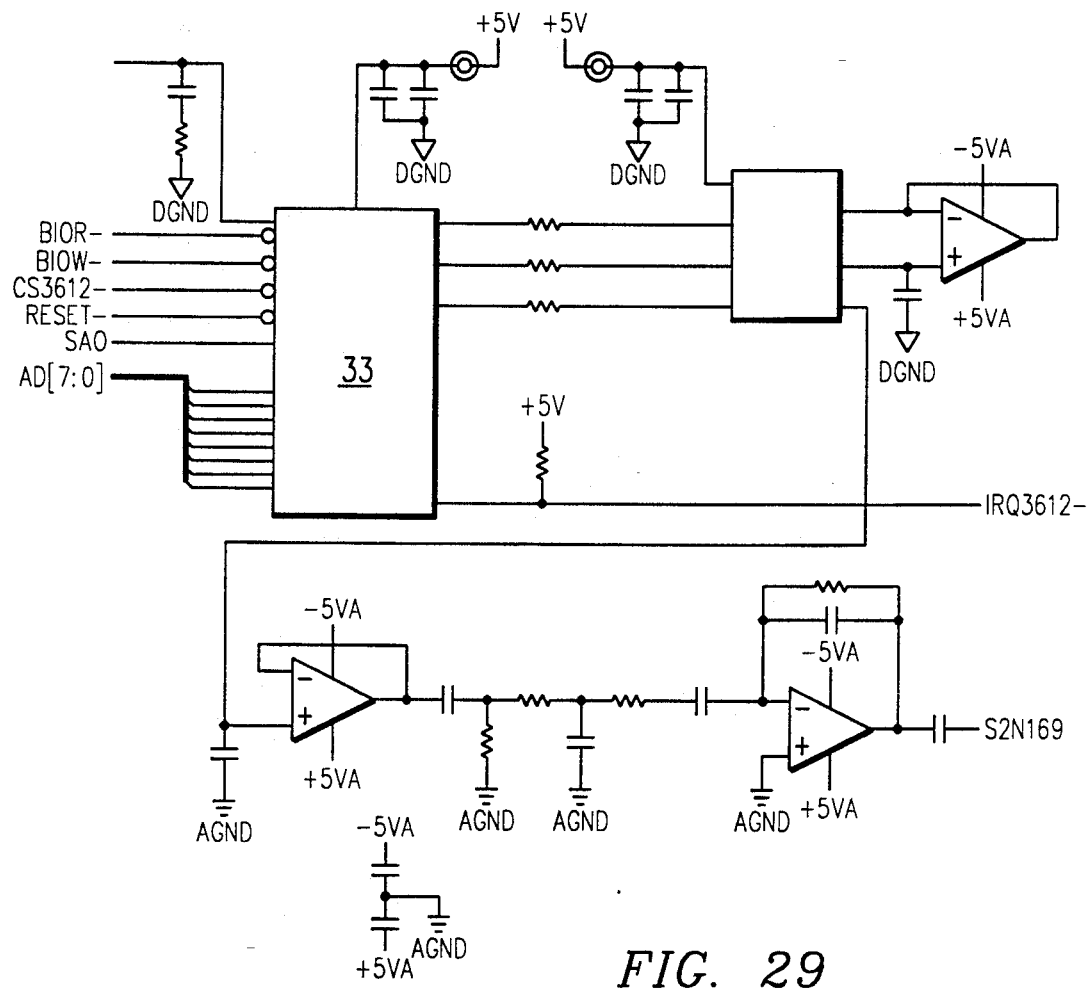

FIG. 29 provides a detailed schematic drawing of sound synthesizer 33. The sound generator interface 33 of FIG. 29 uses a Yamaha YM3812 in the preferred embodiment. The FM sound generator chip is programmable by internal registers. Three modes of sound generation are possible: simultaneous voicing of 9 sounds is one mode, a second mode provides 6 melody sounds in conjunction with 5 rhythm sounds (the 5 rhythm sounds are bass drum, snare drum, tom-tom, top cymbal and high hat symbol); and thirdly there is a speech synthesis mode. There is also a built-in vibrato oscillator with an amplitude modulation oscillator. Software compatibility for commercially available sound generator hardware requires I/O addresses of 0388 hex and 0389 hex.

The Yamaha application manual for the YM3812 provides register descriptions and additional information sufficient for the purposes of the present invention.

The internal parts of sound synthesizer 33 are functionally divided into nine blocks to perform various functions. The blocks include the (1) register array; (2) phase generator; (3) envelope generator; (4) operator; (5) accumulator; (6) vibrator oscillator/amplitude modulation oscillator; (7) timers; (8) data bus controller; and (9) timing controller.

The register array controls sound synthesizer 33. The phase generator receives and accumulates phases from the register array, thereby calculating a phase at each time step. The envelope generator generates an envelope and modulation index for each sound. The envelope generator also receives instructions for such items as slope and offset from the register array to generate an envelope. The operator receives phase information from the phase generator and envelope information from the envelope generator, and calculates the period and magnitude of operation. The accumulator is used to accumulate each sound at each sampling time in order to convert data to match the D/A converter. Low frequency oscillators control vibrato and amplitude modulation. The oscillation frequency is 6.4 Hz for vibrato and 3.7 Hz for amplitude modulation. Two types of timers are provided for general purpose long and short periods. Data bus control and timing control are also provided.

Figure 30:
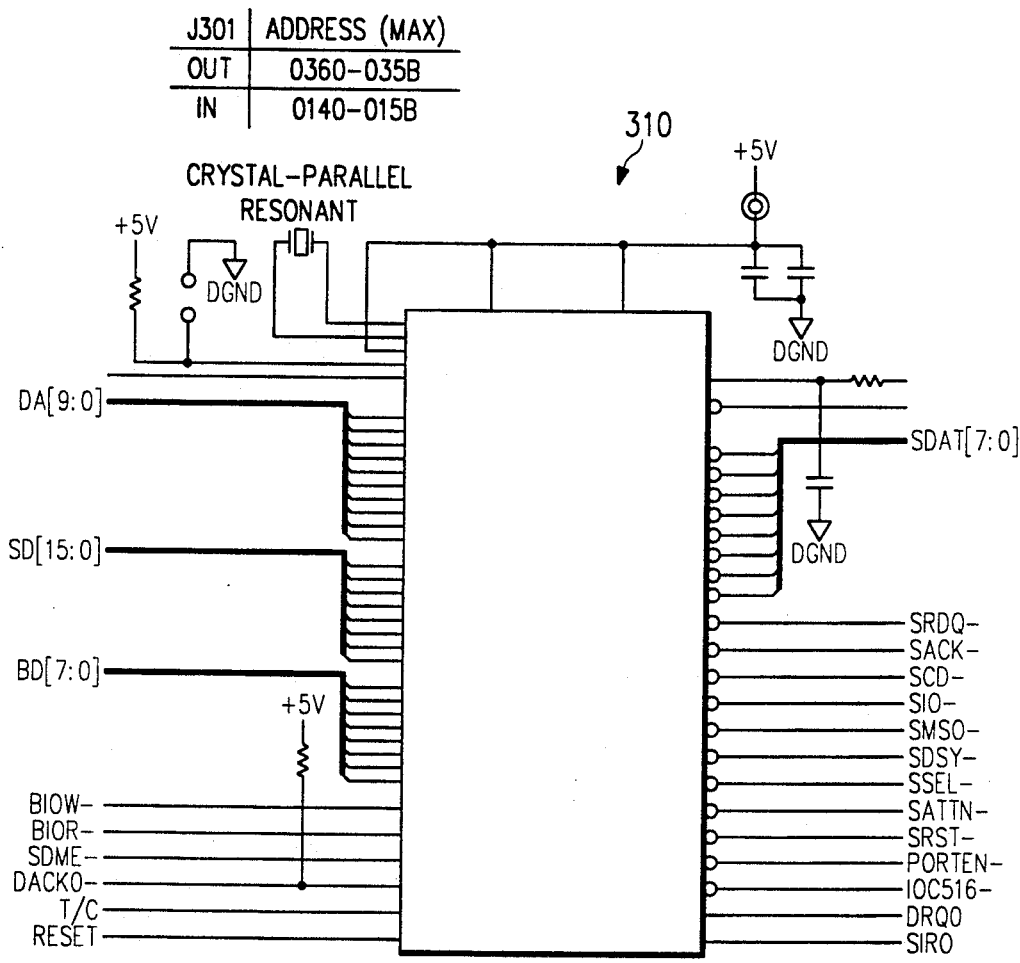
Figure 31:
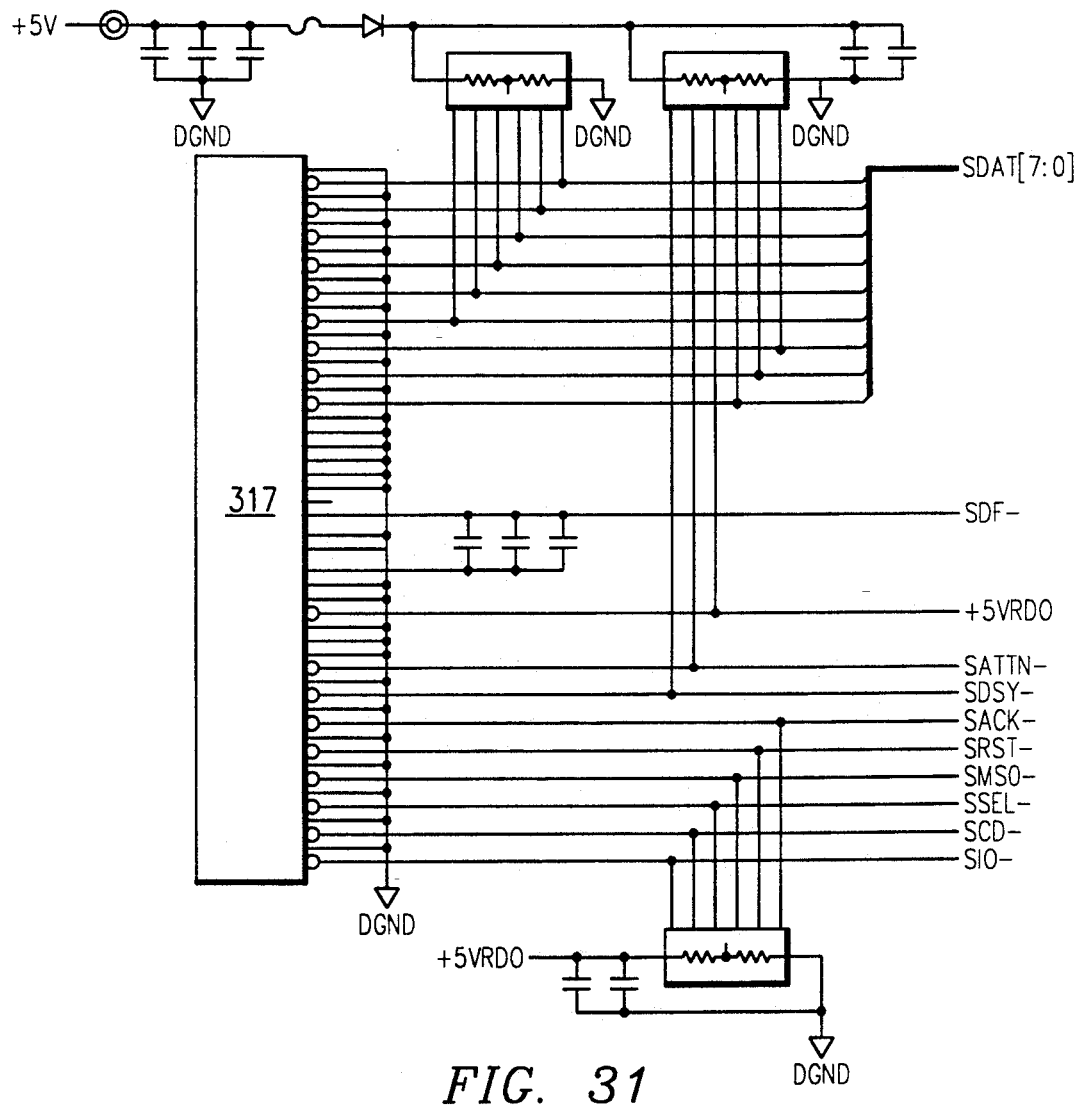
Figure 32:
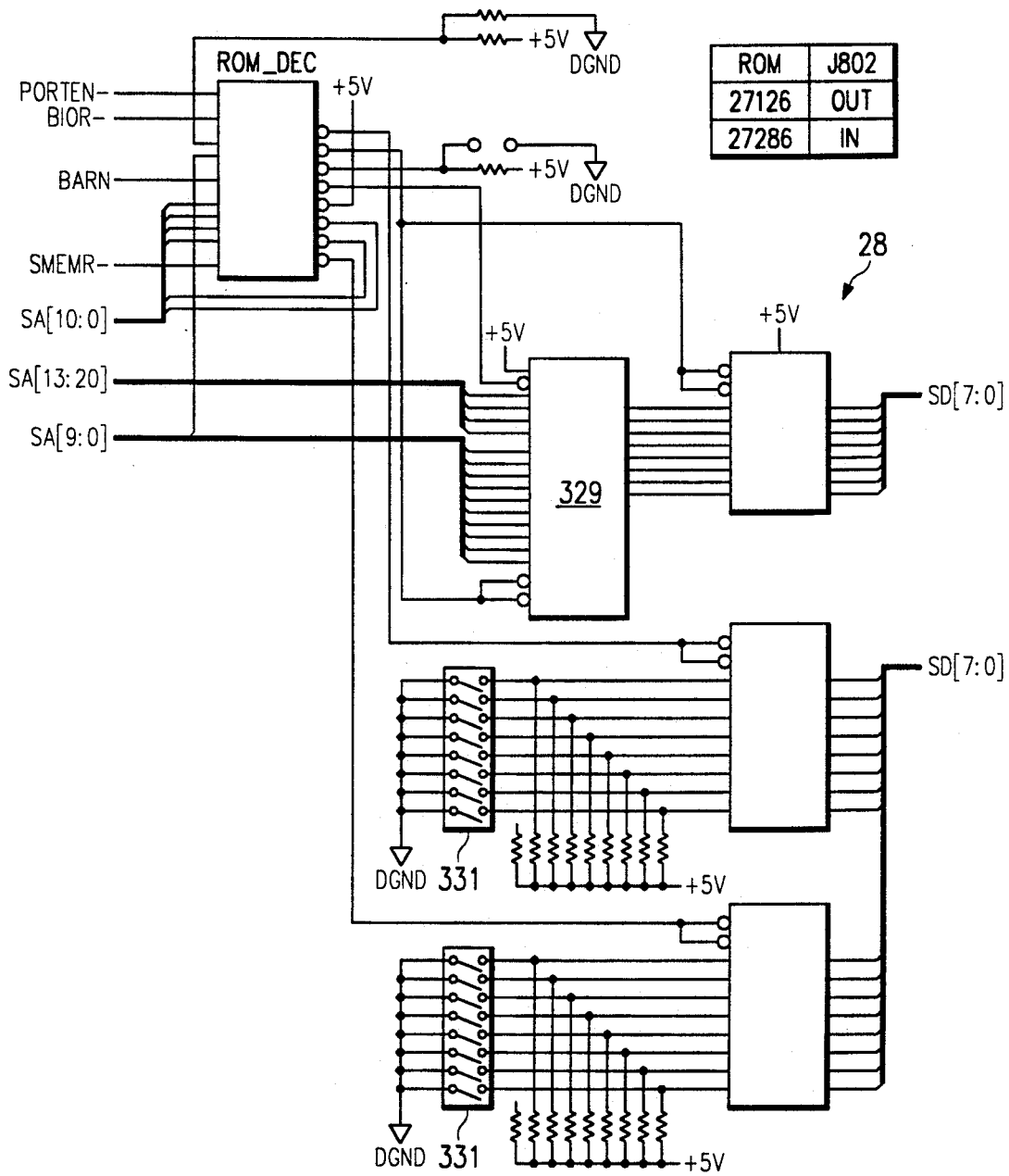

FIGS. 30 through 32 provide detailed schematic drawings for the SCSI interface 310 of the present invention. FIG. 30 shows the SCSI controller 310, FIG. 31 shows the SCSI bus interface 317, and FIG. 32 the BIOS ROM 329 and option switches 331 for the preferred embodiment.

The SCSI interface 310 of FIG. 30 is a single chip controller and is ranked as a second generation SCSI chip. The hardware provides a 128 byte FIFO for data bus and an 8 byte FIFO for SCSI bus transfers. The SCSI interface 310 supports both synchronous and synchronous bus transfers. Automatic selection and reselection of SCSI sequences are performed by the hardware to reduce the need for host processor intervention. The SCSI controller can support data transfer rates of up to 4 megabytes/second. The SCSI interface 310 will support internal and external devices.

SCSI interface 310 is a single-chip adapter for host computer 24 that provides low-cost connectivity to multiple SCSI peripherals. SCSI interface 310 supports 8-bit DMA or 16-PIO transfers with the host computer 24. Supporting up to eight simultaneous I/O tasks the SCSI interface of the preferred embodiment is part number AIC-6260 manufactured by Adaptec, Inc.

Adaptec provides a software DOS manager and several drivers for SCSI devices. The CD-ROMs, hard disks and tape drives are currently supported by Adaptec with software drivers. The Adaptec reference guide for the AIC-6260 preferred embodiment provides register descriptions appropriate for the purposes of the present invention.

Figure 33:
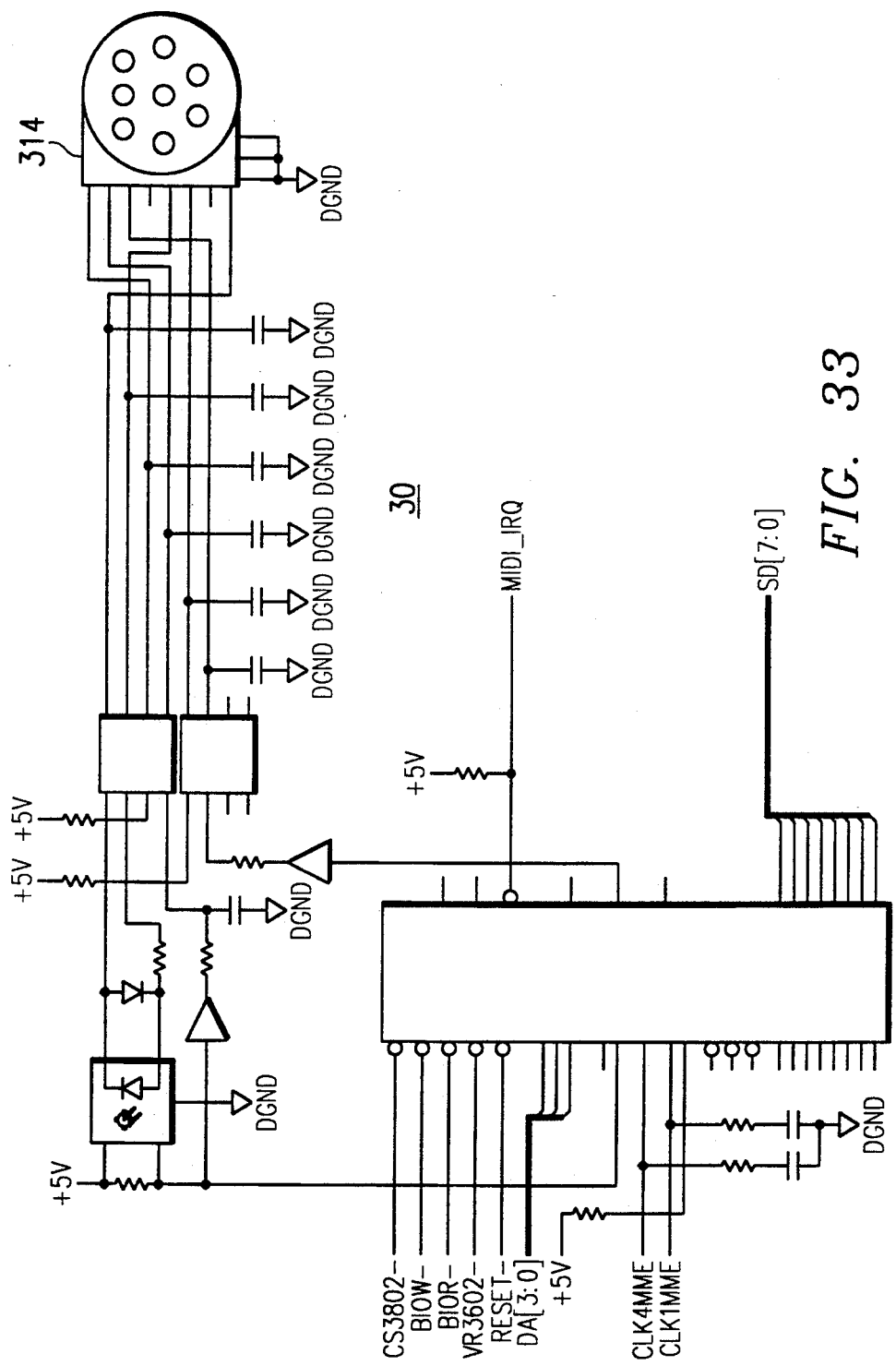

FIG. 33 illustrates the detailed schematic for MIDI interface 30 of the preferred embodiment. MIDI 30 is comprised of a single channel synchronous communications element (ACE) capable of buffering up to 16 bytes of data for transmission and up to 128 bytes of data on reception. MIDI 30 contains an integral FIFO threshold trigger level that is programmable to 4, 8, or 14 bytes. Internal registers allow programming of various types of interrupts, modem controls, character formats, and data rate. The MIDI 30 is a software oriented device using a three-state, 8-bit, bi-directional data bus. In the preferred embodiment, MIDI is the Yamaha 3802.

The MIDI interface 30 of FIG. 33 is very similar to a serial port. The only differences are a fixed clock rate of 31,250 baud (which is derived from the 14.318 MHz bus signal oscillator), and the electrical interface, an optically isolated 5 milliamp current loop. Three connections are provided, including MIDI in, MIDI out and MIDI pass through. There is a single 6-pin mini-din connector on the back of the multimedia board. A "Y" cable will be necessary to make the actual MIDI hardware compatible connections. This "Y" cable is IBM ® PS1 ® compatible. The MIDI interface is implemented with a Yamaha YM3802 chip. The Yamaha chip is a specific MIDI interface device with integral FIFO, (128 byte capacity input and 16 byte capacity output), a 14 bit counter/timer and several other MIDI specific functions The Yamaha application manual for the YM3802 provides register descriptions and programming information for MIDI interface 30. Various software drivers are available for integration of the YM3802 into the multimedia environment.

Figure 34:
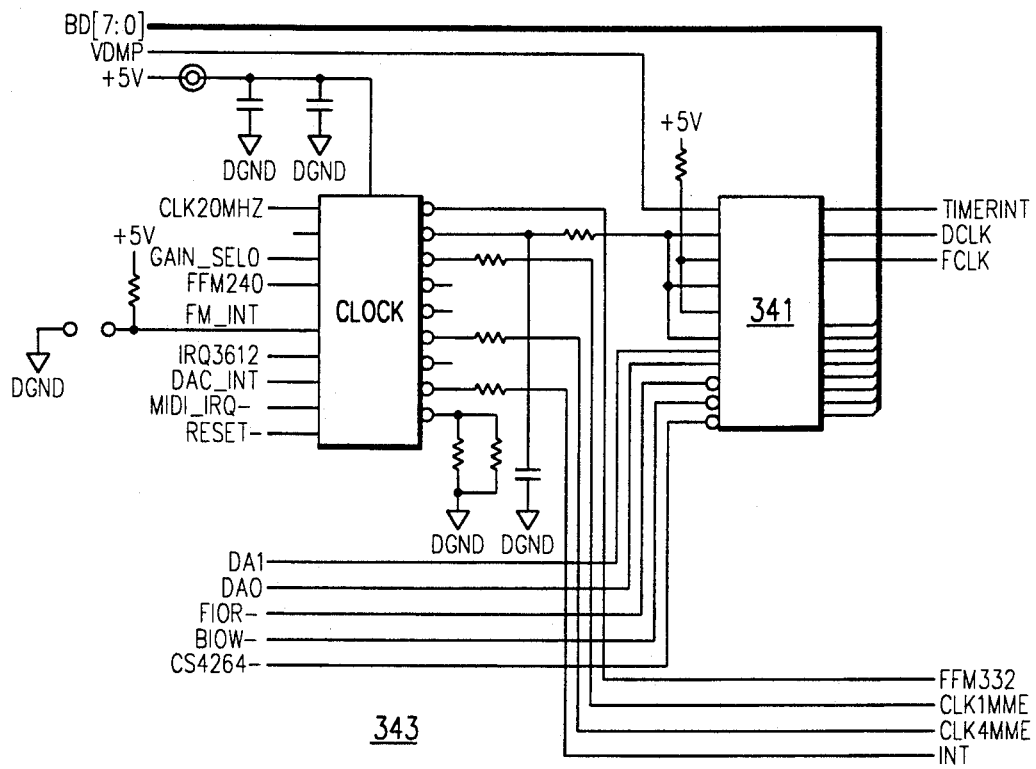

FIG. 34 shows the detailed schematic diagram of the clock generation circuit 343 necessary for the proper operation of MIDI interface 30 and programmable timer 341. Connections to other portions of audio multimedia circuit are as shown in FIG. 34.

FIG. 34 shows 82C54 programmable interval timer circuit 341, which is connected to the inputs of the sample rate selector multiplexer. If the rate selection is set at 00, then timer 1 generates the sample rate and Timer 0 generates the filter clock for the converter. The timers should be set to run in mode 3, square wave generator. The input clock is 10 MHz. This will yield a wide range of possible sample frequencies. There is a caution in that 10 MHz does not perfectly divide to the desirable 44.1 kHz signal, but the error is only 0.1% (i.e., 10 MHz/227=44.0528 kHz). Timer 0 should always be programmed to produce an output which is not more than 25 times the frequency of timer 1. A value of 20 times is recommended. The timers are programmed according to the standard specification and I/O addresses are assigned 38C timer 0, 38D timer 1, 38E timer 2, and 38F timer control register. Alternate addresses are not selectable.

Figure 35:
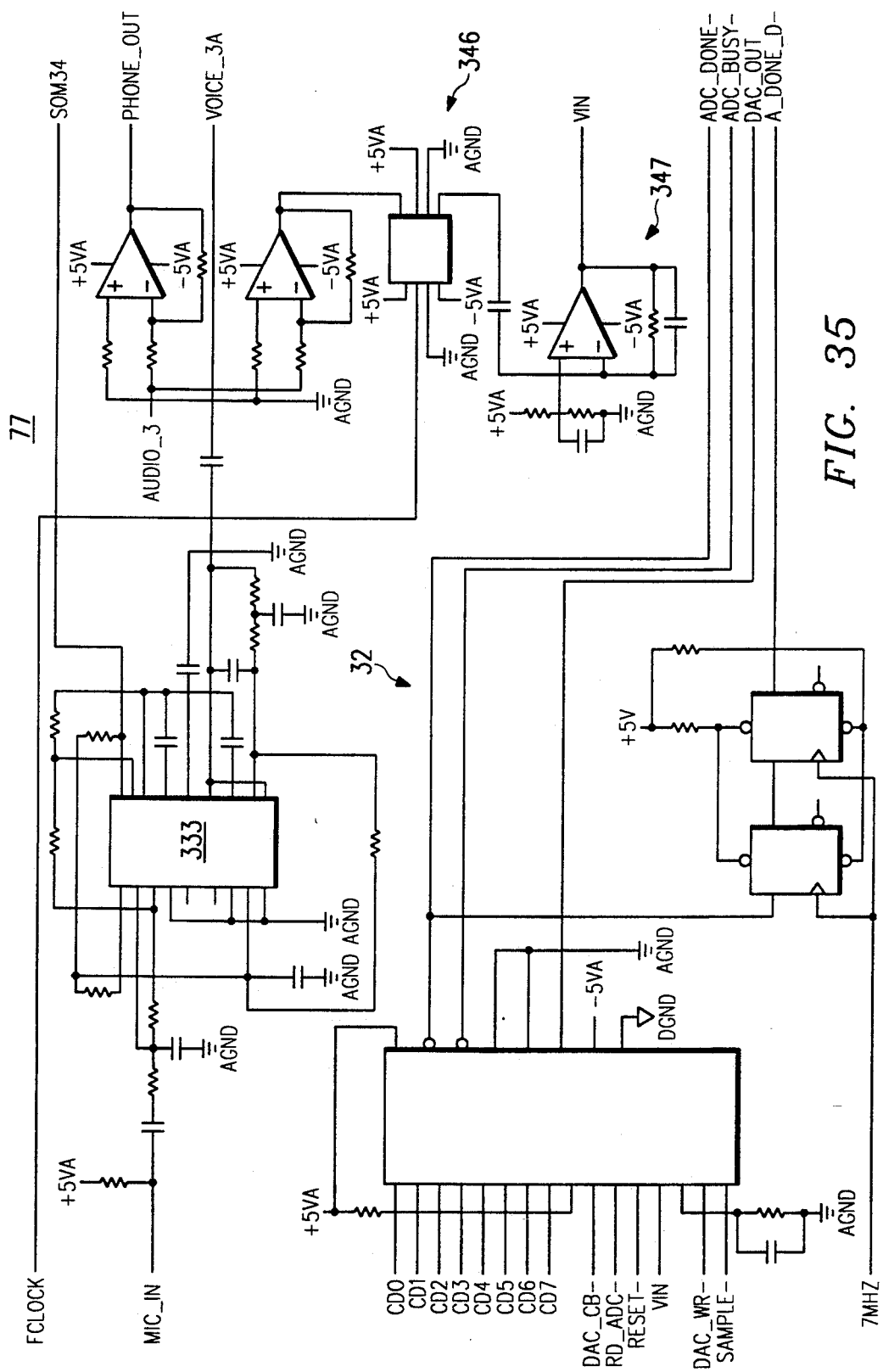
Figure 36:
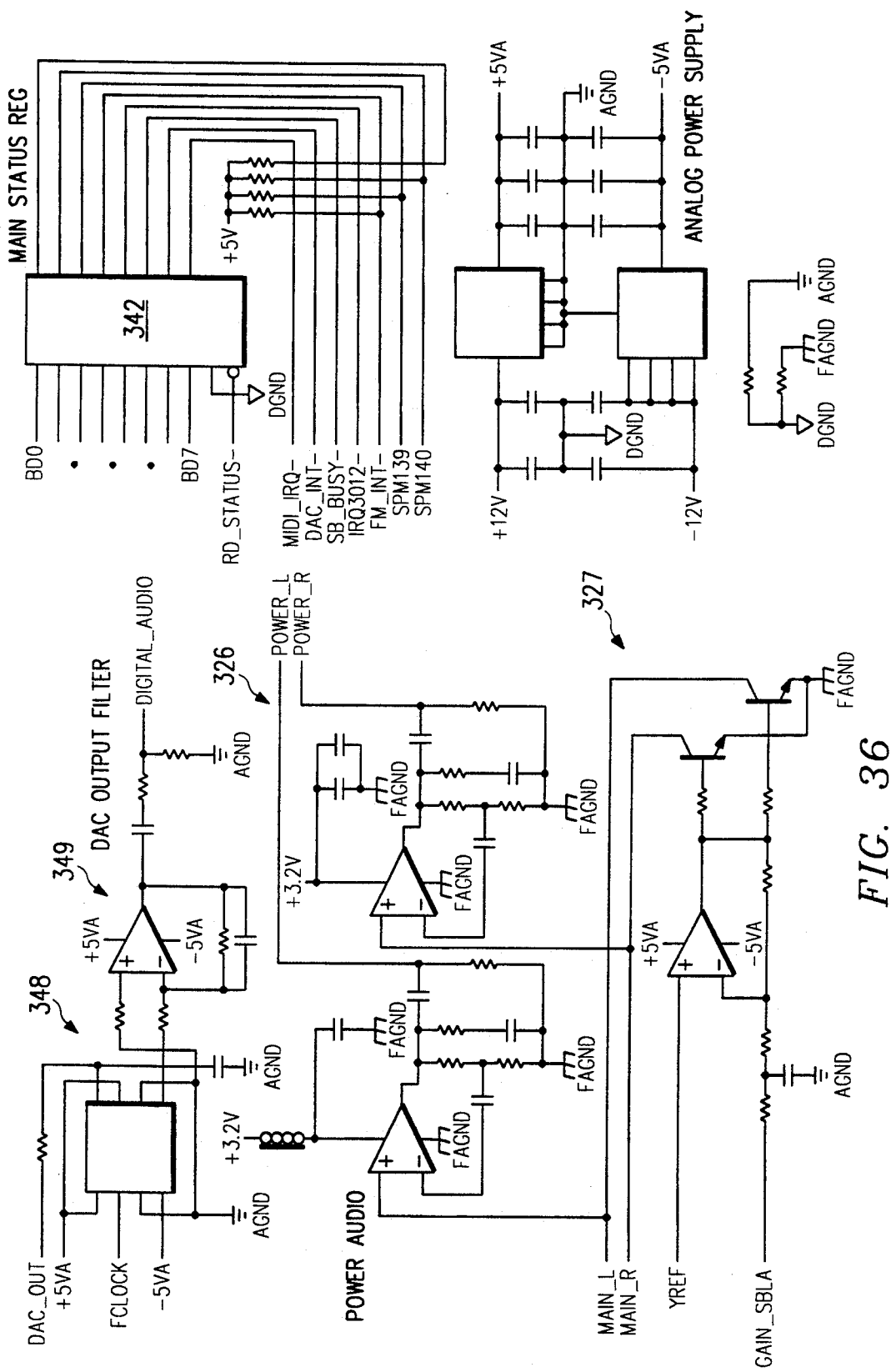
Figure 37:
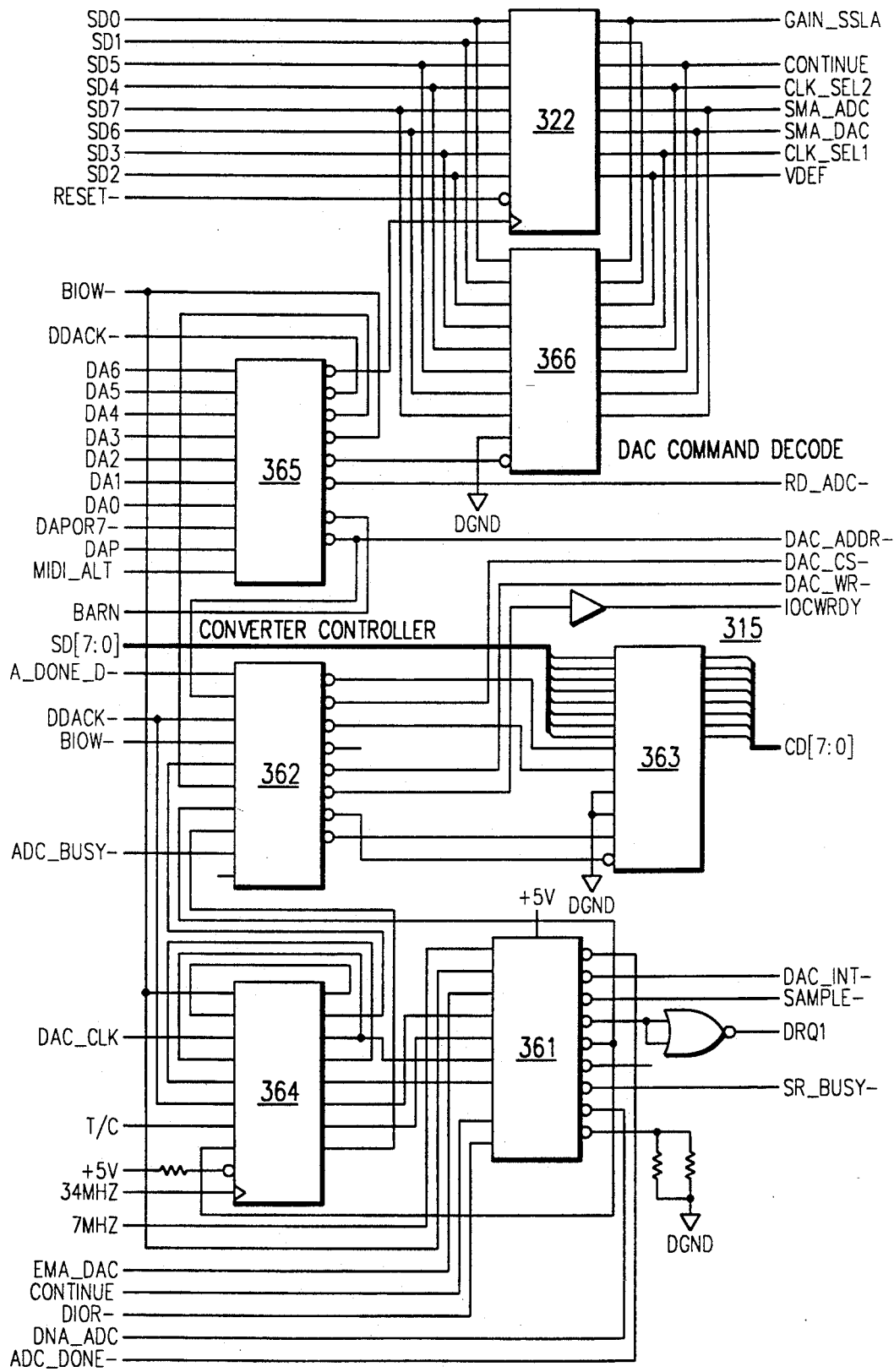

FIGS. 35 through 37 show the detailed schematic of A/D-D/A converter 32 and DMA state machine 315. FIG. 35 shows the A/D-D/A converter 32 detailed schematic, FIG. 36 shows the digital-to-analog output filter for D/A-A/D converter 32. FIG. 37 shows the converter controller or DMA state machine 315 that controls converter 32.

FIG. 35 illustrates A/D-D/A converter 32 that consists of an 8-bit A/D converter and a D/A converter in a single chip. The interface supports direct programmed I/O and DMA access. While programmed I/O is simple to handle, DMA provides for a more consistent sample rate with resulting better fidelity. It is not possible to support simultaneous DMA of both A/D and D/A. If concurrent operation is required, it can be achieved by running one direction DMA and the other programmed I/O. Two I/O ports are provided, I/O port 332 controls the DMA parameters and returns the status. The second allows direct access to the digital data for the converters 32.

The following are the definitions for the control port 322 bits for DMA control of A/D-D/A converter 32:

Bit 7 is the enable DMA analog-to-digital converter. When set, this bit starts the A/D converter sampling. The sample rate is selected by the setting of bits 3 and 4 and the programming of 8254 341 timers 0 and 1. When a conversion is complete, a DRQ will be sent to the host. This will result in the data being transferred to the host.

Bit 6 enables the DMA digital-to-analog conversion. When set, this bit initiates a DRQ to the host for transmission of the first byte of data for the D/A converter. When the converter has accepted this byte, a new one will be requested at the appropriate time to support the selected data rate.

Bit 5 is a continuous mode bit. When reset, the active DMA device will terminate activity when the terminal count is reached. Terminal count is reached when the host DMA controller detects and end of the current buffer. When the terminal count is reached, an interrupt will be generated. When set, an interrupt will be generated at the terminal count, but activity will continue. This mode is intended to complement the auto-initialize mode on the DMA controller. It is the responsibility of the driver to allow buffer wraparound at interrupt or be able to reconfigure the DMA controller for a new buffer before the next DMA transfer occurs. Bits 4 and 3 control a multiplexer which selects the sample and filter clocks. These two bits define the converter sample rate as follows: −4 −3 defines sample rate set by timer 0 and 1; −4 +3 11.025 kHz; +4 −3 22.05 kHz; and +4 +3 44.100 kHz.

Bits 2, 1 and 0 are not associated with the converters, but are defined as follows:

Bit 2: TIMER 2 COUNT ENABLE. This bit is connected to the GATE 2 input of the 82C54. When set to 1 it allows the timer to run, when set to 0 it disallows the timer to count. For further functions refer to the 82C54 programming specifications.

Bit 1: TIMER 2 INTERRUPT ENABLE. This bit when set to 1 allows timer 2 to generate an interrupt whose status is available in the main status register bit 5. When this bit is 0, timer 2 interrupts are disabled and reset, and status bit 5 is reset.

Bit 0 is the audio amplifier enable bit. This bit enables the power amplifier for the speakers. When set to a 1, the amplifiers are enabled. When set to a 0, the amplifiers are muted. When the multimedia board is first powered up, the amplifiers are disabled to prevent uncontrolled output from occurring.

All bits in this register are reset upon power up.

The preferred embodiment of the present invention uses an Analog Devices AD7569 8-bit analog I/O system as A/D-D/A converter 32. A/D-D/A converter 32, as such, contains a high speed successive approximation ADC with 2 μsec conversion time, a track/hold amplifier with 200 kHz bandwidth, a DAC and output buffer amplifier with 1 μsec. settling time. A temperature-compensated 1.25 V bandgap reference provides a precision reference voltage for the ADC and the DAC.

Due to the Nyquist theorem of aliasing of digitally sampled signals it is necessary to limit the band pass of signals being sampled to less than ½ the sample rate. In order to provide maximum flexibility of sample rates, i.e. any integral division of 10 MHz covering the range from 1 KHz through 48 KHz, a flexible bandpass filter is required. The most expedient approach is to utilize a clocked switched capacitor filter system.

In the preferred embodiment a pair of MF4 devices are used, 346 and 348, one each for the ADC and DAC channels. These devices in conjunction with an associated op amp, 347 and 349, provide effective 5 pole low pass Butterworth filters to limit upper bandwidth. The MF4 filters 346 and 348 are 4th order Butterworth filters and provide 3 db rolloff at a frequency which is approximately 1/50th of their input clock. This input clock is selected through multiplexer 350, FIG. 3B. The source of these filter clocks can be either oscillator Y2 350 or PAL 351 on FIG. 27, or Programmable Interval Timer 341 of FIG. 34, via multiplexer 350, FIG. 38.

Selecting a filter clock frequency of 25 times the sample clock frequency will result in a rolloff at ½ the sample rate, I.E. Fcutoff=Fclock/50, for Fc=Fsample-rate/2 then Fsample-rate/2=Fclock/50 or Fclk=25Fsample-rate. When using the interval timer 341 a value of 20x is recommended to provide addition margin without unduly sacrificing bandwidth.

FIG. 35 also illustrates the microphone interface 77. This consists of IC 333 and associated components. IC 333 is an amplifier for the microphone input 76. In the preferred embodiment this device is an NE575 compander. It is configured as an Automatic Loudness Control such that user adjustment of volume level is obviated without regard of the proximity of the microphone to the input sound source. This configuration limits the volume level that is input to the A/D converter 32, minimizing the amount of clipping that would occur should the input exceed the dynamic range of the converter 32.

FIG. 36 shows main status register 342 which provides status information for the various functions of the audio multimedia circuitry 18. In particular, the main status register 342 details which device is requesting interrupt service. This is because some of the devices share a common hardware interrupt. Main status register 342 is a read only register.

Referring to main status register 342, the following are the bit definitions in the preferred embodiment:

Bits 7 and 6 are undefined.

Bit 5 is a timer interrupt that reflects the output of the 8254 timer 2 341 which is undedicated. When set, to a 0 the timer has an interrupt.

Bit 4 is for the remote control data available interrupt. This bit, when 0, indicates that the remote control data buffer is full. This bit is reset by reading the data port on remote control circuit 50. If no remote control circuit is present, this bit is always false.

Bit 3 is a synthesizer interrupt that the sound synthesizer, YM3811, has pending if the bit is 0. Bit 2 is the audio serial bus ready input, when high, this bit indicates that the serial bus which controls the mixer and volume control is available. When low, the serial bus is busy and must not be accessed because this will corrupt the previously loaded command.

Bit 1 is a DMA interrupt. When the DMA channel has reached terminal count, this bit is set to 0. This bit can be reset (to clear the interrupt) by either disabling the active channel or, in continuous mode, by resetting and restoring the continuous mode bit. Resetting the active channel in continuous mode will terminate the channel and the interrupt, whereas toggling the mode bit will reset the interrupt while allowing DMA to continue. Finally, bit 0 is the MIDI port interrupt bit. When this bit is 0, the MIDI controller, YM3802 in the preferred embodiment, has an interrupt pending. The interrupt vector is readable at I/O port 221h. This bit is reset by reading the UART's data port.

An undedicated timer interrupt is provided from the output of an 82C54, 341 timer 2. This timer runs at 10 MHz and may be programmed in any manner as may be required. Status of the interrupt is in the main status register 342 bit 5. The timer is accessible as I/O addresses 38e and 38f.

FIG. 36 also shows the MF4 filter 348 and op amp 349 for the D/A converter. The audio power amplifiers 326 are shown along with a power on muting circuit 327. This circuit prevents unintentional noise from being passed to the speakers during the interval between when power is first applied to the circuit and the time that intentional output is desired. This circuit is controlled by DMA Control Register 322 bit 0.

Finally, FIG. 36 shows the voltage regulators 325 that provide isolated power to the low level audio circuits. These regulators minimize noise from host computer 24 being injected into the audio paths.

FIG. 37 illustrates the detailed schematic of DMA state machine 315. The analog-to-digital state machine is simple; analog-to-digital conversions are begun at the falling edge of the digital-to-analog conversion clock, to keep them synchronous. The conversion complete status signal ADC_DONE from the converter is used to generate a DMA transfer request to host computer 24. When the data is transferred the request is reset. Sufficient time should exist between completion of an analog-to-digital conversion and the next falling edge of the digital-to-analog conversion clock for a DMA read to occur without danger of overrun.

The digital-to-analog sequence requires prefetching a byte prior to the next rising edge of the digital-to-analog conversion clock whereupon it is loaded into the converter. A DRQ is immediately started when the analog-to-digital converter is enabled. Once the byte is received, it is temporarily latched in a register until the next rising edge of the digital-to-analog converter clock. It is then loaded into the digital-to-analog converter and a new byte is requested. Again, use of the digital-to-analog converter clock keeps the data flow constant.

Interrupts are generated whenever a terminal count is reached. In "normal" mode, the terminal count also terminates the DMA state machine and no more transfers will occur. Interrupt can be reset by disabling the device that was active. In "continuous" mode, an interrupt occurs at the terminal count, but transfers continue by wrapping around to the beginning of the buffer. Interrupt can be reset by toggling the Continuous control bit in DMA control port 322 off, then on, sequentially. This will not affect the operation of the transfer machines.

Due to complexity, simultaneous DMA operation of both the digital-to-analog converter and analog-to-digital converter is prohibited. It is possible however, to do both DMA analog-to-digital conversion operations and programmed I/O operations to the digital-to-analog converter, but stability of the digital-to-analog conversion rate is less accurate. Attempting to do DMA digital-to-analog conversions and simultaneously programmed I/O to the analog-to-digital converter will result in intermittent erroneous data being returned due to the fact that there is no way to block the digital-to-analog converter load if it occurs during a read. Since there is only bus, it will be directed towards the converter and a read will return null data.

DMA State Machine 315 consists of PALs 361, 362 and 365, synchronizing register 364 and data register 363. DMA Control Register 322 enables the DMA State Machine and controls its operating parameters. Buffer 366 provides readback capability of Control register 322.

PAL 365 provides address and command decoding for the DMA State Machine 315. PAL 361 controls the generation of DMA data transfer requests, DMA generated interrupts and A/D conversion starts. PAL 362 controls the actual data transfer during either DMA or programmed I/O. It manages the direction and latch controls of buffer 363. Synchronizing register 364 prevents metastability problems from occurring in the DMA State Machine due to the different operating clocks between the DMA State Machine 315 and host computer 24.

Figure 38:
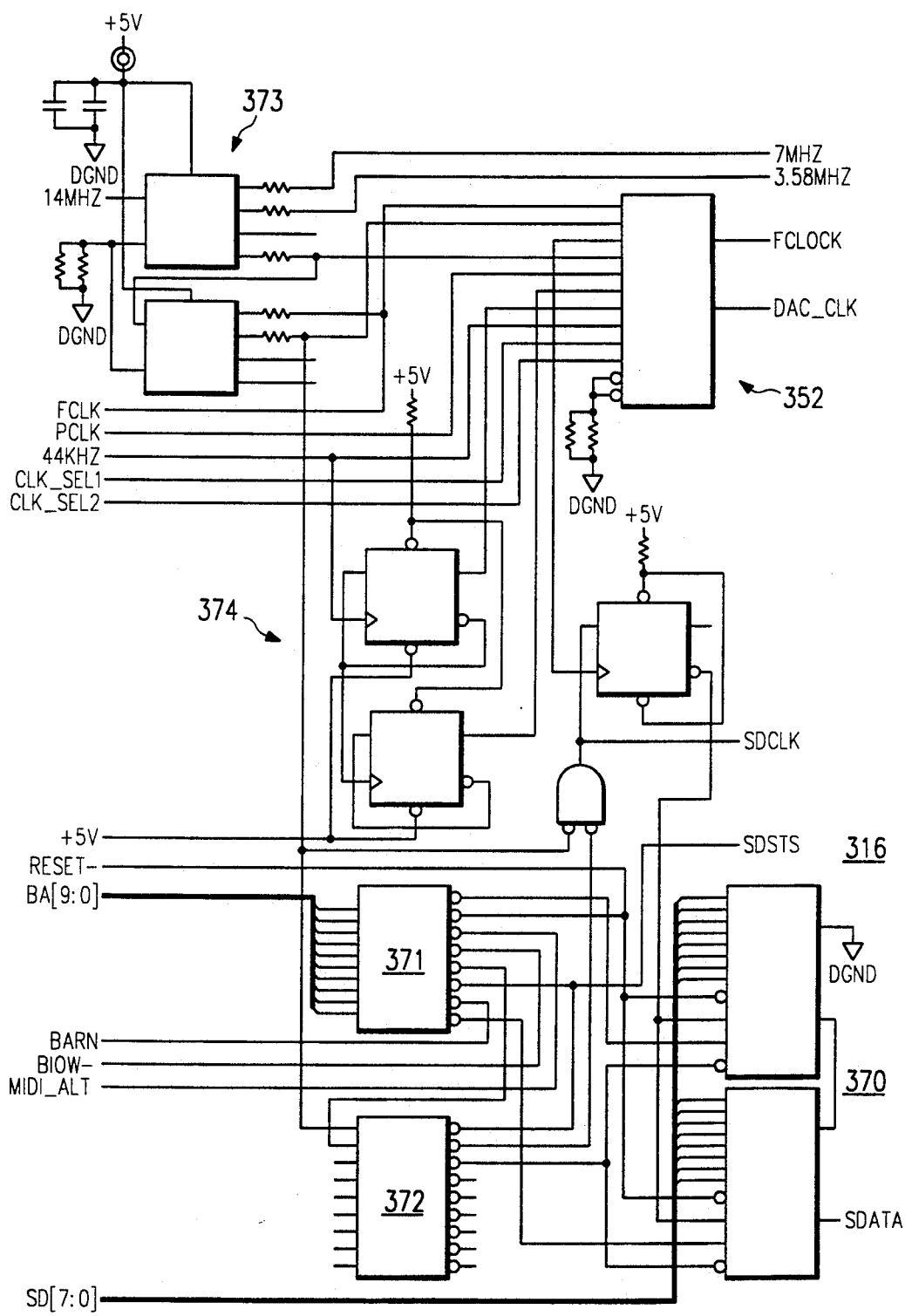

FIG. 38 shows the serial bus controller 316 of the preferred embodiment of the present invention. Serial bus controller 316 controls mixer 70 and volume/tone controller 319. Serial bus controller 316 is a pair of write only registers that accept the 16 bit command for the devices as defined by Toshiba. The registers may be loaded individually or simultaneously. If they are loaded serially, the high register must be the last loaded. When the high register is loaded, a sequencer is started which sends the data to the controllers. This takes approximately 80 μs. In order to monitor the status of the sequencer, a busy indicator is provided in the main status register 342. When the bit is high, the bus is available for loading a new command. When low, a new command must not be loaded, as it will corrupt the current transmission in progress.

Serial bus controller 316 comprises a 16-bit shift register 370 and associated PALs 371 and 372 to generate the clock signals necessary to get control information transferred to the volume control 318 and 7:1 mixer 70.

PAL 371 decodes the serial bus commands as sent by host computer 24 and controls loading of volume/tone/mixer information into shift register 370. It also initializes sequence counter PAL 372. PAL 372 generates the clocks and strobe signals necessary to transfer the volume/tone/mixer information from the input to the output of shift register 370 and eventually to the Volume Control 318 and Mixer 70.

FIG. 38 shows the generation and selection of clocks necessary to operate the DMA State Machine 315, the Serial Bus Controller 316, the A/D-D/A converter 32 and the filters 346 and 348. A 14.318181 MHz Clock is received from host interface 300 and scaled by divider 373 to produce a number of low frequency clocks. 7.1 MHz and 3.58 MHz are used by the DMA State Machine. 223 KHz is used by the Serial Bus Controller 316. 894 KHz, 447 KHz and 223 KHz can be used by filters 346 and 348. 44.1 KHz from oscillator 350 is divided by flip flops 374 to provide 22.05 KHz and 11.025 KHz. These three frequencies are the preferred sample rates for the A/D-D/A converter 32. Selection of the converter sample rate and filter clock is via multiplexer 352.

Figure 40:
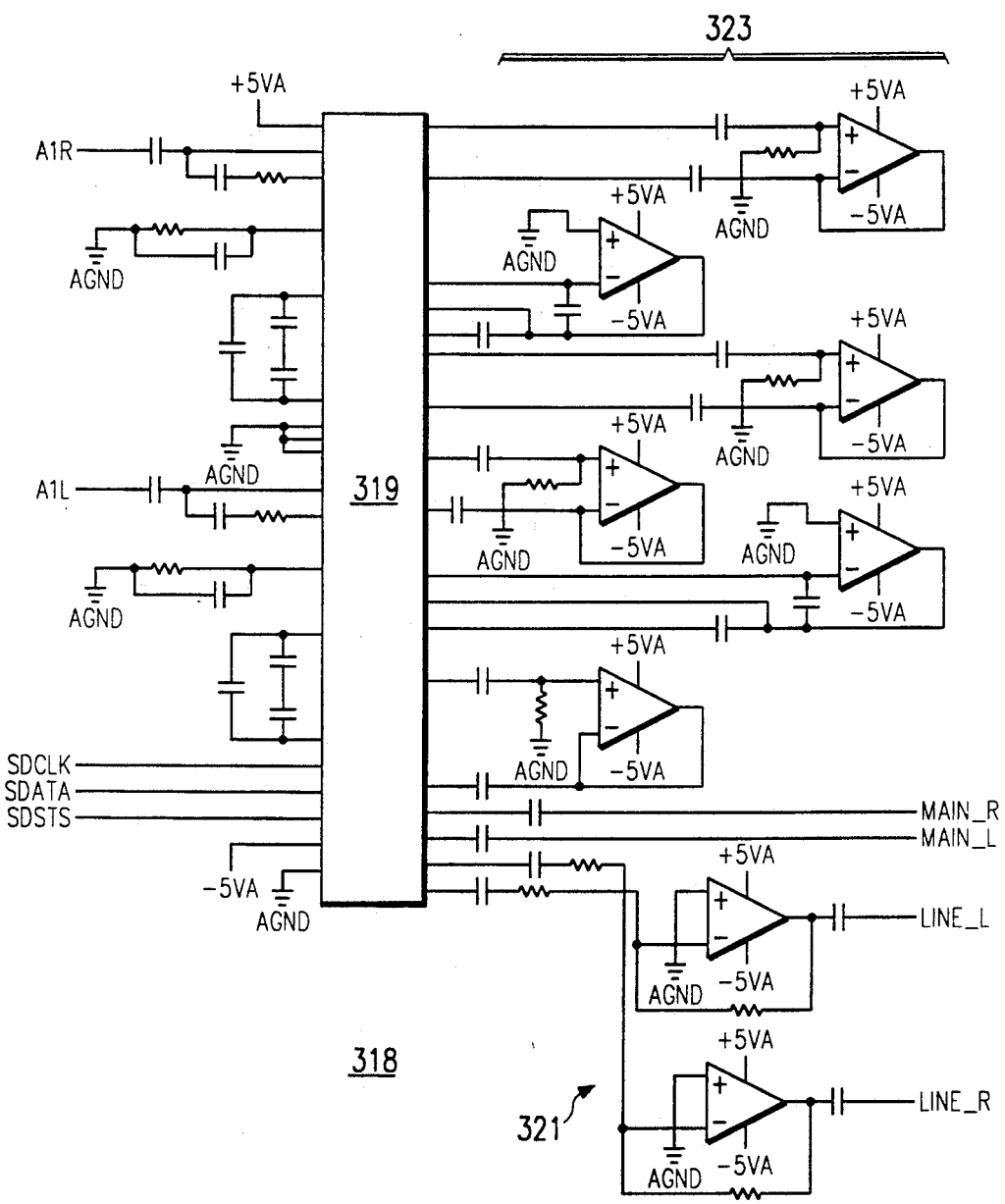

FIGS. 39 and 40 are schematics of audio subsection including 7:1 mixer 70 and volume/tone control 318. 7:1 mixer 70 has 7 input channels including: (1) stereo CD player 28 input; (2) D/A converter 32 monaural input; (3) sound synthesizer 33 monaural input; (4) AM/FM tuner circuit 48 stereo input; (5) television circuit 46 monaural input; (6) aux1 72 stereo input; and (7) data/fax/voice modem circuit 44 monaural input. Outputs from 7:1 mixer 70 go directly to volume control 318.

Mixer 70 also includes a pair of stereo switches which are configured to provide stereo to monaural conversion and selection of microphone input 76 or mixer 70 output as input for A/D converter 32. Mixer 70 allows selecting any or all inputs. Twelve levels of mixer volume are provided. For specific programming information, refer to the programming specification for the Toshiba TC9187 unit.

The detailed schematic diagram for 7:1 mixer 70 appears at FIG. 39. For 7:1 mixer 70, the present invention uses a single integrated circuit, No. TC9187AF manufactured by Toshiba.

Audio mixer 70 is a digitally controlled device with 7 pairs of inputs. Although the primary application of this device is for a graphic equalizer, it is here used as a mixer since its architecture is simply seven pairs (stereo) of independently adjustable attentuators. By sending a control word via a serial bus interface, the various inputs can be adjusted. The control word consists of 2 bytes and is organized as described in the following table:

TABLE 3

| BIT | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 1 | 0 | 1 | 1 | D4 | D3 | D2 | D1 | A4 | A3 | A2 | A1 | x | x | x | x |

Data bits 15 . . . 12 are the address of the TC9187.
Data bits 7 . . . 4 (A4 . . . A1) select the input to change as follows:

| A4 | A3 | A2 | A1 | |
|---|---|---|---|---|
| 1 | 0 | 0 | 0 | FF1/FF2 input selector for A/D converter, mono/stereo selector |
| 1 | 0 | 0 | 1 | channel 1 (digital audio from D/A converter) |
| 1 | 0 | 1 | 0 | channel 2 (sound synthesizer) |
| 1 | 0 | 1 | 1 | channel 3 (CD audio) |
| 1 | 1 | 0 | 0 | channel 4 (radio tuner) |
| 1 | 1 | 0 | 1 | channel 5 (auxiliary input) |
| 1 | 1 | 1 | 0 | channel 6 (TV sound) |
| 1 | 1 | 1 | 1 | channel 7 (telephone input) |

Data bits 11..8 (D4..D1) are used to set the step of each volume. These bits become the data to be used for varying, in 13 steps, the volume of the selected input. The volume settings are per the following Table 4.

TABLE 4

| D4 | D3 | D2 | D1 | STEP |
|---|---|---|---|---|
| 0 | 1 | 1 | 0 | CHANNEL FULL ON |
| 0 | 1 | 0 | 1 | −1dB |
| 0 | 1 | 0 | 0 | −2dB |
| 0 | 0 | 1 | 1 | −3dB |
| 0 | 0 | 1 | 0 | −4dB |
| 0 | 0 | 0 | 1 | −5dB |
| 0 | 0 | 0 | 0 | −8dB |
| 1 | 1 | 1 | 1 | −10dB |
| 1 | 1 | 1 | 0 | −12dB |
| 1 | 1 | 0 | 1 | −18dB |
| 1 | 1 | 0 | 0 | −22dB |
| 1 | 0 | 1 | 1 | −30dB |
| 1 | 0 | 1 | 0 | CHANNEL FULLY MUTED |

Settings for FF1 and FF2 are:

| D4 | D3 | D2 | D1 | ACTION | FUNCTION |
|---|---|---|---|---|---|
| x | x | x | 1 | FF1 Reset | microphone is A/D input |
| x | x | 1 | 0 | FF1 Set | mixer is A/D input |
| x | 1 | x | x | FF2 Reset | stereo |
| 1 | 0 | x | x | FF2 Set | monaural |

FF1 is a multiplexer which can switch the input to the analog-to-digital converter 32 between the microphone and the output of the mixer 70. This allows recording either voice input or any combination of other inputs. Setting FF1 will select the mixer as the input. Resetting FF1 selects the microphone input. FF1 is initialized to deselect the microphone input. FF2 selects whether the output of the mixer will be stereo or monaural. The default condition is stereo, setting FF2 makes the output monaural.

Figure 46:
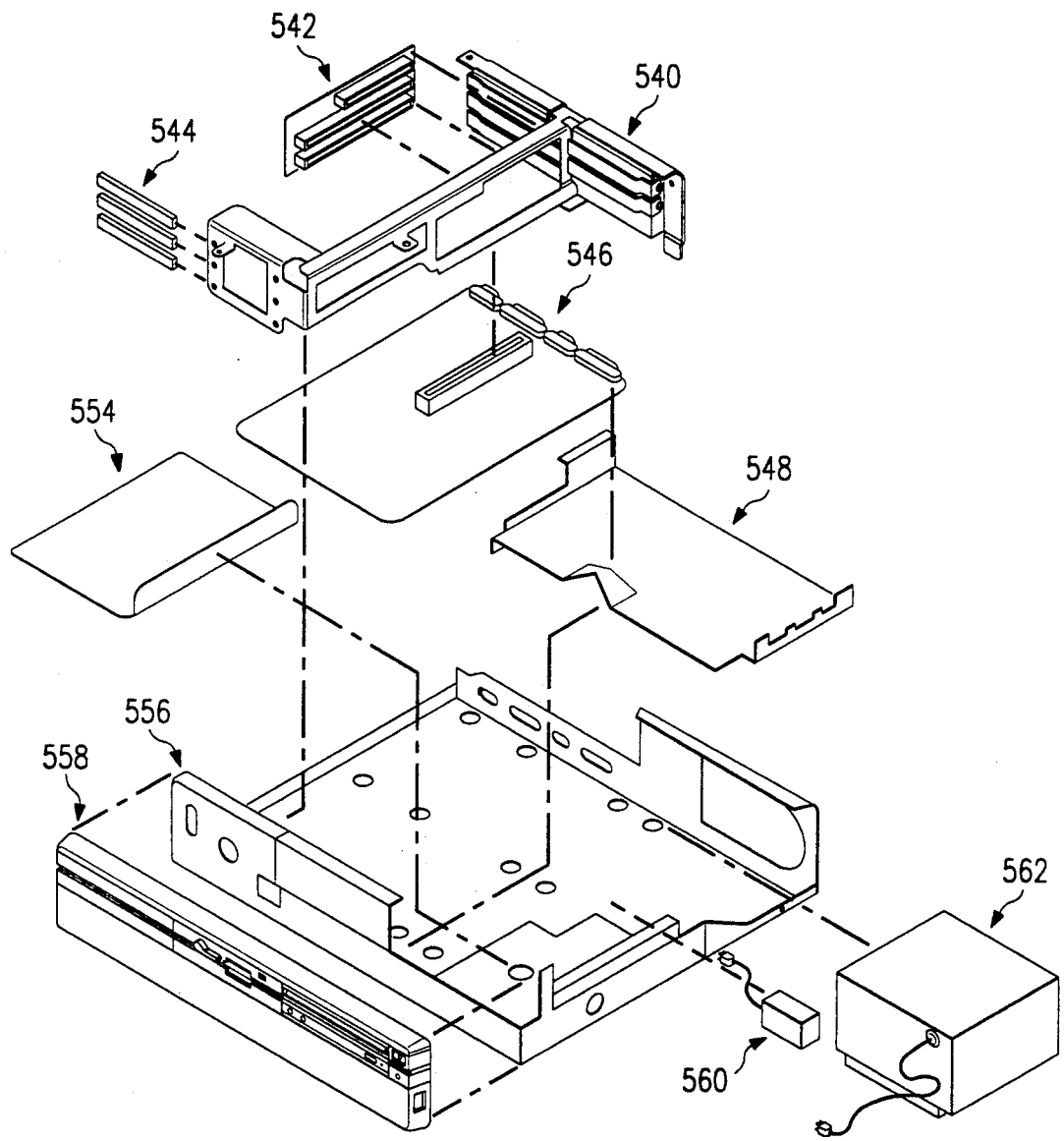
FIG. 46 illustrates the further connection of expansion bracket assembly into the host computer chassis of the preferred embodiment.

FIG. 46 shows the detailed schematic diagram for the volume/tone control circuit 318. Volume/tone controller 319 is an integrated circuit which allows electronic adjustment of volume, balance, treble, bass and loudness compensation of a stereo analog input. A fader adjustment is also provided to allow relative volume adjustment between a pair of outputs, one connected to the power amplifiers 326 the other connected via buffer amps 321 to the Line/Headphone output 320.

In the preferred embodiment volume/tone controller 319 is a Toshiba TC9188F. Since this part is a passive attenuator, op amps 323 provide buffering for volume functions and bandpass shifting for tone control. Selection and control of the adjustments is under software control via a serial bus connection. Volume can be attenuated from 0 to −79 dB in 1 dB steps. Bass and treble can be adjusted ±12 dB in 2 dB steps. One of the output channels can be selected to be faded from 0 to −60 dB in 16 steps, or turned off completely. Loudness compensation can also be enabled or disabled.

The following table describes the organization of the control word for the volume/control chip 319, which consists of two bytes.

TABLE 5

| BIT | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 1 | 0 | 0 | 1 | D8 | D7 | D6 | D5 | D4 | D3 | D2 | D1 | A4 | A3 | A2 | A1 |

Data bits 15 . . . 12 are the address of the TC9188.
Data bits 3 . . . 0 (A4 . . . A1) select the function to change as follows:

| A4 | A3 | A2 | A1 | |
|---|---|---|---|---|
| 1 | 0 | 0 | 0 | Volume Right |
| 1 | 0 | 0 | 1 | Volume Left |
| 1 | 0 | 1 | 0 | Bass adjust |
| 1 | 0 | 1 | 1 | Treble adjust |
| 1 | 1 | 0 | 0 | Fader adjust |

Data bits 11 through 4 appearing at D8 through D1 are used to set the step of volume, bass, or treble, If left or right volume is selected, the data bits D8 through D1 control the volume attenuation. If volume right is selected, D8 controls the loudness compensation for both channels. D8 is set to 0 to turn the loudness compensation off, D8 is set to 1 for the loudness compensation on. If volume left is selected, then D8 has no function. D7 through D5 control the volume in 10 dB increments. Bits D4 through D1 control the volume in 1 dB steps. The following table describes the incremental volume control that bits D7 through D1 provide.

TABLE 6

| D7 | D6 | D5 | STEP |
|---|---|---|---|
| 0 | 0 | 0 | 0dB |
| 0 | 0 | 1 | −10dB |
| 0 | 1 | 0 | −20dB |
| 0 | 1 | 1 | −30dB |
| 1 | 0 | 0 | −40dB |
| 1 | 0 | 1 | −50dB |
| 1 | 1 | 0 | −60dB |
| 1 | 1 | 1 | −70dB |

| D4 | D3 | D2 | D1 | STEP |
|---|---|---|---|---|
| 0 | 0 | 0 | 0 | 0dB |
| 0 | 0 | 0 | 1 | −1dB |

TABLE 6-continued

| | | | | |
|---|---|---|---|---|
| 0 | 0 | 1 | 0 | −2dB |
| 0 | 0 | 1 | 1 | −3dB |
| 0 | 1 | 0 | 0 | −4dB |
| 0 | 1 | 0 | 1 | −5dB |
| 0 | 1 | 1 | 0 | −6dB |
| 0 | 1 | 1 | 1 | −7dB |
| 1 | 0 | 0 | 0 | −8dB |
| 1 | 0 | 0 | 1 | −9dB |
| 1 | 0 | 1 | 0 | volume off |

If bass or treble is selected, data bits D4 through D1 control the setting. Data bits D8 through D5 are not defined. Bass and treble settings affect both channels as the following table indicates.

TABLE 7

| D4 | D3 | D2 | D1 | STEP |
|---|---|---|---|---|
| 0 | 1 | 1 | 0 | +12dB |
| 0 | 1 | 0 | 1 | +10dB |
| 0 | 1 | 0 | 0 | +8dB |
| 0 | 0 | 1 | 1 | +6dB |
| 0 | 0 | 1 | 0 | +4dB |
| 0 | 0 | 0 | 1 | +2dB |
| 0 | 0 | 0 | 0 | 0dB |
| 1 | 1 | 1 | 1 | −2dB |
| 1 | 1 | 1 | 0 | −4dB |
| 1 | 1 | 0 | 1 | −6dB |
| 1 | 1 | 0 | 0 | −8dB |
| 1 | 0 | 1 | 1 | −10dB |
| 1 | 0 | 1 | 0 | −12dB |

If the fader is selected, data bits D4 through D1 control the fader volume. The fader adjusts the balance between the power amplifier of audio multimedia circuit 18 and the head/headphone external jack. This allows setting the levels independently. Fader control affects both channels simultaneously. The fader controls attenuation only. Bit D8 controls which output pair is faded. When D8 is set to 0, the line output is faded, when D8 is 1, the onboard amplifier is faded. The following describes the bit sequence for fader control in volume/tone control chip 319.

TABLE 8

| D4 | D3 | D2 | D1 | STEP |
|---|---|---|---|---|
| 0 | 0 | 0 | 0 | 0dB |
| 0 | 0 | 0 | 1 | −2dB |
| 0 | 0 | 1 | 0 | −4dB |
| 0 | 0 | 1 | 1 | −6dB |
| 0 | 1 | 0 | 0 | −8dB |
| 0 | 1 | 0 | 1 | −10dB |
| 0 | 1 | 1 | 0 | −12dB |
| 0 | 1 | 1 | 1 | −14dB |
| 1 | 0 | 0 | 0 | −16dB |
| 1 | 0 | 0 | 1 | −18dB |
| 1 | 0 | 1 | 0 | −20dB |
| 1 | 0 | 1 | 1 | −26dB |
| 1 | 1 | 0 | 0 | −35dB |
| 1 | 1 | 0 | 1 | −45dB |
| 1 | 1 | 1 | 0 | −60dB |
| 1 | 1 | 1 | 1 | channel off |

There are three outputs available from audio multimedia circuitry 18, two of which include external connections. One is the output from amplifier, providing 2 watt RMS/channel. Speaker impedance may be any value greater than 2 ohms. Use of 4-Ω speakers is recommended because they can potentially deliver more volume than 8-Ω speakers. The second output is a low level stereo output that can be used to drive headphones or an external power amplifier. Volume control of this output can be independent of the power output as provided by the TC9188. The third output is a buffered version of the input to the analog-to-digital converter. This output is available on one of the internal connectors. It is intended to be an input to a phone device such as the fax/data/modem 44.

Multimedia circuitry 18 supports a number of I/O ports for control of its functions by the host computer 24. The hex address map for these ports is as listed below where the primary address is listed first and the alternate is listed in parentheses.

TABLE 9

| I/O Address | Cycle Type | Register Description |
|---|---|---|
| 0220 (0230) | Read only | Main status register |
| 0221 (0231) | Read only | YM3802 interrupt vector |
| 0222 (0232) | Read/Write | DMA control register |
| 0224 (0234) | Read/Write | A/D converter data port |
| 0226 (0236) | Write only | Audio mixer/volume control LSB |
| 0227 (0237) | Write only | Audio mixer/volume control MSB |
| 0228 (0238) thru | Read/Write | MIDI register 0 |
| 022F (023F) | Read/Write | MIDI register 7 |
| 0340 thru | Read/Write | SCSI registers |
| 035E | Read/Write | SCSI registers |
| 0388 | Read/Write | FM Sound generator register |
| 0389 | Write only | FM Sound generator register |
| 038C | Read/Write | Timer 0 |
| 038D | Read/Write | Timer 1 |
| 038E | Read/Write | Timer 2 |
| 038F | Read/Write | Timer Control Register |

There are two interrupts generated by audio multimedia circuitry 18. One is dedicated to SCSI controller 310. This provides compatibility with existing drivers. The second interrupt is shared amongst the MIDI controller 30, sound synthesizer 33, A/D-D/A converter 32 and AM/FM tuner circuit 48. This minimizes the number of hardware resources (IRQs) required. Both of the interrupts are selectable. The options for the SCSI controller 310 are IRQ 11 and IRQ 12. IRQs 9, 10 and 15 are selectable for the second interrupt.

Figure 41:
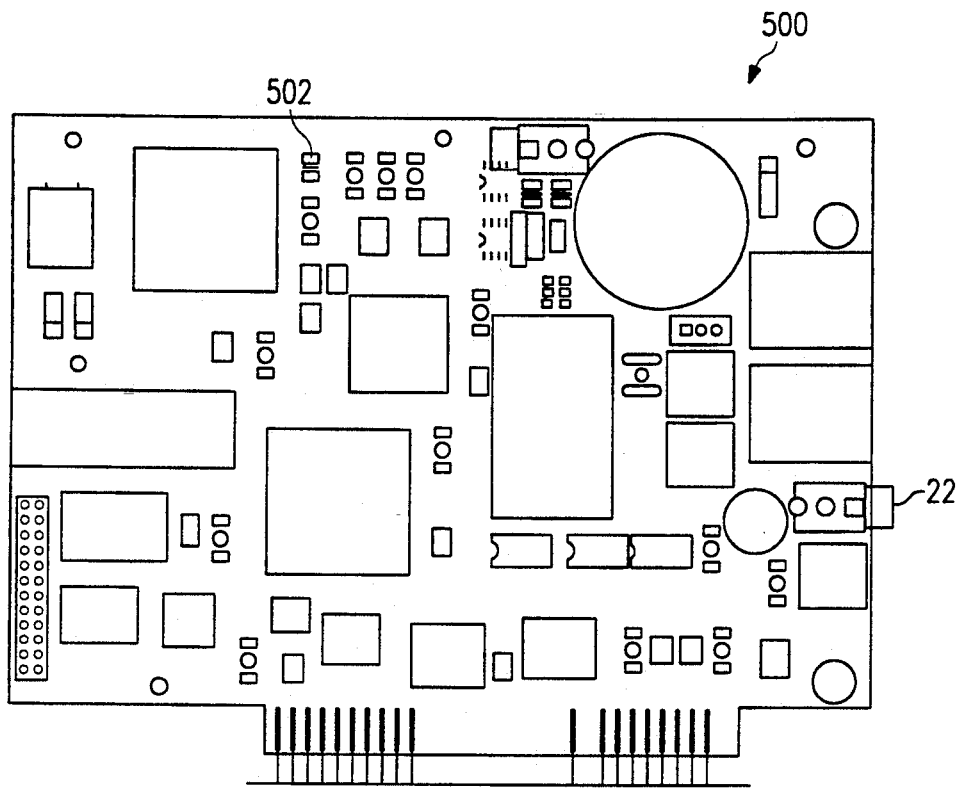
FIG. 41 shows component configurations for the expansion board of the preferred embodiment that contains the data/fax/voice modem circuit of the present invention.

FIG. 41 shows component configurations for the data/fax/voice modem board 500 that contain data/fax/voice modem circuit 44 for workstation 10. Component labels correspond to identifiers of detailed schematic drawings of FIGS. 6 through 12, above. The preferred embodiment uses double-sided surface mount technology and PALs for minimizing the amount of discrete logic circuits necessary for circuit logic functions. Board 500 also incorporates design for electromagnetic interference isolation.

A problem that the design of board 500 overcomes is the need for shielding telephone line 22. Because it is not possible to shield the telephone line 22, it is important to provide internal shielding in the rest of the circuit that will isolate telephone line 22. By carefully isolating the digital portions of modem circuit 44 from the analog portions, this problem is in large part solved. Ferrite beads 502 suppress the harmonics as signals leave the board to stop these emissions.

Figure 42:
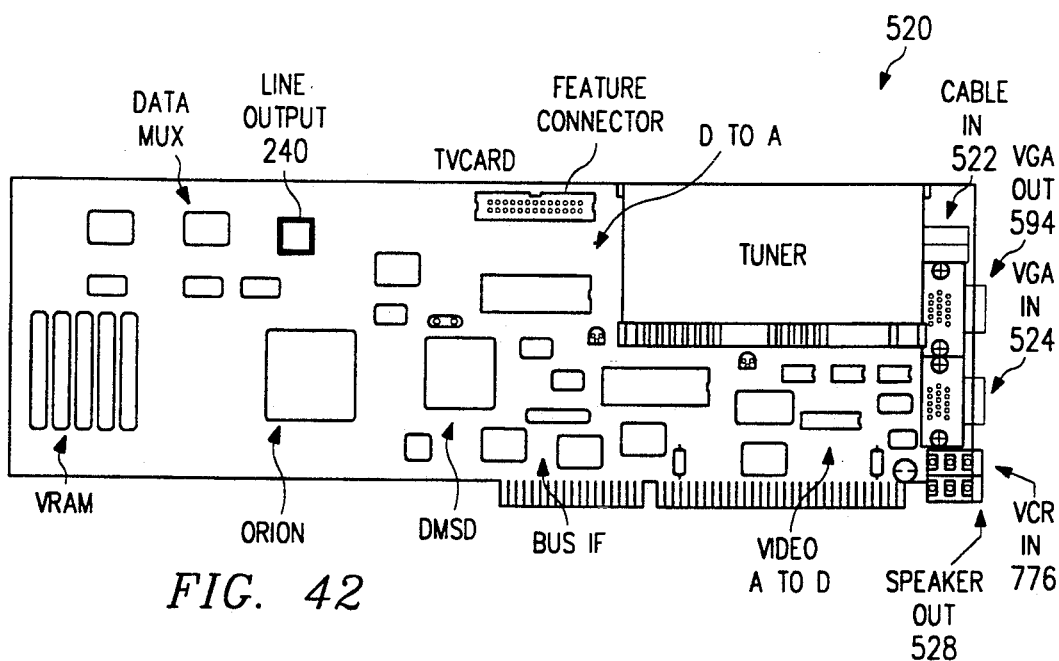
FIG. 42 shows component configurations for the preferred embodiment of the television expansion board of the present invention.

FIG. 42 shows component configurations for the television expansion board of workstation 10 of the present invention. Component labels correspond to identifiers of detailed schematic drawings of FIGS. 13 through 21, above. Television board 520 fits within chassis 20 along with other telecommunications circuitry 12 such as that of data/fax/voice modem circuit 44 on board 500 and includes connections for video and audio input. In the preferred embodiment of the television board 520, cable TV input 522 receives cable television input. VGA video input 524 may receive video input from a VGA controller, VCR audio input 776 and speaker audio output 528, respectively, communicate audio television signals between external devices and the television board 520.

Figure 43:
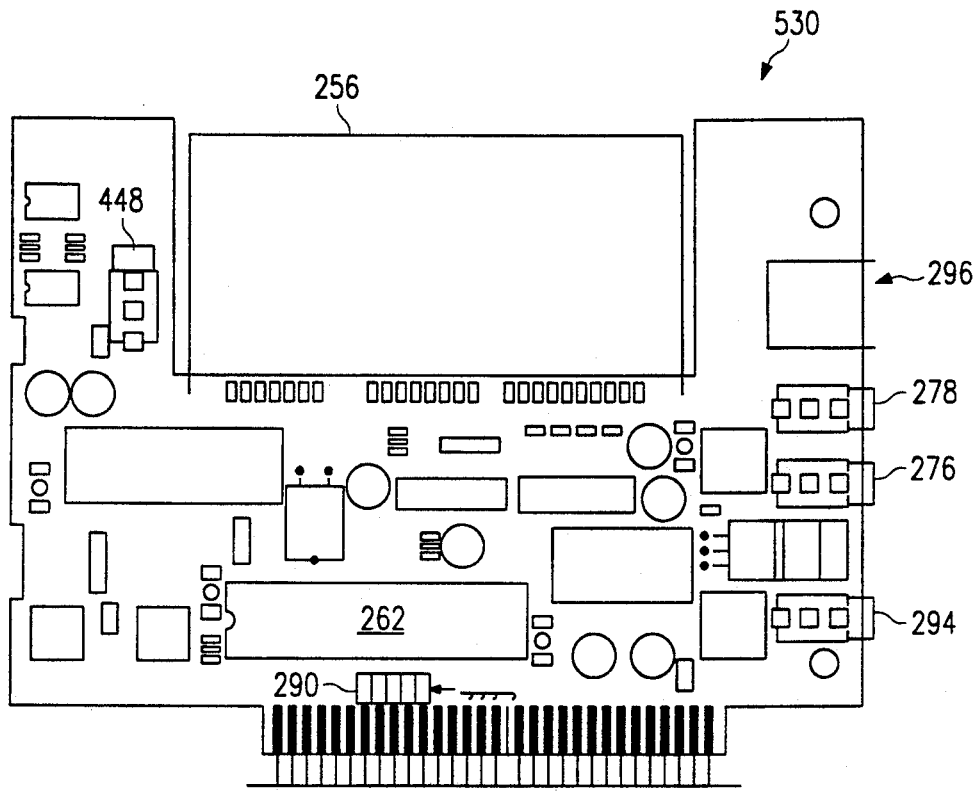
FIG. 43 shows component configurations for the AM/FM tuner and infrared remote control expansion board of a preferred embodiment of the present invention.

FIG. 43 shows component configurations for the AM/FM tuner and infrared remote control expansion board 530 of the workstation of the present invention. Component labels correspond to identifiers of detailed schematic drawings of FIGS. 22 through 25, above.

Figure 44:
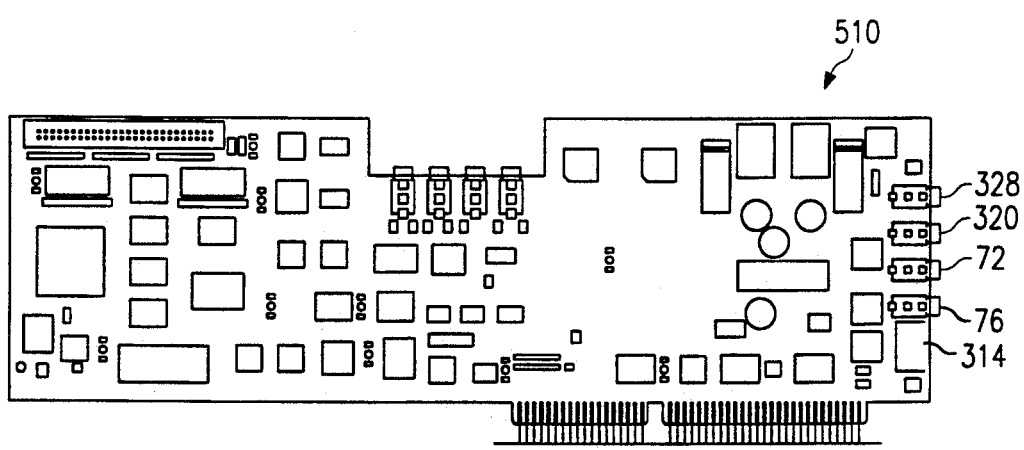
FIG. 44 shows component configurations for the audio multimedia board of the workstation of the present invention.

FIG. 44 shows component configurations for the audio multimedia board 510 of the workstation of the present invention. Component labels correspond to identifiers of detailed schematic drawings of FIGS. 28 through 40 above. Board 510 comprises analog circuitry and digital circuitry. The design serves to prevent cross-coupling between the digital circuitry and the analog circuitry of the board by implementation of separate power planes.

One significant problem that the board design overcomes is providing connectors from each expansion board to associated boards. This is accomplished, in part, by designing each of the expansion boards to have a full back panel associated with those components that have external connections. For example, audio multimedia board 510 includes microphone input 76, aux 1 72, speaker output 328, and audio line out 320. Audio multimedia board 510 also provides MIDI in/out terminal 314. The connections of expansion boards for the workstation are designed to allow the maximum amount of connectivity with the minimal amount of consumed space at the rear of the workstation chassis 20.

Figure 45:
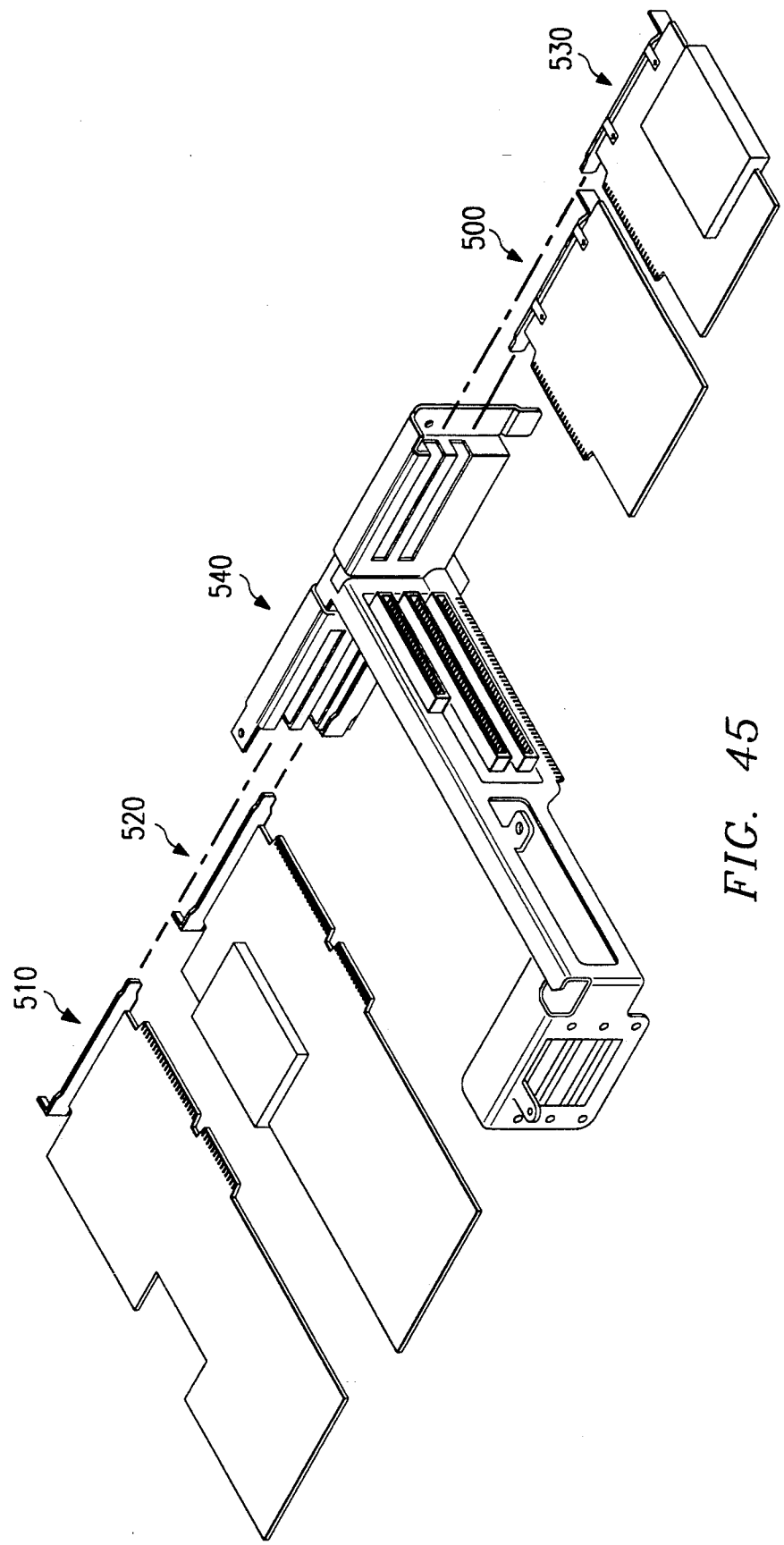
FIG. 45 shows the use of an expansion bracket assembly in conjunction with the telecommunications and multimedia circuit boards of the preferred embodiment of the present invention.

FIG. 45 shows the use of expansion bracket assembly 540 to receive the telecommunications and multi-media circuits associated with the present invention. In particular, within expansion bracket assembly 540, audio multi-media expansion board 510 and television board 520 are positioned to engage connected circuitry of expansion bracket assembly 540. On the opposite side, the preferred embodiment mounts data/fax/voice modem board 500 beneath AM/FM tuner - infrared remote control board 530.

FIG. 46 illustrates the further connection of expansion bracket assembly 540 into chassis 20 of the preferred embodiment. According to FIG. 46, expansion bracket assembly 540 is comprised of riser board 542 and card edge guide 544. Expansion bracket assembly 540 is described in more detail in U.S. Pat. No. 4,979,075 by J. Murphy and entitled "Expansion Card Assembly" issued on Dec. 18, 1990. With the expansion boards described in FIG. 45, expansion bracket assembly 540 engages and mounts above mother board assembly 546. Mother board assembly 546 mounts within chassis 20 above floppy drive bracket 548 and hard drive bracket 554 within chassis base 556. System bezel 558 mounts to the front of chassis base 556. Battery pack 560 and power supply 562 fit comfortably within chassis 20.

Figure 47:
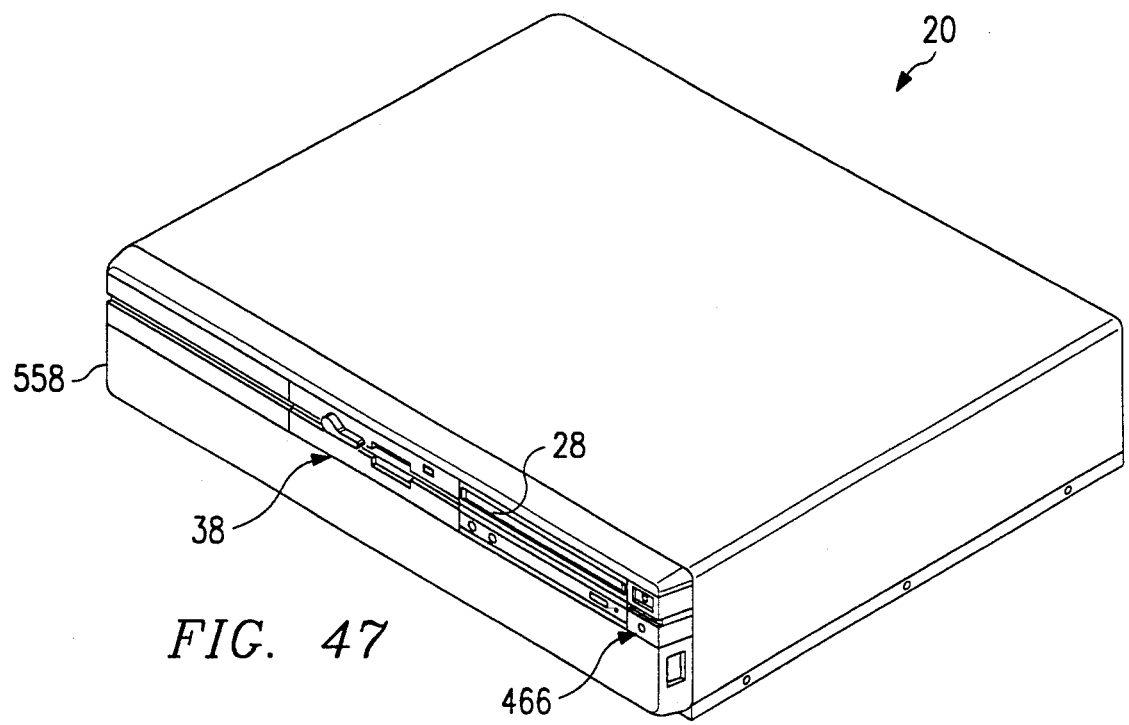
FIG. 47 shows an isometric view of fully-assembled chassis of the present invention.

FIG. 47 shows an isometric view of fully assembled chassis 20 of the present invention. Across system bezel 558 appears 5¼" floppy drive 38 to receive diskettes. Along the right-hand front side of system bezel 558 appears CD-ROM drive 28. Also beside CD-ROM drive 28 appears infrared photodiode 466 to receive input signals from remote controller 52 (See FIG. 1).

Figure 48:
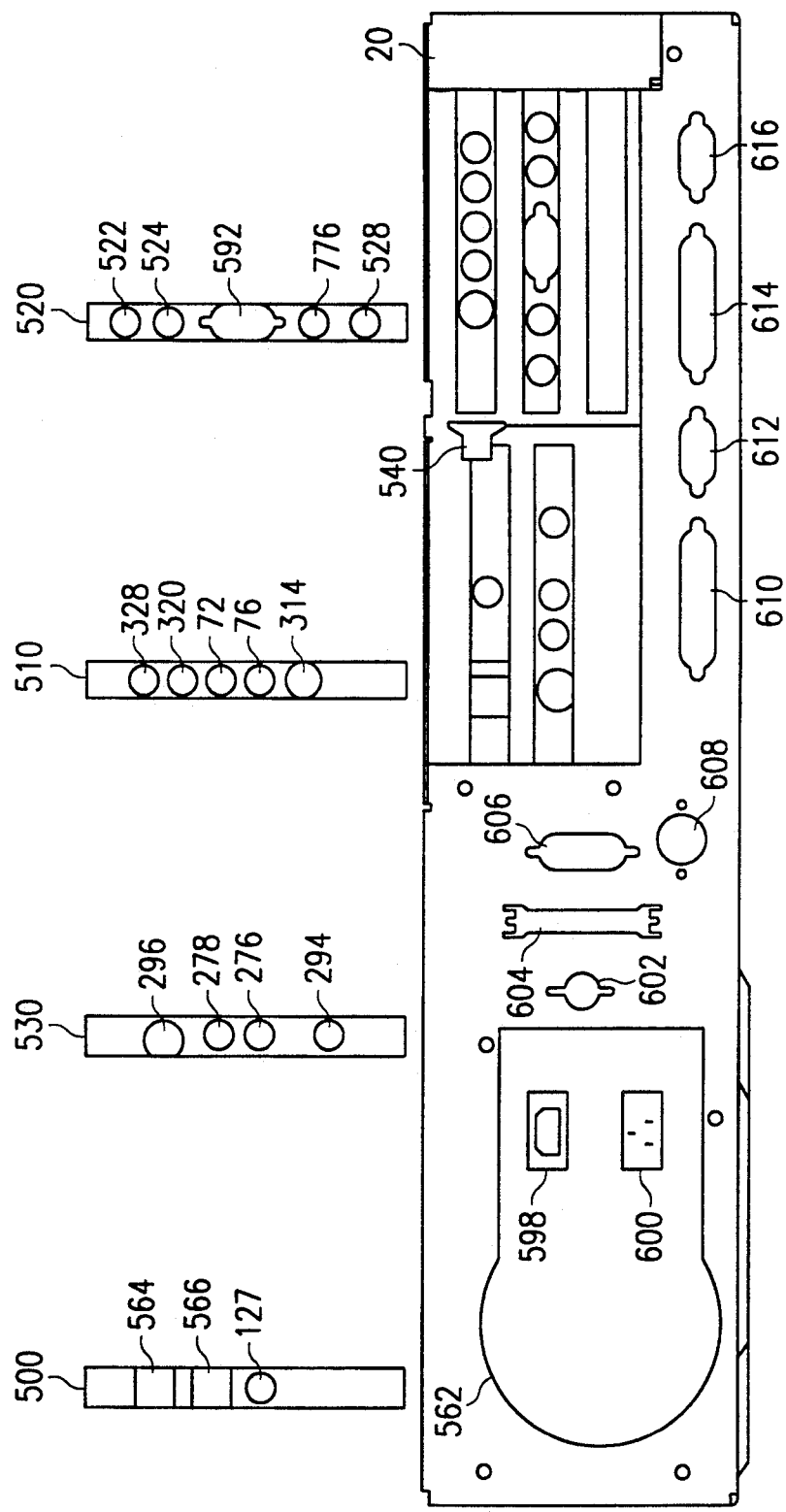
FIG. 48 shows the reverse panel of chassis to illustrate the compact input output connections associated with the telecommunications in multimedia circuits of the present invention.

FIG. 48 shows the reverse panel of chassis 20 to illustrate the compact input output connections associated with the telecommunications in multimedia circuits of the present invention. Across the top of FIG. 48 appear rear brackets of data/fax/voice modem board 500, AM/FM tuner -IR remote control board 530, audio multimedia board 510, and television board 520. For data/fax/voice modem board 500, connections include phone line input 564, connection 566 for a desk phone, and connection 127 to an external speaker.

For AM/FM tuner - infrared remote control board 530, connections include AM/FM antenna input 296, external speaker output 278, line level audio output 276, and external infrared receiver input 294. Connections for audio multimedia board 510 include audio output 328 to speaker connections, line output 320 to headphones or other audio loads, auxiliary audio input 72, microphone input connection 76, and MIDI-in-out-through connection 314. Television board 520 connections include TV cable or VHF/UHF connection 522, input 524 from computer video output of a VGA card, video output connector 592 to connect to VGA monitor 26 (See FIG. 1), audio/video input connector 776 from a camera or VCR, and audio output 528 (either line or amplified).

FIG. 48 also illustrates how expansion bracket assembly 540 fits at the rear panel of chassis 20. Other connections at the rear of chassis 20 include AC outlet 598 and AC power input 600 for power connections to power supply 562. Mouse connection 602 provides access for a pointing device. SCSI port 604 provides connection for external SCSI devices. Game port 606 permits the connection of a joy stick for various computer games. Keyboard connection 608 allows connection of standard keyboard. Other port connections include parallel port 610 and serial one port 612, and serial two port 614. Mother board VGA output connector 616 permits connection of a VGA monitor to mother board 546 (FIG. 46).

In order to operate workstation 10 of the present invention, it is desirable to use a multimedia graphical user interface software system. The preferred embodiment of the present invention uses the Multimedia Windows software system to support the telecommunications and audio multimedia circuitry. FIG. 49 illustrates the hierarchical structure of application programs for workstation 10 of the present invention for a given application 620. The multimedia graphical user interface software used in conjunction with the present invention has a number of characteristics that are different from usual graphical user interface software systems. The following paragraphs describe the differences between the multimedia graphical user interface software and most other graphical user interface software systems. After describing the differences, the following paragraphs describe the driver types used in the workstation 10 of the present invention.

The first difference for this graphical user interface, in particular the multimedia windows system is that this system supports audio inputs and outputs as well as digitally sampled sound. Audio input can be used for creating sampled sound for voice annotations as well as basic multimedia productions. The sampled audio can also be played back from disk, for example, as in a compact disk. Additionally, the multimedia graphical user interface software supports external media devices such as CD-ROMs and video disk players. High capacity media devices can be controlled from within the multimedia graphical user interface software to provide high quality audio or video playback without having tremendous storage requirements. Yet another difference in the multimedia graphical user interface software is that the software supports MIDI instrument emulation using FM synthesis and a standard MIDI patch table. This provides the ability for a multimedia author to add a musical score to a production in a device independent fashion without incurring the high data storage cost of sampled sound.

Another difference in the multimedia graphical user interface software is its support for MIDI input and output. This allows MIDI scores to be composed and played back on more sophisticated sound equipment than the conventional "PC MIDI" instrument emulator.

The multimedia graphical user interface software also provides enhanced video drivers. Device independent bit maps (DIBs) are in software to allow an application access to a high performance mechanism that directly manipulates a bit map image of a region of the screen. This allows frame-based animation of a portion of the screen. Finally, the multimedia graphical user interface software used in the present invention provides enhanced timer services. This makes possible synchronization of audio and video events.

Driver types used in the workstation 10 of the present invention acknowledge the fact that each addition that requires a new piece of hardware also requires a driver to interface the graphical user interface system. In the present invention, there are essentially four types of drivers, including DOS/TSR drivers, normal graphical user interface drivers, multimedia drivers, and system drivers.

In the workstation 10 of the present invention, a DOS/TSR driver 640 will be used to implement communication functions for the data/fax/voice modem circuit 44. For these applications, the GUI software 636 and GUI driver 638 as well as DOS/TSR driver 640 of FIG. 49 illustrate this relationship. The multimedia graphical user interface software of the present invention includes two major modules that contain most of the multimedia functions. As FIG. 49 indicates, control for external devices is provided by the media control interface 622 and by the multimedia system dynamic link library (DLL) 628. The multimedia system DLL 628 provides direct access to all of the individual multimedia devices through multimedia drivers 630.

Although the media control interface 622 is a logically higher level applications programming interface (API) as shown in FIG. 49, it physically resides in multimedia system DLL 628. The multimedia drivers 630 are typically provided by each manufacturer for their own unique hardware. The graphical user interface used in the present invention defines entry points and messages between multimedia system DLL 628 and multimedia driver 630, so each manufacturer only has to provide the drivers to make its hardware work with the present invention. This is similar to the way in which conventional video drivers are interfaced to normal graphical user interface software. In short, multimedia system DLL 628 provides a consistent interface for application programs and multimedia drivers 630 do the actual communication with the hardware.

The audio multimedia circuit provides sampled sound in, sampled sound out, MIDI in, MIDI out, and MIDI instrument functions for the present invention. System drivers 626 will use the multimedia graphical user interface specified interfaces for these functions. A new API for the special features unique to the present invention are defined in system software DLL 624. System software dynamic link library 624 is analogous to multimedia system DLL 628 in the sense that it will define a standard interface for applications. This also allows authoring tools to connect to the enhanced workstation multimedia functions. System software DLL uses system driver 626 to talk directly to various hardware components within the present invention.

A special case of system drivers 626 is the CD-ROM 28 driver set. The CD-ROM 28 driver set comprises the MSCDEX (Microsoft CD-ROM extension) 632 and hardware specific CD-ROM driver 634. CD-ROM driver 634 specified to drive while MSCDEX 632 provides DOS file level access to the driver. MSCDEX 632 essentially lets the DOS file system access the CD-ROM 28 as another drive on the system. In this manner, CD-ROM 28 can be used as a data storage device. MSCDEX 632 also provides access to audio functions of CD-ROM 28 such as playing an audio compact disk. MSCDEX 632 is analogous to the multimedia system DLL 628 in the sense that MSCDEX 632 provides a standard interface and the hardware specific driver, CD-ROM 634, communicates directly with CD-ROM 28. The major difference between graphical user interface drivers 638 and CD-ROM driver 634 is that CD-ROM 634 works from DOS as well as within the graphical user interface software.

Although the invention has been described with reference to the above specified embodiments, this description is not meant to be construed in a limiting sense. Various modifications of the disclosed embodiment, as well as alternative embodiments of the invention will become apparent to persons skilled in the art upon reference to the above description. It is therefore contemplated that the appended claims will cover such modifications that fall within the true scope of the invention.

What is claimed is:

1. A multimedia computing and telecommunications workstation for processing and integrating multimedia and telecommunications information, comprising:
   a computer, said computer comprising a computer chassis and a monitor, said computer further comprising a central processing unit within said chassis;
   telecommunications circuitry associated with said computer and within said chassis for processing telecommunications data and communicating said telecommunications data to said central processing unit, said telecommunications circuitry comprising:
   a telephone circuit for communicating over a telephone line a plurality of telephone input signals, said telephone circuit comprising a data/fax/voice modem circuit for communicating data, fax, and voice telephone signals over said telephone line;
   a radio frequency tuner circuit for receiving a plurality of radio frequency signals, said radio frequency tuner circuit in communication with said telephone circuit for transmitting received radio frequency signals over said telephone line;
   a television circuit for receiving a plurality of television signals and displaying said television signals on said monitor and transmitting said television signals to said telephone circuit for transmission over said telephone line, said television circuit further associated with said radio frequency tuner circuit through interfacing circuitry for integrating said radio frequency and television signals;

audio multimedia circuitry associated with said computer and within said chassis for processing audio multimedia data and communicating said audio multimedia data to said central processing unit, said audio multimedia circuitry comprising:

an analog mixing circuit for mixing a plurality of analog audio signals; and an analog-to-digital/digital-to-analog converter in association with said analog mixing circuit for generating a plurality of analog output signals and directing said analog output signals to said analog mixing circuit, said analog-to-digital/-digital-to-analog converter further associated with said analog mixing circuit for receiving a plurality of analog audio signals to generate a plurality of digital output signals for transmitting said outputs over said telephone line or to a chassis-mounted speaker; and said interfacing circuitry associated among said computer, said telecommunications circuitry, and said audio multimedia circuitry within said chassis for integrating said telecommunications data and said audio multimedia data to produce audio multimedia telecommunications data for processing and storage within said computer and communicating said audio multimedia telecommunications data external to said chassis, said interfacing circuitry comprising circuitry for generating a graphical user interface at said monitor for control of said telecommunications circuitry and said audio multimedia circuitry whereby a user may easily access and control said audio multimedia telecommunications data.

* * * * *

UNITED STATES PATENT AND TRADEMARK OFFICE
CERTIFICATE OF CORRECTION

PATENT NO. : 5,283,638

DATED : February 1, 1994

INVENTOR(S) : Engberg, et al.

It is certified that error appears in the above-identified patent and that said Letters Patent is hereby corrected as shown below:

Title Page, under Other Publications, right column, line 4, after "Jun." delete, "1990", and insert -- 1980 --.

Face Page, under Other Publications, right column, line 7, delete "Enhanced", and insert -- Enhancement --.

Column 8, line 39, after "44", insert -- . --.

Column 9, line 19, after "interface", insert -- . --.

Column 23, line 67, after "programmable to", insert -- 1, --.

Column 30, line 7, after "FIG", delete "46" and insert -- 40 --.

Column 36, line 44, after "monitor", insert -- , --.

Signed and Sealed this

Seventh Day of February, 1995

Attest:

BRUCE LEHMAN

Attesting Officer     Commissioner of Patents and Trademarks